United States Patent
Maus et al.

(10) Patent No.: US 12,359,551 B2
(45) Date of Patent: Jul. 15, 2025

(54) GEOSTEERING METHODS AND SYSTEMS FOR IMPROVED DRILLING PERFORMANCE

(71) Applicant: Magnetic Variation Services, LLC, Denver, CO (US)

(72) Inventors: Stefan Maus, Boulder, CO (US); Marc Ernest Willerth, San Luis Obispo, CA (US); Jarrod Shawn Deverse, Greenwood Village, CO (US); Alexander Michael Mitkus, Denver, CO (US); Timothy William Gee, Englewood, CO (US); Jason Truman Rice, Plano, TX (US); Jeshurun Micaiah Chisholm, Dallas, TX (US); Ann Kamel Fitzgerald, Dallas, TX (US); Richard Kulavik, Frisco, TX (US); Brian Eugene Stokeld, Carrollton, TX (US); Todd W. Benson, Dallas, TX (US); Qianlong Liu, Tuscon, AZ (US)

(73) Assignee: Magnetic Variation Services, LLC, Denver, CO (US)

( * ) Notice: Subject to any disclaimer, the term of this patent is extended or adjusted under 35 U.S.C. 154(b) by 333 days.

(21) Appl. No.: 16/780,503

(22) Filed: Feb. 3, 2020

(65) Prior Publication Data

US 2020/0248545 A1  Aug. 6, 2020

Related U.S. Application Data

(60) Provisional application No. 62/801,428, filed on Feb. 5, 2019.

(51) Int. Cl.
*E21B 44/00* (2006.01)
*E21B 7/04* (2006.01)
(Continued)

(52) U.S. Cl.
CPC ............... *E21B 44/00* (2013.01); *E21B 7/04* (2013.01); *E21B 47/09* (2013.01); *E21B 7/06* (2013.01);
(Continued)

(58) Field of Classification Search
None
See application file for complete search history.

(56) References Cited

U.S. PATENT DOCUMENTS

| 5,410,152 A | 4/1995 | Gadeken |
| 6,088,294 A | 7/2000 | Leggett, III et al. |

(Continued)

FOREIGN PATENT DOCUMENTS

| WO | 2008118735 A1 | 10/2008 |
| WO | 2015060846 A1 | 4/2015 |

(Continued)

OTHER PUBLICATIONS

Wang, Hongling; Kearney, Joseph; Atkinson, Kendall—"Arc-Length Parameterized Spline Curves for Real-Time Simulation"; Curve and Surface Design: Saint-Malo 2002; pp. 387-396. (Year: 2002).*

(Continued)

*Primary Examiner* — Arleen M Vazquez
*Assistant Examiner* — Leonard S Liang
(74) *Attorney, Agent, or Firm* — Kilpatrick Townsend & Stockton LLP

(57) ABSTRACT

A method and system for geosteering may generate a misfit function using a spline function. The misfit function may be used to accurately map errors or differences between TVD-based measurement data for one or more reference wells and MD-based measurement data collected during drilling of a subject well, in order to accurately determine a stratigraphic location of the subject well.

17 Claims, 24 Drawing Sheets

(51) Int. Cl.
*E21B 47/09* (2012.01)
*E21B 7/06* (2006.01)
*E21B 21/08* (2006.01)
*E21B 44/02* (2006.01)
*E21B 44/04* (2006.01)
*E21B 47/022* (2012.01)
*G05B 13/04* (2006.01)

(52) U.S. Cl.
CPC .............. *E21B 21/08* (2013.01); *E21B 44/02* (2013.01); *E21B 44/04* (2013.01); *E21B 47/022* (2013.01); *G05B 13/04* (2013.01)

(56) References Cited

U.S. PATENT DOCUMENTS

| | | | |
|---|---|---|---|
| 6,142,019 A * | 11/2000 | Venchiarutti | G01V 1/284 |
| | | | 73/602 |
| 6,237,404 B1 | 5/2001 | Crary et al. | |
| 6,408,953 B1 | 6/2002 | Goldman et al. | |
| 6,424,919 B1 | 7/2002 | Moran et al. | |
| 6,438,495 B1 | 8/2002 | Chau et al. | |
| 6,478,096 B1 | 11/2002 | Jones et al. | |
| 6,549,854 B1 | 4/2003 | Malinverno et al. | |
| 6,817,425 B2 | 11/2004 | Schultz et al. | |
| 6,868,921 B2 | 3/2005 | Burrows et al. | |
| 6,968,909 B2 | 11/2005 | Aldred et al. | |
| 7,003,439 B2 | 2/2006 | Aldred et al. | |
| 7,032,689 B2 | 4/2006 | Goldman et al. | |
| 7,073,582 B2 | 7/2006 | Connell et al. | |
| 7,128,167 B2 | 10/2006 | Dunlop et al. | |
| 7,142,986 B2 | 11/2006 | Moran | |
| 7,165,632 B2 | 1/2007 | Burrows et al. | |
| 7,191,850 B2 | 3/2007 | Williams | |
| 7,302,346 B2 | 11/2007 | Chang et al. | |
| 7,357,196 B2 | 4/2008 | Goldman et al. | |
| 7,359,844 B2 | 4/2008 | Sung et al. | |
| 7,460,957 B2 | 12/2008 | Prange et al. | |
| 7,546,209 B2 | 6/2009 | Williams | |
| 7,555,391 B2 | 6/2009 | Gleitman | |
| 7,606,666 B2 | 10/2009 | Repin et al. | |
| 7,650,241 B2 | 1/2010 | Jogi et al. | |
| 7,684,929 B2 | 3/2010 | Prange et al. | |
| 7,802,634 B2 | 9/2010 | Boone | |
| 7,814,989 B2 | 10/2010 | Nikolakis-Mouchas et al. | |
| 7,823,655 B2 | 11/2010 | Boone et al. | |
| 7,860,593 B2 | 12/2010 | Boone | |
| 7,861,800 B2 | 1/2011 | Chapman et al. | |
| 7,873,476 B2 | 1/2011 | Thorne | |
| 7,874,351 B2 | 1/2011 | Hampton et al. | |
| 7,921,937 B2 | 4/2011 | Brackin et al. | |
| 7,933,166 B2 | 4/2011 | Goodman | |
| 7,938,197 B2 | 5/2011 | Boone et al. | |
| 7,946,361 B2 | 5/2011 | Gurjar et al. | |
| 7,953,586 B2 | 5/2011 | Chen et al. | |
| 7,957,946 B2 | 6/2011 | Pirovolou | |
| 7,962,288 B2 | 6/2011 | Gleitman | |
| 7,999,695 B2 | 8/2011 | Rodney et al. | |
| 8,061,440 B2 | 11/2011 | Chapman et al. | |
| 8,061,444 B2 | 11/2011 | Mullins et al. | |
| 8,210,257 B2 | 7/2012 | Dusterhoft et al. | |
| 8,210,283 B1 | 7/2012 | Benson et al. | |
| 8,218,826 B2 | 7/2012 | Ciglenec et al. | |
| 8,233,667 B2 | 7/2012 | Helgason et al. | |
| 8,274,399 B2 | 9/2012 | Strachan et al. | |
| 8,278,931 B2 | 10/2012 | Fang et al. | |
| 8,360,171 B2 | 1/2013 | Boone et al. | |
| 8,363,101 B2 | 1/2013 | Gschwendtner et al. | |
| 8,376,065 B2 | 2/2013 | Teodorescu et al. | |
| 8,395,661 B1 | 3/2013 | Olsson et al. | |
| 8,407,006 B2 | 3/2013 | Gleitman | |
| 8,442,769 B2 | 5/2013 | Phillips et al. | |
| 8,463,549 B1 | 6/2013 | Selman et al. | |
| 8,463,550 B1 | 6/2013 | Selman et al. | |
| 8,489,375 B2 | 7/2013 | Omeragic et al. | |
| 8,510,081 B2 | 8/2013 | Boone et al. | |
| 8,528,663 B2 | 9/2013 | Boone | |
| 8,547,428 B1 | 10/2013 | Olsson et al. | |
| 8,577,660 B2 | 11/2013 | Wendt et al. | |
| 8,596,385 B2 | 12/2013 | Benson et al. | |
| 8,612,194 B2 | 12/2013 | Horne et al. | |
| 8,614,713 B1 | 12/2013 | Selman et al. | |
| 8,615,363 B2 | 12/2013 | Aamodt et al. | |
| 8,622,128 B2 | 1/2014 | Hegeman | |
| 8,676,558 B2 | 3/2014 | Pirovolou | |
| 8,686,996 B2 | 4/2014 | Cheung et al. | |
| 8,752,648 B2 | 6/2014 | Goebel et al. | |
| 8,768,627 B2 | 7/2014 | Paulk | |
| 8,775,145 B2 | 7/2014 | Downton | |
| 8,794,353 B2 | 8/2014 | Benson et al. | |
| 8,812,236 B1 | 8/2014 | Freeman et al. | |
| 8,818,729 B1 | 8/2014 | Stokeld et al. | |
| 8,818,779 B2 | 8/2014 | Sadlier et al. | |
| 8,873,806 B2 | 10/2014 | Kiest, Jr. | |
| 8,875,806 B2 | 11/2014 | Williams | |
| 8,939,233 B2 | 1/2015 | Edbury et al. | |
| 8,960,326 B2 | 2/2015 | Williams | |
| 8,965,703 B2 | 2/2015 | Prakash et al. | |
| 8,977,501 B2 | 3/2015 | Benson et al. | |
| 8,990,021 B2 | 3/2015 | Jeffryes | |
| 8,996,396 B2 | 3/2015 | Benson et al. | |
| 9,022,140 B2 | 5/2015 | Marx et al. | |
| 9,041,547 B2 | 5/2015 | Hartmann | |
| 9,041,794 B1 | 5/2015 | Olsson et al. | |
| 9,085,958 B2 | 7/2015 | Laing et al. | |
| 9,091,139 B2 | 7/2015 | Weng et al. | |
| 9,091,140 B1 | 7/2015 | Selman et al. | |
| 9,097,096 B1 | 8/2015 | Selman et al. | |
| 9,103,192 B2 | 8/2015 | Yang | |
| 9,103,936 B2 | 8/2015 | Calleja et al. | |
| 9,129,236 B2 | 9/2015 | Elinas et al. | |
| 9,134,255 B1 | 9/2015 | Olsson et al. | |
| 9,157,309 B1 | 10/2015 | Benson et al. | |
| 9,181,791 B2 | 11/2015 | Dolgin et al. | |
| 9,181,792 B2 | 11/2015 | Pena | |
| 9,182,517 B1 | 11/2015 | Selman et al. | |
| 9,223,041 B2 | 12/2015 | Wendt et al. | |
| 9,238,960 B2 | 1/2016 | Benson et al. | |
| 9,239,960 B2 | 1/2016 | Fukata et al. | |
| 9,279,319 B2 | 3/2016 | Savage | |
| 9,297,205 B2 | 3/2016 | Benson et al. | |
| 9,322,261 B2 | 4/2016 | Selman et al. | |
| 9,347,308 B2 | 5/2016 | Benson et al. | |
| 9,349,212 B2 | 5/2016 | Cheung et al. | |
| 9,388,680 B2 | 7/2016 | Moran | |
| 9,404,356 B2 | 8/2016 | Benson et al. | |
| 9,410,877 B2 | 8/2016 | Maxey et al. | |
| 9,424,667 B2 | 8/2016 | Pena et al. | |
| 9,428,961 B2 | 8/2016 | Benson et al. | |
| 9,429,676 B2 | 8/2016 | Benson et al. | |
| 9,441,430 B2 | 9/2016 | Selman et al. | |
| 9,464,492 B2 | 10/2016 | Austefjord et al. | |
| 9,494,030 B2 | 11/2016 | Benson et al. | |
| 9,518,817 B2 | 12/2016 | Baba et al. | |
| 9,528,366 B2 | 12/2016 | Selman et al. | |
| 9,528,372 B2 | 12/2016 | Selman et al. | |
| 9,534,446 B2 | 1/2017 | Williams | |
| 9,556,728 B2 | 1/2017 | de Reynal, Jr. | |
| 9,581,018 B2 | 2/2017 | Dolginn et al. | |
| 9,598,949 B1 | 3/2017 | Selman et al. | |
| 9,599,742 B1 | 3/2017 | Selman et al. | |
| 9,651,468 B2 | 5/2017 | Rowe et al. | |
| 9,664,011 B2 | 5/2017 | Kruspe et al. | |
| 9,677,882 B2 | 6/2017 | Kiest, Jr. | |
| 9,702,240 B2 | 7/2017 | Bittar et al. | |
| 9,706,185 B2 | 7/2017 | Ellis | |
| 9,720,131 B2 | 8/2017 | Zhuo et al. | |
| 9,865,022 B2 | 1/2018 | Benson et al. | |
| 9,869,145 B2 | 1/2018 | Jones et al. | |
| 9,912,918 B2 | 3/2018 | Samuel | |
| 9,915,112 B2 | 3/2018 | Geehan et al. | |
| 10,210,638 B2 | 2/2019 | Zhu et al. | |
| 10,227,859 B2 | 3/2019 | Richards et al. | |
| 10,328,503 B2 | 6/2019 | Osawa et al. | |

(56) References Cited

U.S. PATENT DOCUMENTS

| | | | |
|---|---|---|---|
| 10,672,154 B2 | 6/2020 | Gillen et al. | |
| 10,788,602 B2* | 9/2020 | Song | G01V 3/20 |
| 10,954,782 B2* | 3/2021 | Wilson | E21B 49/003 |
| 11,162,356 B2 | 11/2021 | Fitzgerald et al. | |
| 2003/0233194 A1 | 12/2003 | Cook | |
| 2004/0050153 A1 | 3/2004 | Krueger et al. | |
| 2005/0015231 A1 | 1/2005 | Edwards et al. | |
| 2005/0060096 A1* | 3/2005 | Hutchinson | E21B 44/00 702/6 |
| 2006/0074561 A1 | 4/2006 | Xia et al. | |
| 2006/0293872 A1 | 12/2006 | Zamora et al. | |
| 2007/0061081 A1 | 3/2007 | Moran | |
| 2008/0314641 A1 | 12/2008 | McClard | |
| 2009/0078462 A1 | 3/2009 | Boone et al. | |
| 2009/0157367 A1 | 6/2009 | Meyer et al. | |
| 2009/0260881 A1 | 10/2009 | Williams | |
| 2010/0076740 A1 | 3/2010 | Kuckuk et al. | |
| 2010/0185395 A1 | 7/2010 | Pirovolou et al. | |
| 2010/0282508 A1 | 11/2010 | Johnston et al. | |
| 2011/0031019 A1 | 2/2011 | Williams | |
| 2011/0161133 A1 | 6/2011 | Staveley et al. | |
| 2011/0191029 A1 | 8/2011 | Jalaki et al. | |
| 2011/0232967 A1 | 9/2011 | Williams | |
| 2012/0111631 A1 | 5/2012 | Williams | |
| 2012/0188091 A1 | 7/2012 | Calleja et al. | |
| 2012/0191354 A1 | 7/2012 | Caycedo | |
| 2012/0292111 A1 | 11/2012 | Williams | |
| 2013/0049981 A1 | 2/2013 | Macpherson et al. | |
| 2013/0066471 A1* | 3/2013 | Wang | G05B 13/024 700/275 |
| 2013/0166263 A1 | 6/2013 | Shen et al. | |
| 2013/0238306 A1 | 9/2013 | Lagenwalter et al. | |
| 2014/0000964 A1* | 1/2014 | Selman | E21B 44/00 175/24 |
| 2014/0002617 A1 | 1/2014 | Zhang et al. | |
| 2014/0025301 A1 | 1/2014 | Storm, Jr. et al. | |
| 2014/0152659 A1 | 6/2014 | Davidson et al. | |
| 2014/0277752 A1* | 9/2014 | Chang | E21B 44/00 700/275 |
| 2014/0326505 A1 | 11/2014 | Davis et al. | |
| 2014/0333754 A1 | 11/2014 | Graves et al. | |
| 2014/0379265 A1 | 12/2014 | Beda et al. | |
| 2015/0138337 A1 | 5/2015 | Tjhang et al. | |
| 2015/0193705 A1 | 7/2015 | Benson et al. | |
| 2015/0211352 A1 | 7/2015 | Sugiura | |
| 2015/0218914 A1 | 8/2015 | Marx et al. | |
| 2015/0218936 A1 | 8/2015 | Maher et al. | |
| 2015/0227841 A1 | 8/2015 | Laing et al. | |
| 2015/0267525 A1 | 9/2015 | May et al. | |
| 2015/0330209 A1 | 11/2015 | Panchal et al. | |
| 2015/0369031 A1 | 12/2015 | Yang et al. | |
| 2015/0377003 A1 | 12/2015 | Benson et al. | |
| 2016/0003008 A1 | 1/2016 | Uribe et al. | |
| 2016/0024847 A1* | 1/2016 | Benson | E21B 49/00 175/24 |
| 2016/0047220 A1 | 2/2016 | Sharp et al. | |
| 2016/0076357 A1 | 3/2016 | Hbaieb | |
| 2016/0117424 A1 | 4/2016 | Hohl et al. | |
| 2016/0124101 A1 | 5/2016 | Spicer et al. | |
| 2016/0177699 A1 | 6/2016 | Benson et al. | |
| 2016/0186496 A1 | 6/2016 | De Bakker et al. | |
| 2016/0251900 A1 | 9/2016 | Benson et al. | |
| 2016/0265334 A1 | 9/2016 | Dykstra et al. | |
| 2016/0265336 A1 | 9/2016 | Benson et al. | |
| 2016/0281489 A1 | 9/2016 | Dykstra et al. | |
| 2016/0290117 A1 | 10/2016 | Dykstra et al. | |
| 2016/0305230 A1 | 10/2016 | Benson et al. | |
| 2016/0327678 A1 | 11/2016 | Benson et al. | |
| 2016/0333673 A1 | 11/2016 | Anno et al. | |
| 2016/0362971 A1 | 12/2016 | Benson et al. | |
| 2016/0370480 A1 | 12/2016 | Shetty et al. | |
| 2017/0058656 A1 | 3/2017 | Benson et al. | |
| 2017/0058658 A1 | 3/2017 | Spencer et al. | |
| 2017/0073351 A1 | 3/2017 | Chafeev et al. | |
| 2017/0081953 A1 | 3/2017 | Benson et al. | |
| 2017/0089153 A1 | 3/2017 | Teodorescu | |
| 2017/0096887 A1* | 4/2017 | Wilson | E21B 44/00 |
| 2017/0145804 A1* | 5/2017 | Wessling | G06Q 10/0631 |
| 2017/0152739 A1 | 6/2017 | Benson et al. | |
| 2017/0152793 A1 | 6/2017 | Albrecht et al. | |
| 2017/0161885 A1 | 6/2017 | Parmeshwar et al. | |
| 2017/0167853 A1 | 6/2017 | Zheng et al. | |
| 2017/0183952 A1* | 6/2017 | Williams | E21B 47/06 |
| 2017/0277264 A1 | 9/2017 | Grant et al. | |
| 2017/0322086 A1 | 11/2017 | Luharuka et al. | |
| 2017/0322332 A1 | 11/2017 | Cooper et al. | |
| 2018/0003839 A1 | 1/2018 | Lowell et al. | |
| 2018/0068037 A1 | 3/2018 | Williams | |
| 2018/0073351 A9 | 3/2018 | Benson et al. | |
| 2018/0180524 A1 | 6/2018 | Francois et al. | |
| 2018/0225778 A1 | 8/2018 | Grant et al. | |
| 2019/0102612 A1 | 4/2019 | Takemoto et al. | |
| 2019/0136650 A1 | 5/2019 | Zheng et al. | |
| 2019/0141294 A1 | 5/2019 | Thorn et al. | |
| 2019/0206068 A1 | 7/2019 | Stark et al. | |
| 2020/0080409 A1* | 3/2020 | Haggerty | E21B 7/04 |
| 2020/0126386 A1* | 4/2020 | Michalopulos | G08B 21/02 |
| 2020/0157887 A1 | 5/2020 | Alonso et al. | |
| 2020/0362687 A1* | 11/2020 | Hopwood | E21B 44/00 |
| 2021/0223424 A1* | 7/2021 | Valensi | G01V 1/303 |

FOREIGN PATENT DOCUMENTS

| | | |
|---|---|---|
| WO | 2016147045 A1 | 9/2016 |
| WO | 2017042677 A1 | 3/2017 |
| WO | 201714508 A1 | 8/2017 |
| WO | 2017132297 A2 | 8/2017 |
| WO | 2017142508 A1 | 8/2017 |
| WO | 2017176689 A1 | 10/2017 |
| WO | 2018093273 A1 | 5/2018 |
| WO | 2018131485 A1 | 7/2018 |
| WO | 2018148832 A1 | 8/2018 |
| WO | 2018157513 A1 | 9/2018 |
| WO | 2019005045 A1 | 1/2019 |

OTHER PUBLICATIONS

Measurements and global models of surface wave propagation; Journal of Geophysical Research, vol. 102, No. B4, pp. 8137-8157, Apr. 10, 1997. (Year: 1997).*

International Search Report and Written Opinion; PCT/US2020/016434, dated Apr. 29, 2020.

Hugh Winkler, "Geosteering-by-Exact-Reference-Bayesian-Network," Geophysics.

PCT/US2020/016434, "International Search Report and Written Opinion", Apr. 29, 2020, 9 pages.

European Patent Application No. 20752242.6, "Extended European Search Report", Jun. 21, 2022, 6 pages.

PCT/US2020/016434, "International Preliminary Report on Patentability", Aug. 19, 2021, 8 pages.

U.S. Appl. No. 16/781,460, "Corrected Notice of Allowability", Oct. 5, 2021, 3 pages.

U.S. Appl. No. 16/781,460, "Non-Final Office Action", Sep. 18, 2020, 10 pages.

U.S. Appl. No. 16/781,460, "Notice of Allowance", Jun. 15, 2021, 5 pages.

U.S. Appl. No. 17/447,629, "Non-Final Office Action", Sep. 16, 2022, 12 pages.

EP20752426.5, "Extended European Search Report", Jun. 17, 2022, 10 pages.

PCT/US2020/016632, "International Preliminary Report on Patentability", Aug. 19, 2021, 8 pages.

PCT/US2020/016632, "International Search Report and Written Opinion", Apr. 27, 2020, 9 pages.

U.S. Appl. No. 17/447,629, "Final Office Action", Mar. 21, 2023, 12 pages.

U.S. Appl. No. 17/447,629, "Non-Final Office Action", Jun. 30, 2023, 14 pages.

(56) References Cited

OTHER PUBLICATIONS

CA Application No. 3123941, "Office Action", Sep. 14, 2023, 4 pages.
U.S. Appl. No. 17/447,629, "Notice of Allowance", Feb. 14, 2024, 5 pages.
CA3121861, "Office Action", Feb. 19, 2024, 3 pages.
EP20752426.5, "Office Action", Feb. 13, 2024, 8 pages.

\* cited by examiner

GEOSTEERING METHODS AND SYSTEMS FOR IMPROVED DRILLING PERFORMANCE

CROSS REFERENCE TO RELATED APPLICATIONS

This application claims the benefit of priority of U.S. Provisional Patent Application Ser. No. 62/801,428, filed on Feb. 5, 2019, which is hereby incorporated by reference as if fully set forth herein.

BACKGROUND

Field of the Disclosure

The present disclosure relates generally to drilling of wells for oil and gas production and, more particularly, to geosteering methods and systems for improved drilling performance.

Description of the Related Art

In well placement, Earth's gravity acceleration and geomagnetic field are used as a natural reference frame. A downhole tool may measure a survey of the acceleration vector and the magnetic field vector to determine a 3D orientation of the drill string, including to infer an inclination angle and an azimuth angle of a bottom hole assembly (BHA). From consecutive downhole surveys, the well trajectory can be determined in this manner and can be used to validate that the actual well trajectory remains on target with a planned well trajectory.

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Conventional technologies and methods may not adequately address the complicated nature of drilling, and may not be capable of gathering and processing various information from downhole sensors and surface control systems in a timely manner, in order to improve drilling operations and minimize drilling errors.

The determination of the well trajectory from a downhole survey may involve various calculations that depend upon reference values and measured values. However, various internal and external factors may adversely affect the downhole survey and, in turn, the determination of the well trajectory.

BRIEF DESCRIPTION OF THE DRAWINGS

For a more complete understanding of the present invention and its features and advantages, reference is now made to the following description, taken in conjunction with the accompanying drawings, in which.

SUMMARY

Figure 1:
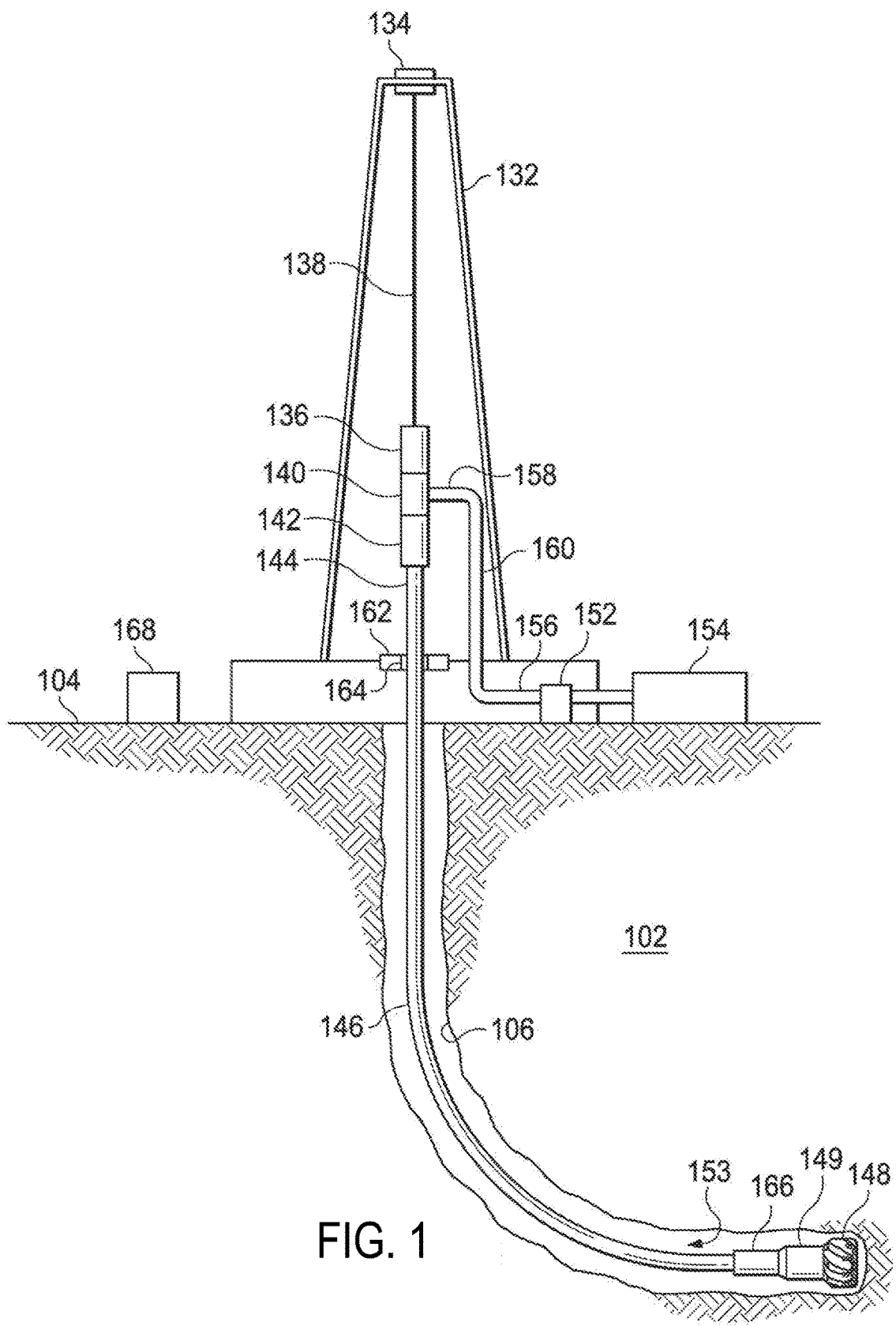
FIG. 1 is a depiction of a drilling system for drilling a borehole.

In one aspect, a geosteering control system is disclosed. The geosteering control system may include a processor enabled to access memory media, and the memory media storing instructions executable by the processor for accessing reference well data that may be associated with at least one reference well located in proximity to a subject well, or that may be an earlier section of the subject well being drilled, where the reference well data further comprises first measurement data describing at least one geological property versus true vertical depth (TVD). The instructions may also be executable for receiving second measurement data describing the at least one geological property for the subject well versus measured depth (MD), using a plurality of spline functions, mapping the second measurement data to the first measurement data. Using a plurality of misfit functions, the instructions may also be executable for representing difference values in the at least one geological property between the second measurement data and the first measurement data as respectively mapped by the spline functions, and identifying a first spline function included in the plurality of spline functions as an optimal geosteering solution, where the first spline function is identified for having at least one minimum of the plurality of respective misfit functions. Based on the optimal geosteering solution, the instructions may also be executable for determining a subterranean location of a wellbore of the subject well during drilling of the subject well.

In any of the disclosed implementations of the geosteering control system, the geosteering control system may be enabled to send signals to control drilling rig equipment enabled for drilling of the subject well.

In any of the disclosed implementations of the geosteering control system, the memory media may further comprise instructions for determining when a change in one or more drilling parameters is indicated during drilling of the well and send one or more signals to effect such a change.

In any of the disclosed implementations of the geosteering control system, the memory media may further comprise instructions for using the subterranean location determined based on the optimal geosteering solution, modifying, during drilling, a well plan for the subject well.

In any of the disclosed implementations of the geosteering control system, the memory media may further comprise instructions for identifying the first spline function for having at least some minima of the plurality of respective misfit functions.

In any of the disclosed implementations of the geosteering control system, the spline function may be a third order cubic spline function.

In any of the disclosed implementations of the geosteering control system, the reference well data may be associated with the at least two reference wells located in proximity to the subject well.

In any of the disclosed implementations of the geosteering control system, the instructions for mapping the plurality of misfit functions using the spline function may further comprise instructions for determining coefficients and knot points for the spline function.

In any of the disclosed implementations of the geosteering control system, the instructions for determining coefficients and knot points for the spline function may further comprise instructions for segmenting the first measurement data and the second measurement data into a plurality of segments respectively corresponding to MD sections of the well bore of the subject well, determining a plurality of the coefficients and a plurality of the knot points as multi-solutions for each of the plurality of segments, selecting one of the multi-solutions for at least a portion of the optimal geosteering solution.

In any of the disclosed implementations of the geosteering control system, the instructions for segmenting the first measurement data and the second measurement data into a plurality of segments respectively corresponding to MD sections of the well bore of the subject well may further comprise instructions for determining when a discontinuity is indicated in the spline function, based on either the first measurement data or the second measurement data, wherein the discontinuity corresponds to a geological fault, and resuming the mapping of the plurality of misfit functions after the discontinuity.

In any of the disclosed implementations of the geosteering control system, the instructions for segmenting the first measurement data and the second measurement data into a plurality of segments respectively corresponding to MD sections of the well bore of the subject well may further comprise instructions for, for a first segment in the plurality of segments respectively corresponding to a first MD section, extending the first MD section without changing first coefficients and first knot points associated with the first MD section until a first mapping of the misfit function corresponding to the MD section violates a threshold criterion.

In any of the disclosed implementations of the geosteering control system, the memory media may further comprise instructions for generating a three-dimensional (3D) view of the wellbore of the subject well during drilling, wherein the 3D view depicts information indicative of the optimal geosteering solution versus MD, and outputting the 3D view on a display device during drilling.

In any of the disclosed implementations of the geosteering control system, the 3D view may further depict information indicative of the first measurement data and the second measurement data versus MD.

In any of the disclosed implementations of the geosteering control system, the at least one geological property may be selected from the group consisting of: gamma ray emission, resistivity, porosity, density, and hardness.

In another aspect, a computer-implemented method for geosteering is disclosed. The method for geosteering may include accessing reference well data associated with at least one reference well for a subject well, where the reference well data further comprises first measurement data describing at least one geological property versus true vertical depth (TVD). The method for geosteering may include receiving second measurement data describing the at least one geological property for the subject well versus measured depth (MD), using a plurality of spline functions, mapping the second measurement data to the first measurement data. Using a plurality of misfit functions, The method for geosteering may include representing difference values in the at least one geological property between the second measurement data and the first measurement data as respectively mapped by the spline functions, and identifying a first spline function included in the plurality of spline functions as an optimal geosteering solution, where the first spline function is identified for having at least one minimum of the plurality of respective misfit functions. Based on the optimal geosteering solution, the method for geosteering may include determining a subterranean location of a wellbore of the subject well during drilling of the subject well.

In any of the disclosed implementations of the method for geosteering, the method for geosteering may be executed by a geosteering control system enabled to control drilling rig equipment enabled for drilling of the subject well.

In any of the disclosed implementations, the method for geosteering may include determining when a change in drilling parameters used to control the drilling rig equipment is indicated during drilling of the well.

In any of the disclosed implementations, the method for geosteering may include using the subterranean location determined based on the optimal geosteering solution, modifying, during drilling, a well plan for the subject well.

In any of the disclosed implementations, the method for geosteering may include identifying the first spline function for having at least some minima of the plurality of respective misfit functions.

In any of the disclosed implementations of the method for geosteering, the spline function may be a third order cubic spline function.

In any of the disclosed implementations of the method for geosteering, the reference well data may be associated with the at least two reference wells located in proximity to the subject well.

In any of the disclosed implementations of the method for geosteering, mapping the plurality of misfit functions using the spline function may further comprise determining coefficients and knot points for the spline function.

In any of the disclosed implementations of the method for geosteering, determining coefficients and knot points for the spline function may further comprise segmenting the first measurement data and the second measurement data into a plurality of segments respectively corresponding to MD sections of the well bore of the subject well, determining a plurality of the coefficients and a plurality of the knot points as multi-solutions for each of the plurality of segments, selecting one of the multi-solutions for at least a portion of the optimal geosteering solution.

In any of the disclosed implementations of the method for geosteering, for segmenting the first measurement data and the second measurement data into a plurality of segments respectively corresponding to MD sections of the well bore of the subject well may further comprise determining when a discontinuity is indicated in the spline function, based on either the first measurement data or the second measurement data, wherein the discontinuity corresponds to a geological fault, and resuming the mapping of the plurality of misfit functions after the discontinuity.

In any of the disclosed implementations of the method for geosteering, segmenting the first measurement data and the second measurement data into a plurality of segments respectively corresponding to MD sections of the well bore of the subject well may further comprise, for a first segment in the plurality of segments respectively corresponding to a first MD section, extending the first MD section without changing first coefficients and first knot points associated with the first MD section until a first mapping of the misfit function corresponding to the MD section violates a threshold criterion.

In any of the disclosed implementations, the method for geosteering may include generating a three-dimensional (3D) view of the wellbore of the subject well during drilling, wherein the 3D view depicts information indicative of the optimal geosteering solution versus MD, and outputting the 3D view on a display device during drilling.

In any of the disclosed implementations of the method for geosteering, the 3D view may further depict information indicative of the first measurement data and the second measurement data versus MD.

In any of the disclosed implementations of the method for geosteering, the at least one geological property may be selected from the group consisting of: gamma ray emission, resistivity, porosity, density, and hardness.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Drilling a well typically involves a substantial amount of human decision-making during the drilling process. For example, geologists and drilling engineers use their knowledge, experience, and the available information to make decisions on how to plan the drilling operation, how to accomplish the drill plan, and how to handle issues that arise during drilling. However, even the best geologists and drilling engineers perform some guesswork due to the unique nature of each borehole. Furthermore, a directional human driller performing the drilling may have drilled other boreholes in the same region and so may have some similar experience. However, during drilling operations, a multitude of input information and other factors may affect a drilling decision being made by a human operator or specialist, such that the amount of information may overwhelm the cognitive ability of the human to properly consider and factor into the drilling decision. Furthermore, the quality or the error involved with the drilling decision may improve with larger amounts of input data being considered, for example, such as formation data from a large number of offset wells. For these reasons, human specialists may be unable to achieve optimal drilling decisions, particularly when such drilling decisions are made under time constraints, such as during drilling operations when continuation of drilling is dependent on the drilling decision and, thus, the entire drilling rig waits idly for the next drilling decision. Furthermore, human decision-making for drilling decisions can result in expensive mistakes, because drilling errors can add significant cost to drilling operations. In some cases, drilling errors may permanently lower the output of a well, resulting in substantial long term economic losses due to the lost output of the well.

Referring now to the drawings, Referring to FIG. 1, a drilling system 100 is illustrated in one embodiment as a top drive system. As shown, the drilling system 100 includes a derrick 132 on the surface 104 of the earth and is used to drill a borehole 106 into the earth. Typically, drilling system 100 is used at a location corresponding to a geographic formation 102 in the earth that is known.

In FIG. 1, derrick 132 includes a crown block 134 to which a traveling block 136 is coupled via a drilling line 138. In drilling system 100, a top drive 140 is coupled to traveling block 136 and may provide rotational force for drilling. A saver sub 142 may sit between the top drive 140 and a drill pipe 144 that is part of a drill string 146. Top drive 140 may rotate drill string 146 via the saver sub 142, which in turn may rotate a drill bit 148 of a bottom hole assembly (BHA) 149 in borehole 106 passing through formation 102. Also visible in drilling system 100 is a rotary table 162 that may be fitted with a master bushing 164 to hold drill string 146 when not rotating.

A mud pump 152 may direct a fluid mixture (e.g., drilling mud 153) from a mud pit 154 into drill string 146. Mud pit 154 is shown schematically as a container, but it is noted that various receptacles, tanks, pits, or other containers may be used. Drilling mud 153 may flow from mud pump 152 into a discharge line 156 that is coupled to a rotary hose 158 by a standpipe 160. Rotary hose 158 may then be coupled to top drive 140, which includes a passage for drilling mud 153 to flow into borehole 106 via drill string 146 from where drilling mud 153 may emerge at drill bit 148. Drilling mud 153 may lubricate drill bit 148 during drilling and, due to the pressure supplied by mud pump 152, drilling mud 153 may return via borehole 106 to surface 104.

In drilling system 100, drilling equipment (see also FIG. 5) is used to perform the drilling of borehole 106, such as top drive 140 (or rotary drive equipment) that couples to drill string 146 and BHA 149 and is configured to rotate drill string 146 and apply pressure to drill bit 148. Drilling system 100 may include control systems such as a weight-on-bit (WOB)/differential pressure control system 522, a positional/rotary control system 524, a fluid circulation control system 526, and a sensor system 528, as further described below with respect to FIG. 5. The control systems may be used to monitor and change drilling rig settings, such as the WOB or differential pressure to alter the rate of penetration (ROP) or the radial orientation of the toolface, change the flow rate of drilling mud, and perform other operations. Sensor system 528 may be for obtaining sensor data about the drilling operation and drilling system 100, including the downhole equipment. For example, sensor system 528 may include measurement while drilling (MWD) or logging while drilling (LWD) tools for acquiring information, such as toolface and formation logging information, that may be saved for later retrieval, transmitted with or without a delay using any of various communication means (e.g., wireless, wireline, or mud pulse telemetry), or otherwise transferred to geosteering control system 168. As used herein, an MWD tool is enabled to communicate downhole measurements without substantial delay to the surface 104, such as using mud pulse telemetry, while a LWD tool is equipped with an internal memory that stores measurements when downhole and can be used to download a stored log of measurements when the LWD tool is at the surface 104. The internal memory in the LWD tool may be a removable memory, such as a universal serial bus (USB) memory device or another removable memory device. It is noted that certain downhole tools may have both MWD and LWD capabilities. Such information acquired by sensor system 528 may include information related to hole depth, bit depth, inclination angle, azimuth angle, true vertical depth, gamma count, standpipe pressure, mud flow rate, rotary rotations per minute (RPM), bit speed, ROP, WOB, among other information. It is noted that all or part of sensor system 528 may be incorporated into a control system, or in another component of the drilling equipment. As drilling system 100 can be configured in many different implementations, it is noted that different control systems and subsystems may be used.

Sensing, detection, measurement, evaluation, storage, alarm, and other functionality may be incorporated into a downhole tool 166 or BHA 149 or elsewhere along drill string 146 to provide downhole surveys of borehole 106. Accordingly, downhole tool 166 may be an MWD tool or a LWD tool or both, and may accordingly utilize connectivity to the surface 104, local storage, or both. In different implementations, gamma radiation sensors, magnetometers, accelerometers, and other types of sensors may be used for the downhole surveys. Although downhole tool 166 is shown in singular in drilling system 100, it is noted that multiple instances (not shown) of downhole tool 166 may be located at one or more locations along drill string 146.

In some embodiments, formation detection and evaluation functionality may be provided via a geosteering control system 168 on the surface 104. Geosteering control system 168 may be located in proximity to derrick 132 or may be included with drilling system 100. In other embodiments, geosteering control system 168 may be remote from the actual location of borehole 106 (see also FIG. 4). For example, geosteering control system 168 may be a stand-alone system or may be incorporated into other systems included with drilling system 100.

In operation, geosteering control system 168 may be accessible via a communication network (see also FIG. 10), and may accordingly receive formation information via the communication network. In some embodiments, geosteering control system 168 may use the evaluation functionality to provide corrective measures, such as a convergence plan to overcome an error in the well trajectory of borehole 106 with respect to a reference, or a planned well trajectory. The convergence plans or other corrective measures may depend on a determination of the well trajectory, and therefore, may be improved in accuracy using geosteering methods and systems for improved drilling performance, as disclosed herein.

In particular embodiments, at least a portion of geosteering control system 168 may be located in downhole tool 166 (not shown). In some embodiments, geosteering control system 168 may communicate with a separate controller (not shown) located in downhole tool 166. In particular, geosteering control system 168 may receive and process measurements received from downhole surveys, and may perform the calculations described herein for geosteering methods and systems for improved drilling performance using the downhole surveys and other information referenced herein.

In drilling system 100, to aid in the drilling process, data is collected from borehole 106, such as from sensors in BHA 149, downhole tool 166, or both. The collected data may include the geological characteristics of formation 102 in which borehole 106 was formed, the attributes of drilling system 100, including BHA 149, and drilling information such as WOB, drilling speed, and other information pertinent to the formation of borehole 106. The drilling information may be associated with a particular depth or another identifiable marker to index collected data. For example, the collected data for borehole 106 may capture drilling information indicating that drilling of the well from 1,000 feet to 1,200 feet occurred at a first ROP through a first rock layer with a first WOB, while drilling from 1,200 feet to 1,500 feet occurred at a second ROP through a second rock layer with a second WOB (see also FIG. 2). In some applications, the collected data may be used to virtually recreate the drilling process that created borehole 106 in formation 102, such as by displaying a computer simulation of the drilling process. The accuracy with which the drilling process can be recreated depends on a level of detail and accuracy of the collected data, including collected data from a downhole survey of the well trajectory.

The collected data may be stored in a database that is accessible via a communication network for example. In some embodiments, the database storing the collected data for borehole 106 may be located locally at drilling system 100, at a drilling hub that supports a plurality of drilling systems 100 in a region, or at a database server accessible over the communication network that provides access to the database (see also FIG. 4). At drilling system 100, the collected data may be stored at the surface 104 or downhole in drill string 146, such as in a memory device included with BHA 149 (see also FIG. 10). Alternatively, at least a portion of the collected data may be stored on a removable storage medium, such as using geosteering control system 168 or BHA 149, that is later coupled to the database in order to transfer the collected data to the database, which may be manually performed at certain intervals, for example.

In FIG. 1, geosteering control system 168 is located at or near the surface 104 where borehole 106 is being drilled. Geosteering control system 168 may be coupled to equipment used in drilling system 100 and may also be coupled to the database, whether the database is physically located locally, regionally, or centrally (see also FIGS. 4 and 5). Accordingly, geosteering control system 168 may collect and record various inputs, such as measurement data from a magnetometer and an accelerometer that may also be included with BHA 149.

Geosteering control system 168 may further be used as a surface steerable system, along with the database, as described above. The surface steerable system may enable an operator to plan and control drilling operations while drilling is being performed. The surface steerable system may itself also be used to perform certain drilling operations, such as controlling certain control systems that, in turn, control the actual equipment in drilling system 100 (see also FIG. 5). The control of drilling equipment and drilling operations by geosteering control system 168 may be manual, manual-assisted, semi-automatic, or automatic, in different embodiments.

Manual control may involve direct control of the drilling rig equipment, albeit with certain safety limits to prevent unsafe or undesired actions or collisions of different equipment. To enable manual-assisted control, geosteering control system 168 may present various information, such as using a graphical user interface (GUI) displayed on a display device (see FIG. 8), to a human operator, and may provide controls that enable the human operator to perform a control operation. The information presented to the user may include live measurements and feedback from the drilling rig and geosteering control system 168, or the drilling rig itself, and may further include limits and safety-related elements to prevent unwanted actions or equipment states, in response to a manual control command entered by the user using the GUI.

To implement semi-automatic control, geosteering control system 168 may itself propose or indicate to the user, such as via the GUI, that a certain control operation, or a sequence of control operations, should be performed at a given time. Then, geosteering control system 168 may enable the user to imitate the indicated control operation or sequence of control operations, such that once manually started, the indicated control operation or sequence of control operations is automatically completed. The limits and safety features mentioned above for manual control would still apply for semi-automatic control. It is noted that geosteering control system 168 may execute semi-automatic control using a secondary processor, such as an embedded controller that executes under a real-time operating system (RTOS), that is under the control and command of geosteering control system 168. To implement automatic control, the step of manual starting the indicated control operation or sequence of operations is eliminated, and geosteering control system 168 may proceed with only a passive notification to the user of the actions taken.

In order to implement various control operations, geosteering control system 168 may perform (or may cause to be performed) various input operations, processing operations, and output operations. The input operations performed by geosteering control system 168 may result in measurements or other input information being made available for use in any subsequent operations, such as processing or output operations. The input operations may accordingly provide the input information, including feedback from the drilling process itself, to geosteering control system 168. The processing operations performed by geosteering control system 168 may be any processing operation associated with geosteering, as disclosed herein. The output operations performed by geosteering control system 168 may involve generating output information for use by external entities, or for output to a user, such as in the form of updated elements in the GUI, for example. The output information may include at least some of the input information, enabling geosteering control system 168 to distribute information among various entities and processors.

In particular, the operations performed by geosteering control system 168 may include operations such as receiving drilling data representing a drill path, receiving other drilling parameters, calculating a drilling solution for the drill path based on the received data and other available data (e.g., rig characteristics), implementing the drilling solution at the drilling rig, monitoring the drilling process to gauge whether the drilling process is within a defined margin of error of the drill path, and calculating corrections for the drilling process if the drilling process is outside of the margin of error.

Accordingly, geosteering control system 168 may receive input information either before drilling, during drilling, or after drilling of borehole 106. The input information may comprise measurements from one or more sensors, as well as survey information collected while drilling borehole 106. The input information may also include a drill plan, a regional formation history, drilling engineer parameters, downhole toolface/inclination information, downhole tool gamma/resistivity information, economic parameters, reliability parameters, among various other parameters. Some of the input information, such as the regional formation history, may be available from a drilling hub 410, which may have respective access to a regional drilling database (DB) 412 (see FIG. 4). Other input information may be accessed or uploaded from other sources to geosteering control system 168. For example, a web interface may be used to interact directly with geosteering control system 168 to upload the drill plan or drilling parameters.

As noted, the input information may be provided to geosteering control system 168. After processing by geosteering control system 168, geosteering control system 168 may generate control information that may be output to drilling rig 210 (e.g., to rig controls 520 that control drilling equipment 530, see also FIGS. 2 and 5). Drilling rig 210 may provide feedback information using rig controls 520 to geosteering control system 168. The feedback information may then serve as input information to geosteering control system 168, thereby enabling geosteering control system 168 to perform feedback loop control and validation. Accordingly, geosteering control system 168 may be configured to modify its output information to the drilling rig, in order to achieve the desired results, which are indicated in the feedback information. The output information generated by geosteering control system 168 may include indications to modify one or more drilling parameters, the direction of drilling, the drilling mode, among others. In certain operational modes, such as semi-automatic or automatic, geosteering control system 168 may generate output information indicative of instructions to rig controls 520 to enable automatic drilling using the latest location of BHA 149. Therefore, an improved accuracy in the determination of the location of BHA 149 may be provided using geosteering control system 168, along with the methods and operations for geosteering disclosed herein.

Figure 2:
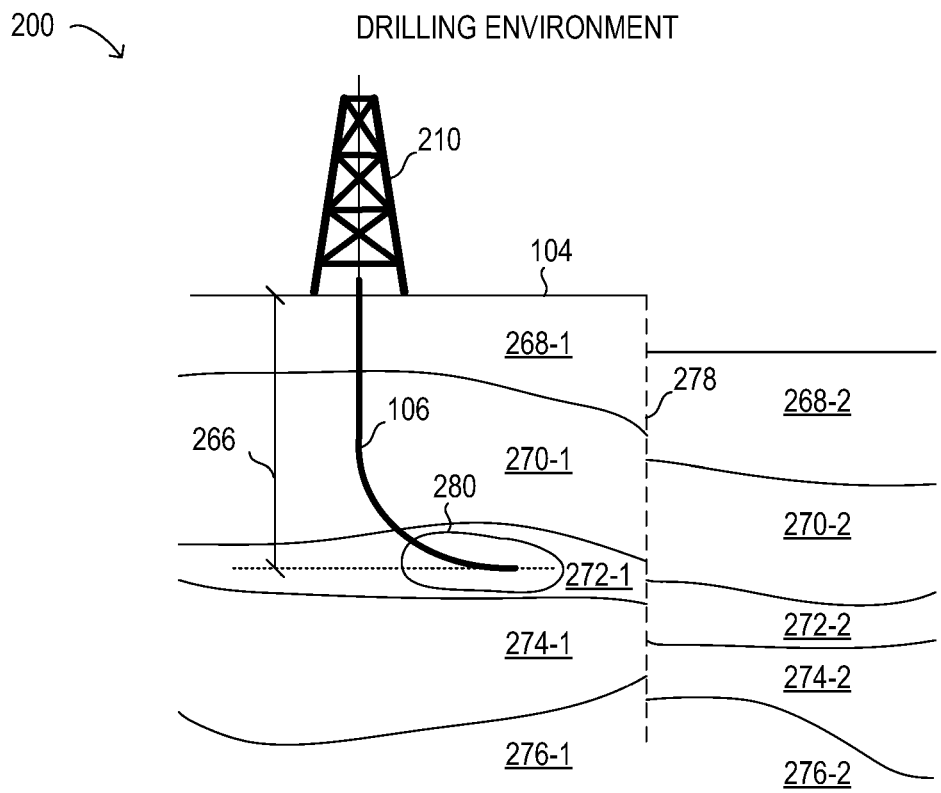
FIG. 2 is a depiction of a drilling environment including the drilling system for drilling a borehole.

Referring now to FIG. 2, a drilling environment 200 is depicted schematically and is not drawn to scale or perspective. In particular, drilling environment 200 may illustrate additional details with respect to formation 102 below the surface 104 in drilling system 100 shown in FIG. 1. In FIG. 2, drilling rig 210 may represent various equipment discussed above with respect to drilling system 100 in FIG. 1 that is located at the surface 104.

In drilling environment 200, it may be assumed that a drill plan (also referred to as a well plan) has been formulated to drill borehole 106 extending into the ground to a true vertical depth (TVD) 266 and penetrating several subterranean strata layers. Borehole 106 is shown in FIG. 2 extending through strata layers 268-1 and 270-1, while terminating in strata layer 272-1. Accordingly, as shown, borehole 106 does not extend or reach underlying strata layers 274-1 and 276-1. A target area 280 specified in the drill plan may be located in strata layer 272-1 as shown in FIG. 2. Target area 280 may represent a desired endpoint of borehole 106, such as a hydrocarbon producing area indicated by strata layer 272-1. It is noted that target area 280 may be of any shape and size, and may be defined using various different methods and information in different embodiments. In some instances, target area 280 may be specified in the drill plan using subsurface coordinates, or references to certain markers, that indicate where borehole 106 is to be terminated. In other instances, target area may be specified in the drill plan using a depth range within which borehole 106 is to remain. For example, the depth range may correspond to strata layer 272-1. In other examples, target area 280 may extend as far as can be realistically drilled. For example, when borehole 106 is specified to have a horizontal section with a goal to extend into strata layer 172 as far as possible, target area 280 may be defined as strata layer 272-1 itself and drilling may continue until some other physical limit is reached, such as a property boundary or a physical limitation to the length of the drill string.

Also visible in FIG. 2 is a fault line 278 that has resulted in a subterranean discontinuity in the fault structure. Specifically, strata layers 268 (-1/-2), 270 (-1/-2), 272 (-1/-2), 274 (-1/-2), and 276 (-1/-2) have portions on either side of fault line 278. On one side of fault line 278, where borehole 106 is located, strata layers 268-1, 270-1, 272-1, 274-1, and 276-1 are unshifted by fault line 278. On the other side of fault line 278, strata layers 268-2, 270-2, 272-2, 274-2, and 276-2 are shifted downwards by fault line 278.

Current drilling operations frequently include directional drilling to reach a target, such as target area 280. The use of directional drilling has been found to generally increase an overall amount of production volume per well, but also may lead to significantly higher production rates per well, which are both economically desirable. As shown in FIG. 2, directional drilling may be used to drill the horizontal portion of borehole 106, which increases an exposed length of borehole 106 within strata layer 272-1, and which may accordingly be beneficial for hydrocarbon extraction from strata layer 272-1. Directional drilling may also be used alter an angle of borehole 106 to accommodate subterranean faults, such as indicated by fault line 278 in FIG. 2. Other benefits that may be achieved using directional drilling include sidetracking off of an existing well to reach a different target area or a missed target area, drilling around abandoned drilling equipment, drilling into otherwise inaccessible or difficult to reach locations (e.g., under populated areas or bodies of water), providing a relief well for an existing well, and increasing the capacity of a well by branching off and having multiple boreholes extending in different directions or at different vertical positions for the same well. Directional drilling is often not limited to a straight horizontal borehole 106, but may involve staying within a strata layer that varies in depth and thickness as illustrated by strata layer 172. As such, directional drilling may involve multiple vertical adjustments that complicate the trajectory of borehole 106.

Figure 3:
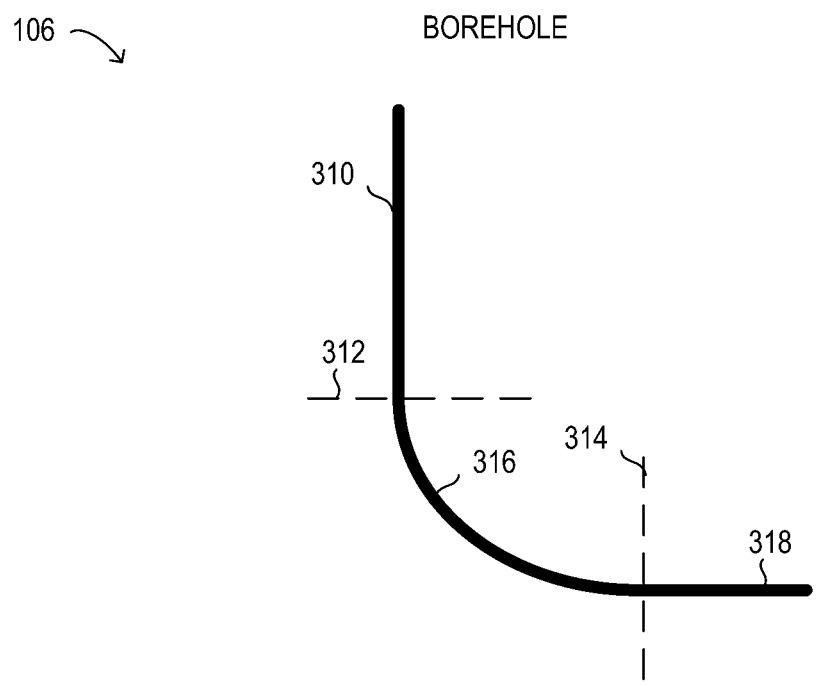
FIG. 3 is a depiction of a borehole generated in the drilling environment.

Referring now to FIG. 3, one embodiment of a portion of borehole 106 is shown in further detail. Using directional drilling for horizontal drilling may introduce certain challenges or difficulties that may not be observed during vertical drilling of borehole 106. For example, a horizontal portion 318 of borehole 106 may be started from a vertical portion 310. In order to make the transition from vertical to horizontal, a curve may be defined that specifies a so-called "build up" section 316. Build up section 316 may begin at a kick off point 312 in vertical portion 310 and may end at a begin point 314 of horizontal portion 318. The change in inclination in build up section 316 per measured length drilled is referred to herein as a "build rate" and may be defined in degrees per one hundred feet drilled. For example, the build rate may have a value of 6°/100 ft., indicating that there is a six degree change in inclination for every one hundred feet drilled. The build rate for a particular build up section may remain relatively constant or may vary.

The build rate used for any given build up section may depend on various factors, such as properties of the formation (i.e., strata layers) through which borehole 106 is to be drilled, the trajectory of borehole 106, the particular pipe and drill collars/BHA components used (e.g., length, diameter, flexibility, strength, mud motor bend setting, and drill bit), the mud type and flow rate, the specified horizontal displacement, stabilization, and inclination, among other factors. An overly aggressive built rate can cause problems such as severe doglegs (e.g., sharp changes in direction in the borehole) that may make it difficult or impossible to run casing or perform other operations in borehole 106. Depending on the severity of any mistakes made during directional drilling, borehole 106 may be enlarged or drill bit 146 may be backed out of a portion of borehole 106 and redrilled along a different path. Such mistakes may be undesirable due to the additional time and expense involved. However, if the built rate is too cautious, additional overall time may be added to the drilling process, because directional drilling generally involves a lower ROP than straight drilling. Furthermore, directional drilling for a curve is more complicated than vertical drilling and the possibility of drilling errors increases with directional drilling (e.g., overshoot and undershoot that may occur while trying to keep drill bit 148 on the planned trajectory).

Two modes of drilling, referred to herein as "rotating" and "sliding", are commonly used to form borehole 106. Rotating, also called "rotary drilling", uses top drive 140 or rotary table 162 to rotate drill string 146. Rotating may be used when drilling occurs along a straight trajectory, such as for vertical portion 310 of borehole 106. Sliding, also called "steering" or "directional drilling" as noted above, typically uses a mud motor located downhole at BHA 149. The mud motor may have an adjustable bent housing and is not powered by rotation of the drill string. Instead, the mud motor uses hydraulic power derived from the pressurized drilling mud that circulates along borehole 106 to and from the surface 104 to directionally drill borehole 106 in build up section 316.

Thus, sliding is used in order to control the direction of the well trajectory during directional drilling. A method to perform a slide may include the following operations. First, during vertical or straight drilling, the rotation of drill string 146 is stopped. Based on feedback from measuring equipment, such as from downhole tool 166, adjustments may be made to drill string 146, such as using top drive 140 to apply various combinations of torque, WOB, and vibration, among other adjustments. The adjustments may continue until a toolface is confirmed that indicates a direction of the bend of the mud motor is oriented to a direction of a desired deviation (i.e., build rate) of borehole 106. Once the desired orientation of the mud motor is attained, WOB to the drill bit is increased, which causes the drill bit to move in the desired direction of deviation. Once sufficient distance and angle have been built up in the curved trajectory, a transition back to rotating mode can be accomplished by rotating the drill string again. The rotation of the drill string after sliding may neutralize the directional deviation caused by the bend in the mud motor due to the continuous rotation around a centerline of borehole 106.

Figure 4:
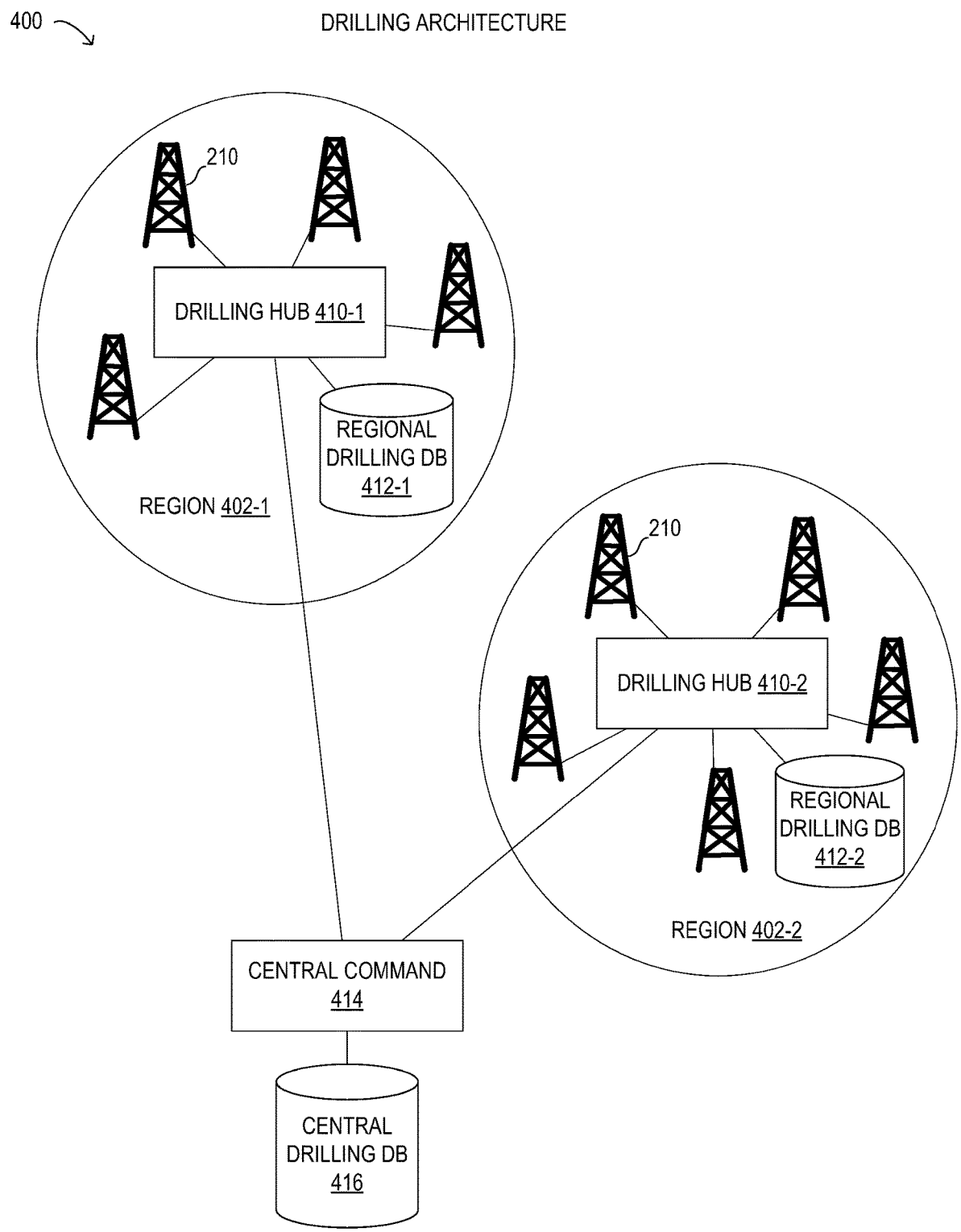
FIG. 4 is a depiction of a drilling architecture including the drilling environment.

Referring now to FIG. 4, a drilling architecture 400 is illustrated in diagram form. As shown, drilling architecture 400 depicts a hierarchical arrangement of drilling hubs 410-1 and 410-2 and a central command 414, to support the operation of a plurality of drilling rigs 210 in different regions 402-1 and 402-2. Specifically, as described above with respect to FIGS. 1 and 2, drilling rig 210 includes geosteering control system 168 that is enabled to perform various drilling control operations locally to drilling rig 210. When geosteering control system 168 is enabled with network connectivity, certain control operations or processing may be requested or queried by geosteering control system 168 from a remote processing resource. As shown in FIG. 4, drilling hubs 410-1 and 410-2 represent a remote processing resource for geosteering control system 168 located at respective regions 402-1 and 402-2, while central command 414 may represent a remote processing resource for both drilling hub 410-1 and 410-2 and geosteering control system 168.

Specifically, in a region 402-1, a drilling hub 410-1 may serve as a remote processing resource for drilling rigs 210 located in region 402-1, which may vary in number and are not limited to the exemplary schematic illustration of FIG. 4. Additionally, drilling hub 410-1 may have access to a regional drilling DB 412-1, which may be local to drilling hub 410-1. Additionally, in a region 402-2, a drilling hub 410-2 may serve as a remote processing resource for drilling rigs 210 located in region 402-2, which may vary in number and are not limited to the exemplary schematic illustration of FIG. 4. Additionally, drilling hub 410-2 may have access to a regional drilling DB 412-2, which may be local to drilling hub 410-2.

In FIG. 4, respective regions 402-1 and 402-2 may exhibit the same or similar geological formations. Thus, reference wells, or offset wells, may exist in a vicinity of a given drilling rig 210 in regions 402-1 and 402-2, or where a new well is planned in regions 402-1 and 402-2. Furthermore, multiple drilling rigs 210 may be actively drilling concurrently in regions 402-1 and 402-2, and may be in different stages of drilling through the depths of formation strata layers at regions 402-1 and 402-2. Thus, for any given well being drilled by drilling rig 210 in a regions 402-1 and 402-2, survey data from the reference wells or offset wells may be used to create the drill plan, and may be used for geosteering methods and systems for improved drilling performance, as disclosed herein. In some implementations, survey data or reference data from a plurality of reference wells may be used to improve drilling performance, such as by reducing an error in estimating TVD or a position of BHA 149 relative to one or more strata layers, as will be described in further detail herein. Additionally, survey data from recently drilled wells, or wells still currently being drilled, including the same well, may be used for reducing an error in estimating TVD or a position of BHA 149 relative to one or more strata layers.

Also shown in FIG. 4 is central command 414, which has access to central drilling DB 416, and may be located at a centralized command center that is in communication with drilling hubs 410-1 and 410-2 and drilling rigs 210 in various regions 402-1 and 402-2. The centralized command center may have the ability to monitor drilling and equipment activity at any one or more drilling rigs 210. In some embodiments, central command 414 and drilling hubs 412-1 and 412-2 may be operated by a commercial operator of drilling rigs 210 as a service to customers who have hired the commercial operator to drill wells and provide other drilling-related services.

In FIG. 4, it is particularly noted that central drilling DB 416 may be a central repository that is accessible to drilling hubs 410-1 and 410-2 and drilling rigs 210. Accordingly, central drilling DB 416 may store information for various drilling rigs 210 in different regions 402-1 and 402-2. In some embodiments, central drilling DB 416 may serve as a backup for at least one regional drilling DB 412-1 and 412-2, or may otherwise redundantly store information that is also stored on at least one regional drilling DB 412-1 and 412-2. In turn, regional drilling DBs 412-1 and 412-2 may serve as a backup or redundant storage for at least one drilling rig 210 in regions 402-1 and 402-2. For example, regional drilling DB 412-1 and 412-2 may store information collected by geosteering control system 168 from drilling rig 210.

In some embodiments, the formulation of a drill plan for drilling rig 210 may include processing and analyzing the collected data in regional drilling DB 412-1 and 412-2 to create a more effective drill plan. Furthermore, once the drilling has begun, the collected data may be used in conjunction with current data from drilling rig 210 to improve drilling decisions. As noted, the functionality of geosteering control system 168 may be provided at drilling rig 210, or may be provided, at least in part, at a remote processing resource, such as drilling hubs 410-1 and 410-2 or central command 414.

As noted, geosteering control system 168 may provide functionality as a surface steerable system for controlling drilling rig 210. Geosteering control system 168 may have access to regional drilling DB 412 and central drilling DB 416 to provide the surface steerable system functionality. As will be described in greater detail below, geosteering control system 168 may be used to plan and control drilling operations based on input information, including feedback from the drilling process itself. Geosteering control system 168 may be used to perform operations such as receiving drilling data representing a drill trajectory and other drilling parameters, calculating a drilling solution for the drill trajectory based on the received data and other available data (e.g., rig characteristics), implementing the drilling solution at drilling rig 210, monitoring the drilling process to gauge whether the drilling process is within a margin of error that is defined for the drill trajectory, or calculating corrections for the drilling process if the drilling process is outside of the margin of error.

Figure 5:
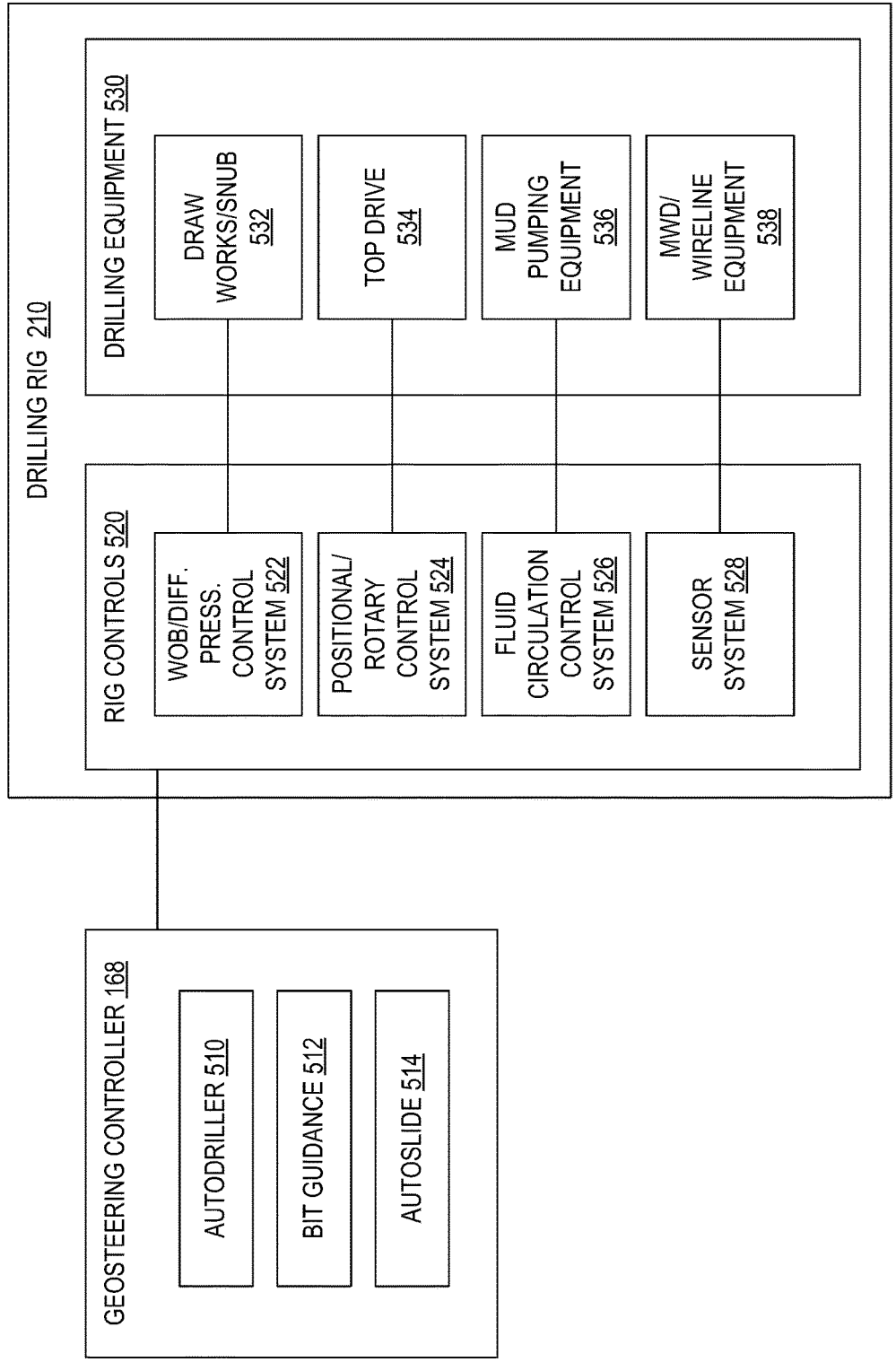
FIG. 5 is a depiction of rig control systems included in the drilling system.

Referring now to FIG. 5, an example of rig control systems 500 is illustrated in schematic form. It is noted that rig control systems 500 may include fewer or more elements than shown in FIG. 5 in different embodiments. As shown, rig control systems 500 includes geosteering control system 168 and drilling rig 210. Specifically, geosteering control system 168 is shown with logical functionality including an autodriller 510, a bit guidance 512, and an autoslide 514. Drilling rig 210 is hierarchically shown including rig controls 520, which provide secure control logic and processing capability, along with drilling equipment 530, which represents the physical equipment used for drilling at drilling rig 210. As shown, rig controls 520 include WOB/differential pressure control system 522, positional/rotary control system 524, fluid circulation control system 526, and sensor system 528, while drilling equipment 530 includes a draw works/snub 532, top drive 140, mud pumping equipment 536, and MWD/wireline equipment 538.

Figure 10:
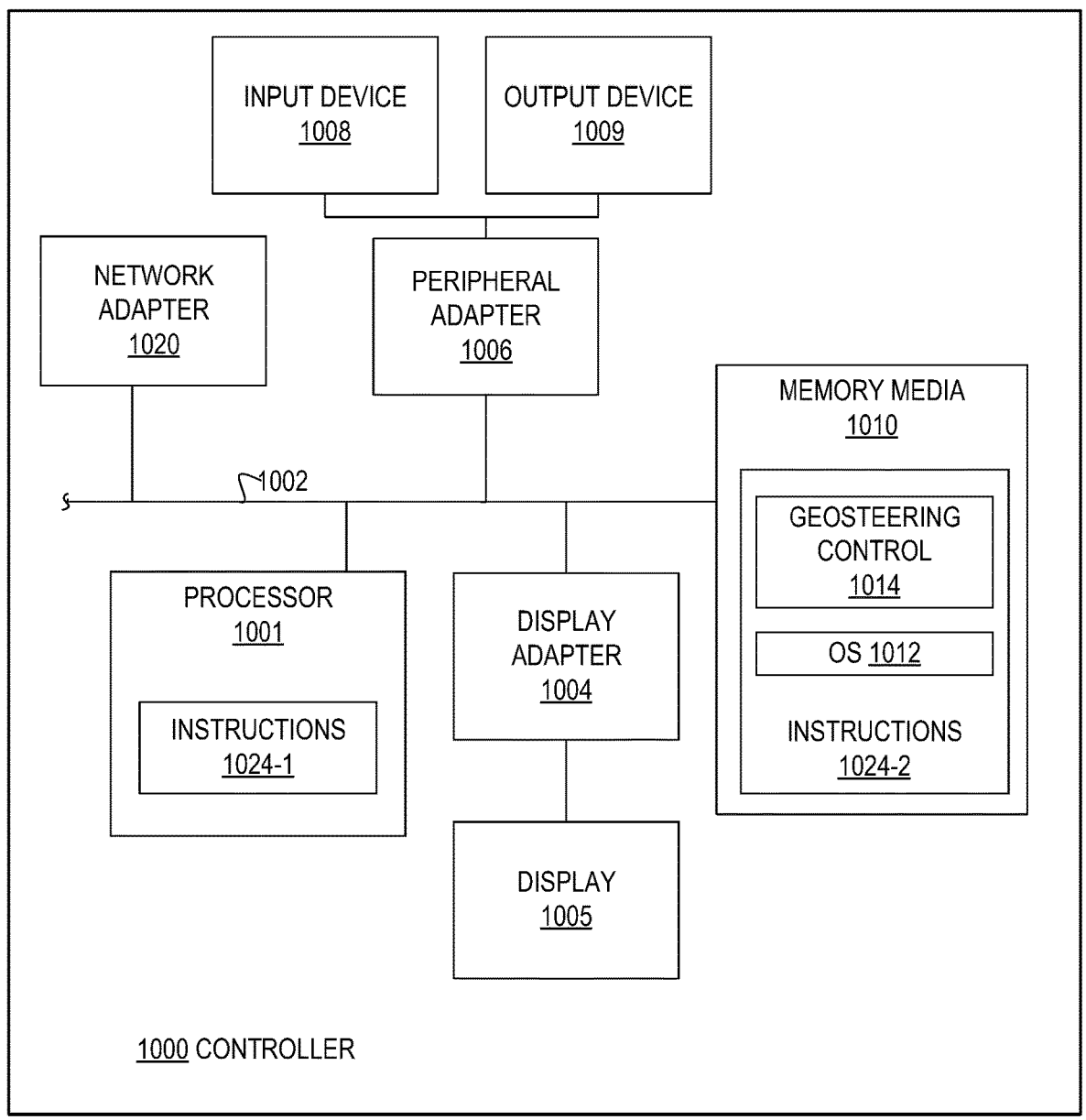
FIG. 10 is a depiction of a controller usable by the rig control systems.

Geosteering control system 168 represent an instance of a processor having an accessible memory storing instructions executable by the processor, such as an instance of controller 1000 shown in FIG. 10. Also, WOB/differential pressure control system 522, positional/rotary control system 524, and fluid circulation control system 526 may each represent an instance of a processor having an accessible memory storing instructions executable by the processor, such as an instance of controller 1000 shown in FIG. 10, but for example, in a configuration as a programmable logic controller (PLC) that may not include a user interface but may be used as an embedded controller. Accordingly, it is noted that each of the systems included in rig controls 520 may be a separate controller, such as a PLC, and may autonomously operate, at least to a degree. Geosteering control system 168 may represent hardware that executes instructions to implement a surface steerable system that provides feedback and automation capability to an operator, such as a driller. For example, geosteering control system 168 may cause autodriller 510, bit guidance 512 (also referred to as a bit guidance system (BGS)), and autoslide 514 (among others, not shown) to be activated and executed at an appropriate time during drilling. In particular implementations, geosteering control system 168 may be enabled to provide a user interface during drilling, such as the user interface 850 depicted and described below with respect to FIG. 8. Accordingly, geosteering control system 168 may interface with rig controls 520 to facilitate manual, assisted manual, semi-automatic, and automatic operation of drilling equipment 530 included in drilling rig 210. It is noted that rig controls 520 may also accordingly be enabled for manual or user-controlled operation of drilling, and may include certain levels of automation with respect to drilling equipment 530.

In rig control systems 500 of FIG. 5, WOB/differential pressure control system 522 may be interfaced with draw works/snubbing unit 532 to control WOB of drill string 146. Positional/rotary control system 524 may be interfaced with top drive 140 to control rotation of drill string 146. Fluid circulation control system 526 may be interfaced with mud pumping equipment 536 to control mud flow and may also receive and decode mud telemetry signals. Sensor system 528 may be interfaced with MWD/wireline equipment 538, which may represent various BHA sensors and instrumentation equipment, among other sensors that may be downhole or at the surface.

In rig control systems 500, autodriller 510 may represent an automated rotary drilling system and may be used for controlling rotary drilling. Accordingly, autodriller 510 may enable automate operation of rig controls 520 during rotary drilling, as indicated in the drill plan. Bit guidance 512 may represent an automated control system to monitor and control performance and operation drilling bit 148.

In rig control systems 500, autoslide 514 may represent an automated slide drilling system and may be used for controlling slide drilling. Accordingly, autoslide 514 may enable automate operation of rig controls 520 during a slide, and may return control to geosteering control system 168 for rotary drilling at an appropriate time, as indicated in the drill plan. In particular implementations, autoslide 514 may be enabled to provide a user interface during slide drilling to specifically monitor and control the slide. For example, autoslide 514 may rely on bit guidance 512 for orienting a toolface and on autodriller 510 to set WOB or control rotation or vibration of drill string 146.

Figure 6:
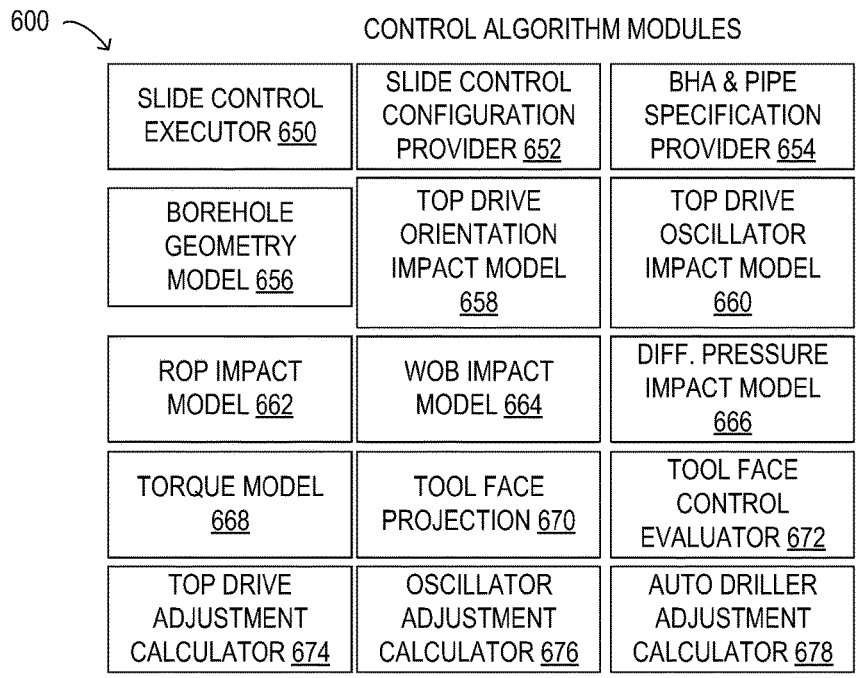
FIG. 6 is a depiction of algorithm modules used by the rig control systems.

FIG. 6 illustrates one embodiment of control algorithm modules 600 used with geosteering control system 168. The control algorithm modules 600 of FIG. 6 include: a slide control executor 650 that is responsible for managing the execution of the slide control algorithms; a slide control configuration provider 652 that is responsible for validating, maintaining, and providing configuration parameters for the other software modules; a BHA & pipe specification provider 654 that is responsible for managing and providing details of BHA 149 and drill string 146 characteristics; a borehole geometry model 656 that is responsible for keeping track of the borehole geometry and providing a representation to other software modules; a top drive orientation impact model 658 that is responsible for modeling the impact that changes to the angular orientation of top drive 140 have had on the toolface control; a top drive oscillator impact model 660 that is responsible for modeling the impact that oscillations of top drive 140 has had on the toolface control; an ROP impact model 662 that is responsible for modeling the effect on the toolface control of a change in ROP or a corresponding ROP set point; a WOB impact model 664 that is responsible for modeling the effect on the toolface control of a change in WOB or a corresponding WOB set point; a differential pressure impact model 666 that is responsible for modeling the effect on the toolface control of a change in differential pressure (DP) or a corresponding DP set point; a torque model 668 that is responsible for modeling the comprehensive representation of torque for surface, downhole, break over, and reactive torque, modeling impact of those torque values on toolface control, and determining torque operational thresholds; a toolface control evaluator 672 that is responsible for evaluating all factors impacting toolface control and whether adjustments need to be projected, determining whether re-alignment off-bottom is indicated, and determining off-bottom toolface operational threshold windows; a toolface projection 670 that is responsible for projecting toolface behavior for top drive 140, the top drive oscillator, and auto driller adjustments; a top drive adjustment calculator 674 that is responsible for calculating top drive adjustments resultant to toolface projections; an oscillator adjustment calculator 676 that is responsible for calculating oscillator adjustments resultant to toolface projections; and an autodriller adjustment calculator 678 that is responsible for calculating adjustments to autodriller 510 resultant to toolface projections.

Figure 7:
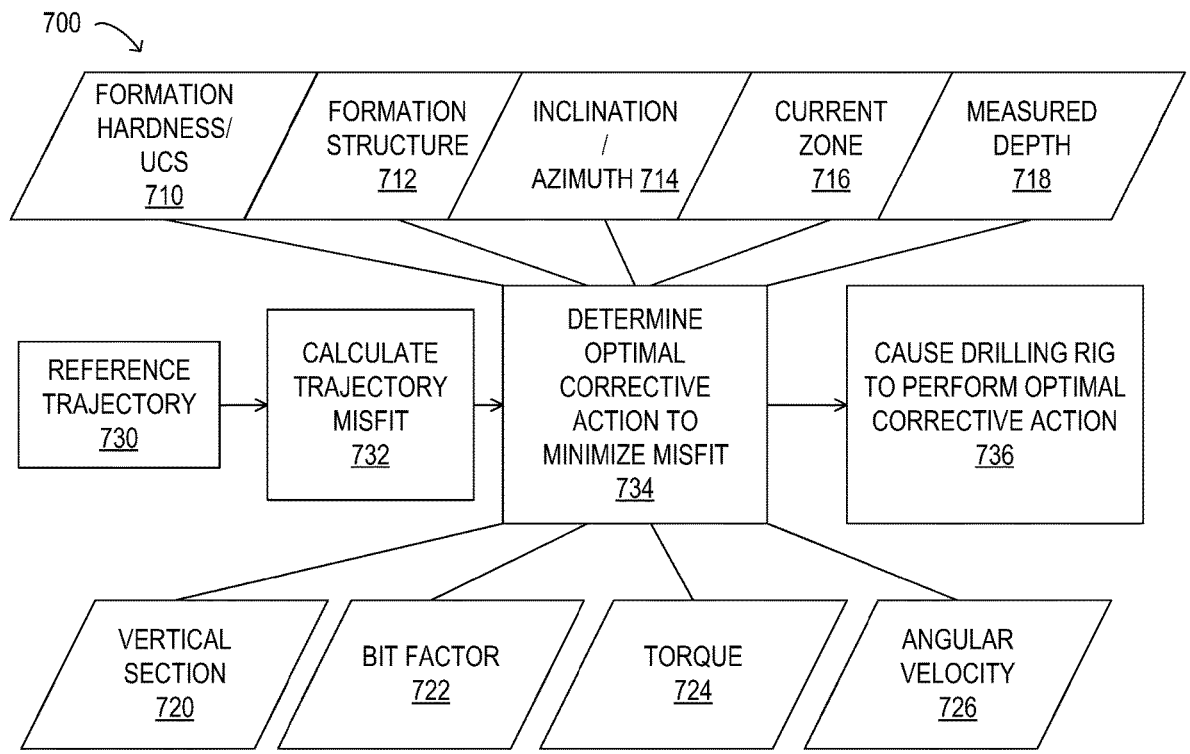
FIG. 7 is a depiction of a geosteering control process used by the rig control systems.

FIG. 7 illustrates one embodiment of a geosteering control process 700 for determining an optimal corrective action for drilling. Geosteering control process 700 may be used for rotary drilling or slide drilling in different embodiments.

Geosteering control process 700 in FIG. 7 illustrates a variety of inputs that can be used to determine an optimum corrective action. As shown in FIG. 7, the inputs include formation hardness/unconfined compressive strength (UCS) 710, formation structure 712, inclination/azimuth 714, current zone 716, measured depth 718, desired toolface 730, vertical section 720, bit factor 722, mud motor torque 724, reference trajectory 730, and angular velocity 726. In FIG. 7, reference trajectory 730 of borehole 106 is determined to calculate a trajectory misfit in a step 732. Step 732 may output the trajectory misfit to determine an optimal corrective action to minimize the misfit at step 734, which may be performed using the other inputs described above. Then, at step 736, the drilling rig is caused to perform the optimal corrective action.

It is noted that in some implementations, at least certain portions of geosteering control process 700 may be automated or performed without user intervention, such as using rig control systems 700 (see FIG. 7). In other implementations, the optimal corrective action in step 736 may be provided or communicated (by display, SMS message, email, or otherwise) to one or more human operators, who may then take appropriate action. The human operators may be members of a rig crew, which may be located at or near drilling rig 210, or may be located remotely from drilling rig 210.

Figure 8:
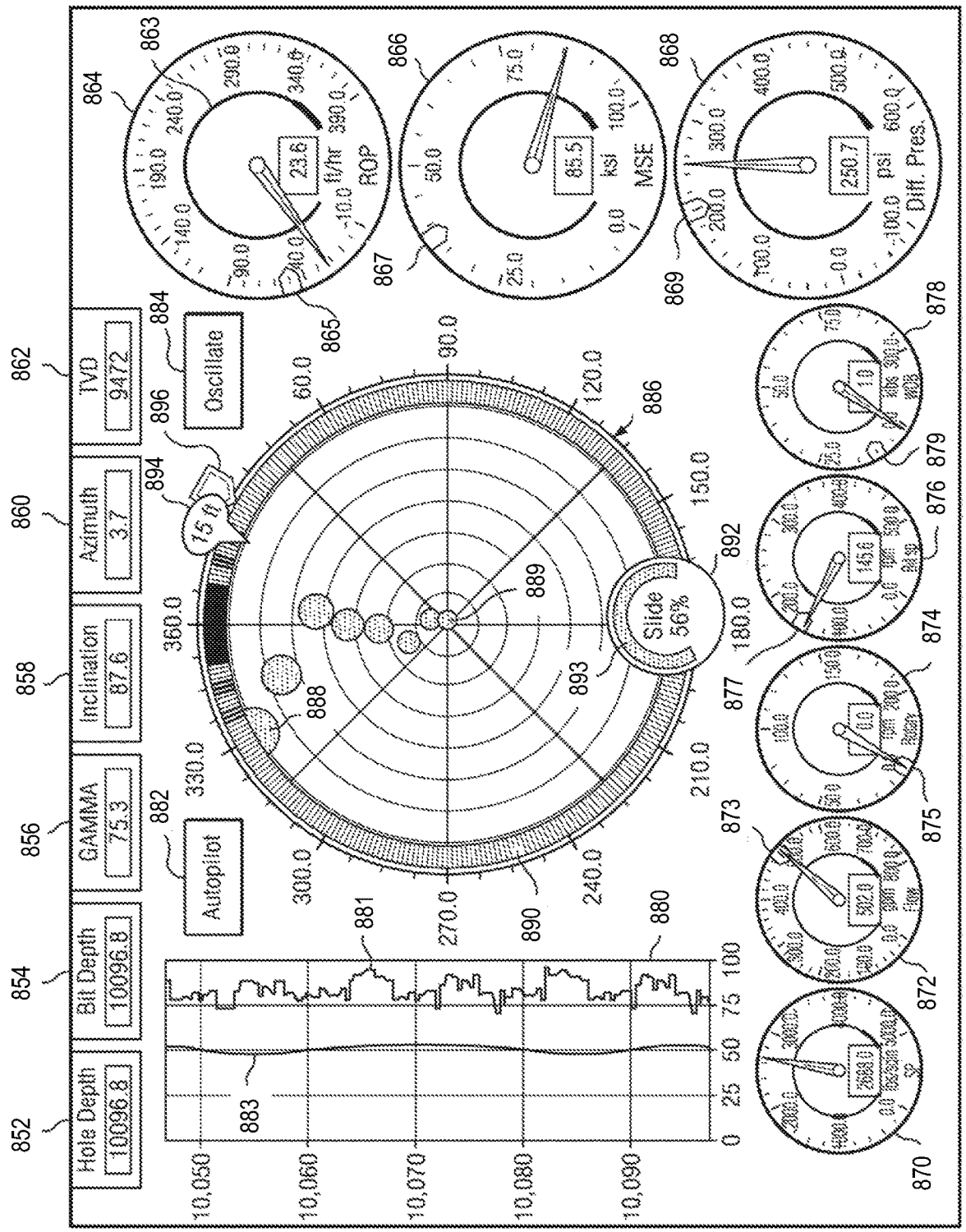
FIG. 8 is a depiction of a geosteering graphical user interface provided by the rig control systems.

Referring to FIG. 8, one embodiment of a user interface 850 that may be generated by geosteering control system 168 for monitoring and operation by a human operator is illustrated. User interface 850 may provide many different types of information in an easily accessible format. For example, user interface 850 may be shown on a computer monitor, a television, a viewing screen (e.g., a display device) associated with geosteering control system 168. In some embodiments, at least certain portions of user interface 850 may be displayed to and operated by a user of geosteering control system 168 on a mobile device, such as a tablet or a smartphone (see also FIG. 10). For example, geosteering control system 168 may support mobile applications that enable user interface 850, or other user interfaces, to be used on the mobile device, for example, within a vicinity of drilling rig 210.

As shown in FIG. 8, user interface 850 provides visual indicators such as a hole depth indicator 852, a bit depth indicator 854, a GAMMA indicator 856, an inclination indicator 858, an azimuth indicator 860, and a TVD indicator 862. Other indicators may also be provided, including a ROP indicator 864, a mechanical specific energy (MSE) indicator 866, a differential pressure indicator 868, a standpipe pressure indicator 870, a flow rate indicator 872, a rotary RPM (angular velocity) indicator 874, a bit speed indicator 876, and a WOB indicator 878.

In FIG. 8, at least some of indicators 864, 866, 868, 870, 872, 874, 876, and 878 may include a marker representing a target value. For example, markers may be set as certain given values, but it is noted that any desired target value may be used. Although not shown, in some embodiments, multiple markers may be present on a single indicator. The markers may vary in color or size. For example, ROP indicator 864 may include a marker 865 indicating that the target value is 50 feet/hour (or 15 m/h). MSE indicator 866 may include a marker 867 indicating that the target value is 37 ksi (or 255 MPa). Differential pressure indicator 868 may include a marker 869 indicating that the target value is 200 psi (or 1,380 kPa). ROP indicator 864 may include a marker 865 indicating that the target value is 50 feet/hour (or 15 m/h). Standpipe pressure indicator 870 may have no marker in the present example. Flow rate indicator 872 may include a marker 873 indicating that the target value is 500 gpm (or 31.5 L/s). Rotary RPM indicator 874 may include a marker 875 indicating that the target value is 0 RPM (e.g., due to sliding). Bit speed indicator 876 may include a marker 877 indicating that the target value is 150 RPM. WOB indicator 878 may include a marker 879 indicating that the target value is 10 klbs (or 4,500 kg). Each indicator may also include a colored band, or another marking, to indicate, for example, whether the respective gauge value is within a safe range (e.g., indicated by a green color), within a caution range (e.g., indicated by a yellow color), or within a danger range (e.g., indicated by a red color).

In FIG. 8, a log chart 880 may visually indicate depth versus one or more measurements (e.g., may represent log inputs relative to a progressing depth chart). For example, log chart 880 may have a Y-axis representing depth and an X-axis representing a measurement such as GAMMA count 881 (as shown), ROP 883 (e.g., empirical ROP and normalized ROP), or resistivity. An autopilot button 882 and an oscillate button 884 may be used to control activity. For example, autopilot button 882 may be used to engage or disengage autodriller 510, while oscillate button 884 may be used to directly control oscillation of drill string 146 or to engage/disengage an external hardware device or controller.

In FIG. 8, a circular chart 886 may provide current and historical toolface orientation information (e.g., which way the bend is pointed). For purposes of illustration, circular chart 886 represents three hundred and sixty degrees. A series of circles within circular chart 886 may represent a timeline of toolface orientations, with the sizes of the circles indicating the temporal position of each circle. For example, larger circles may be more recent than smaller circles, so a largest circle 888 may be the newest reading and a smallest circle 889 may be the oldest reading. In other embodiments, circles 889, 888 may represent the energy or progress made via size, color, shape, a number within a circle, etc. For example, a size of a particular circle may represent an accumulation of orientation and progress for the period of time represented by the circle. In other embodiments, concentric circles representing time (e.g., with the outside of circular chart 886 being the most recent time and the center point being the oldest time) may be used to indicate the energy or progress (e.g., via color or patterning such as dashes or dots rather than a solid line).

In user interface 850, circular chart 886 may also be color coded, with the color coding existing in a band 890 around circular chart 886 or positioned or represented in other ways. The color coding may use colors to indicate activity in a certain direction. For example, the color red may indicate the highest level of activity, while the color blue may indicate the lowest level of activity. Furthermore, the arc range in degrees of a color may indicate the amount of deviation. Accordingly, a relatively narrow (e.g., thirty degrees) arc of red with a relatively broad (e.g., three hundred degrees) arc of blue may indicate that most activity is occurring in a particular toolface orientation with little deviation. As shown in user interface 850, the color blue may extend from approximately 22-337 degrees, the color green may extend from approximately 15-22 degrees and 337-345 degrees, the color yellow may extend a few degrees around the 13 and 345 degree marks, while the color red may extend from approximately 347-10 degrees. Transition colors or shades may be used with, for example, the color orange marking the transition between red and yellow or a light blue marking the transition between blue and green. This color coding may enable user interface 850 to provide an intuitive summary of how narrow the standard deviation is and how much of the energy intensity is being expended in the proper direction. Furthermore, the center of energy may be viewed relative to the target. For example, user interface 850 may clearly show that the target is at 90 degrees but the center of energy is at 45 degrees.

In user interface 850, other indicators, such as a slide indicator 892, may indicate how much time remains until a slide occurs or how much time remains for a current slide. For example, slide indicator 892 may represent a time, a percentage (e.g., as shown, a current slide may be 56% complete), a distance completed, or a distance remaining. Slide indicator 892 may graphically display information using, for example, a colored bar 893 that increases or decreases with slide progress. In some embodiments, slide indicator 892 may be built into circular chart 886 (e.g., around the outer edge with an increasing/decreasing band), while in other embodiments slide indicator 892 may be a separate indicator such as a meter, a bar, a gauge, or another indicator type. In various implementations, slide indicator 892 may be refreshed by autoslide 514.

In user interface 850, an error indicator 894 may indicate a magnitude and a direction of error. For example, error indicator 894 may indicate that an estimated drill bit position is a certain distance from the planned trajectory, with a location of error indicator 894 around the circular chart 886 representing the heading. For example, FIG. 8 illustrates an error magnitude of 15 feet and an error direction of 15 degrees. Error indicator 894 may be any color but may be red for purposes of example. It is noted that error indicator 894 may present a zero if there is no error. Error indicator may represent that drill bit 148 is on the planned trajectory using other means, such as being a green color. Transition colors, such as yellow, may be used to indicate varying amounts of error. In some embodiments, error indicator 894 may not appear unless there is an error in magnitude or direction. A marker 896 may indicate an ideal slide direction. Although not shown, other indicators may be present, such as a bit life indicator to indicate an estimated lifetime for the current bit based on a value such as time or distance.

It is noted that user interface 850 may be arranged in many different ways. For example, colors may be used to indicate normal operation, warnings, and problems. In such cases, the numerical indicators may display numbers in one color (e.g., green) for normal operation, may use another color (e.g., yellow) for warnings, and may use yet another color (e.g., red) when a serious problem occurs. The indicators may also flash or otherwise indicate an alert. The gauge indicators may include colors (e.g., green, yellow, and red) to indicate operational conditions and may also indicate the target value (e.g., an ROP of 100 feet/hour). For example, ROP indicator 868 may have a green bar to indicate a normal level of operation (e.g., from 10-300 feet/hour), a yellow bar to indicate a warning level of operation (e.g., from 300-360 feet/hour), and a red bar to indicate a dangerous or otherwise out of parameter level of operation (e.g., from 360-390 feet/hour). ROP indicator 868 may also display a marker at 100 feet/hour to indicate the desired target ROP.

Furthermore, the use of numeric indicators, gauges, and similar visual display indicators may be varied based on factors such as the information to be conveyed and the personal preference of the viewer. Accordingly, user interface 850 may provide a customizable view of various drilling processes and information for a particular individual involved in the drilling process. For example, geosteering control system 168 may enable a user to customize the user interface 850 as desired, although certain features (e.g., standpipe pressure) may be locked to prevent a user from intentionally or accidentally removing important drilling information from user interface 850. Other features and attributes of user interface 850 may be set by user preference. Accordingly, the level of customization and the information shown by the user interface 850 may be controlled based on who is viewing user interface 850 and their role in the drilling process.

Figure 9:
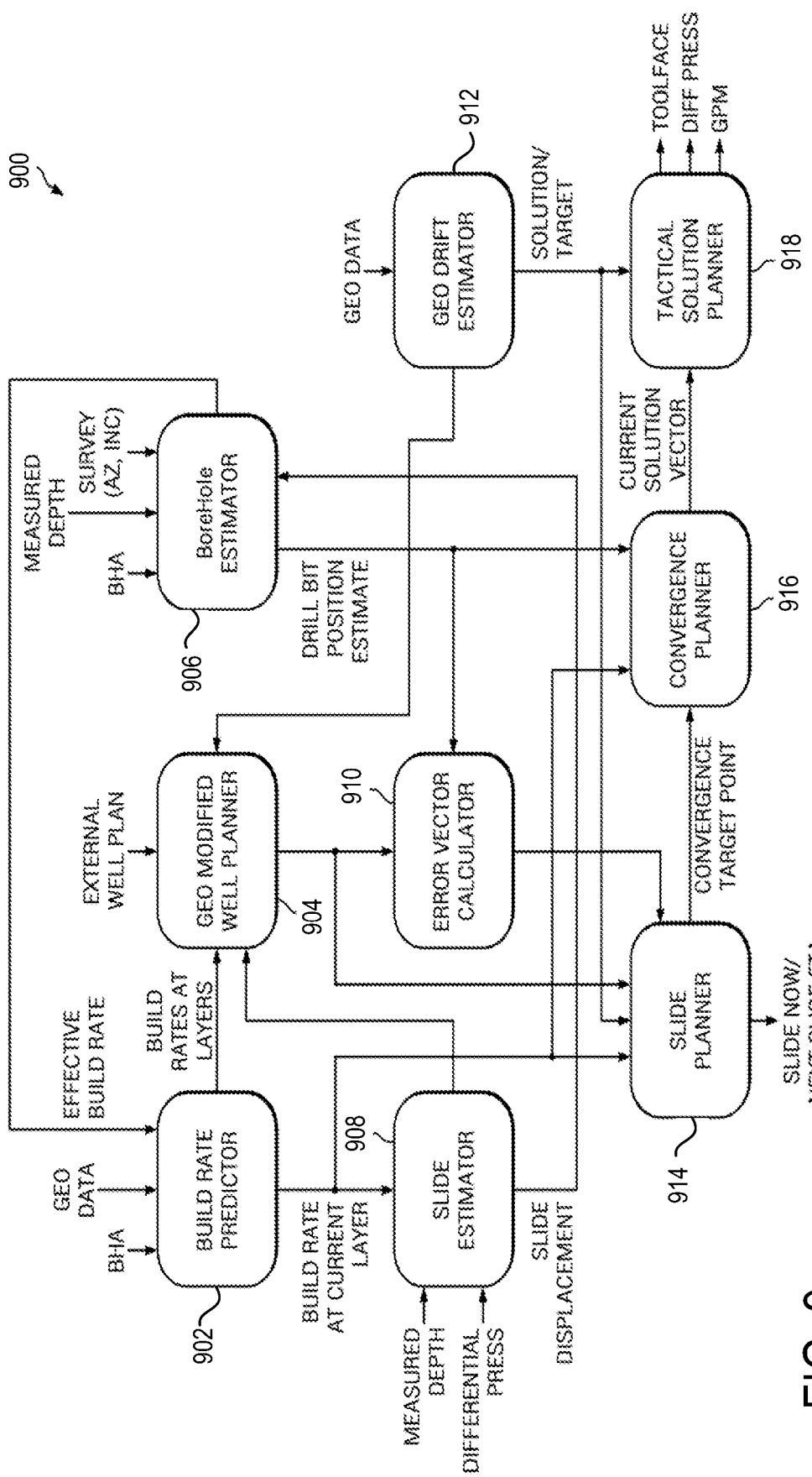
FIG. 9 is a depiction of a guidance control loop performed by the rig control systems.

Referring to FIG. 9, one embodiment of a guidance control loop (GCL) 900 is shown in further detail GCL 900 may represent one example of a control loop or control algorithm executed under the control of geosteering control system 168. GCL 900 may include various functional modules, including a build rate predictor 902, a geo modified well planner 904, a borehole estimator 906, a slide estimator 908, an error vector calculator 910, a geological drift estimator 912, a slide planner 914, a convergence planner 916, and a tactical solution planner 918. In the following description of GCL 900, the term "external input" refers to input received from outside GCL 900, while "internal input" refers to input exchanged between functional modules of GCL 900.

In FIG. 9, build rate predictor 902 receives external input representing BHA information and geological information, receives internal input from the borehole estimator 906, and provides output to geo modified well planner 904, slide estimator 908, slide planner 914, and convergence planner 916. Build rate predictor 902 is configured to use the BHA information and geological information to predict drilling build rates of current and future sections of borehole 106. For example, build rate predictor 902 may determine how aggressively a curve will be built for a given formation with BHA 149 and other equipment parameters.

In FIG. 9, build rate predictor 902 may use the orientation of BHA 149 to the formation to determine an angle of attack for formation transitions and build rates within a single layer of a formation. For example, if a strata layer of rock is below a strata layer of sand, a formation transition exists between the strata layer of sand and the strata layer of rock. Approaching the strata layer of rock at a 90 degree angle may provide a good toolface and a clean drill entry, while approaching the rock layer at a 45 degree angle may build a curve relatively quickly. An angle of approach that is near parallel may cause drill bit 148 to skip off the upper surface of the strata layer of rock. Accordingly, build rate predictor 902 may calculate BHA orientation to account for formation transitions. Within a single strata layer, build rate predictor 902 may use the BHA orientation to account for internal layer characteristics (e.g., grain) to determine build rates for different parts of a strata layer. The BHA information may include bit characteristics, mud motor bend setting, stabilization and mud motor bit to bend distance. The geological information may include formation data such as compressive strength, thicknesses, and depths for formations encountered in the specific drilling location. Such information may enable a calculation-based prediction of the build rates and ROP that may be compared to both results obtained while drilling borehole 106 and regional historical results (e.g., from the regional drilling DB 412) to improve the accuracy of predictions as drilling progresses. Build rate predictor 902 may also be used to plan convergence adjustments and confirm in advance of drilling that targets can be achieved with current parameters.

In FIG. 9, geo modified well planner 904 receives external input representing a drill plan, internal input from build rate predictor 902 and geo drift estimator 912, and provides output to slide planner 914 and error vector calculator 910. Geo modified well planner 904 uses the input to determine whether there is a more optimal trajectory than that provided by the drill plan, while staying within specified error limits. More specifically, geo modified well planner 904 takes geological information (e.g., drift) and calculates whether another trajectory solution to the target may be more efficient in terms of cost or reliability. The outputs of geo modified well planner 904 to slide planner 914 and error vector calculator 910 may be used to calculate an error vector based on the current vector to the newly calculated trajectory and to modify slide predictions. In some embodiments, geo modified well planner 904 (or another module) may provide functionality needed to track a formation trend. For example, in horizontal wells, a geologist may provide geosteering control system 168 with a target inclination as a set point for geosteering control system 168 to control. For example, the geologist may enter a target to geosteering control system 168 of 90.5-91.0 degrees of inclination for a section of borehole 106. Geo modified well planner 904 may then treat the target as a vector target, while remaining within the error limits of the original drill plan. In some embodiments, geo modified well planner 904 may be an optional module that is not used unless the drill plan is to be modified. For example, if the drill plan is marked in geosteering control system 168 as non-modifiable, geo modified well planner 904 may be bypassed altogether or geo modified well planner 904 may be configured to pass the drill plan through without any changes.

In FIG. 9, borehole estimator 906 may receive external inputs representing BHA information, measured depth information, survey information (e.g., azimuth and inclination), and may provide outputs to build rate predictor 902, error vector calculator 910, and convergence planner 916. Borehole estimator 906 may be configured to provide an estimate of the actual borehole and drill bit position and trajectory angle without delay, based on either straight line projections or projections that incorporate sliding. Borehole estimator 906 may be used to compensate for a sensor being physically located some distance behind drill bit 148 (e.g., 50 feet) in drill string 146, which makes sensor readings lag the actual bit location by 50 feet. Borehole estimator 906 may also be used to compensate for sensor measurements that may not be continuous (e.g., a sensor measurement may occur every 100 feet). Borehole estimator 906 may provide the most accurate estimate from the surface to the previous survey location based on the collection of survey measurements. Also, borehole estimator 906 may take the slide estimate from slide estimator 908 (described below) and extend the slide estimate from the previous survey point to a current location of drill bit 148. Using the combination of these two estimates, borehole estimator 906 may provide geosteering control system 168 with an estimate of the drill bit's location and trajectory angle from which guidance and steering solutions can be derived. An additional metric that can be derived from the borehole estimate is the effective build rate that is achieved throughout the drilling process.

In FIG. 9, slide estimator 908 receives external inputs representing measured depth and differential pressure information, receives internal input from build rate predictor 902, and provides output to borehole estimator 906 and geo modified well planner 904. Slide estimator 908 may be configured to sample toolface orientation, differential pressure, measured depth (MD) incremental movement, MSE, and other sensor feedback to quantify/estimate a deviation vector and progress while sliding.

Traditionally, deviation from the slide would be predicted by a human operator based on experience. The operator would, for example, use a long slide cycle to assess what likely was accomplished during the previous slide. However, the results are generally not confirmed until the downhole survey sensor point passes the slide portion of the borehole, often resulting in a response lag defined by a distance of the sensor point from the drill bit tip (e.g., approximately 50 feet). Such a response lag may introduce inefficiencies in the slide cycles due to over/under correction of the actual trajectory relative to the planned trajectory.

In GCL 900, using slide estimator 908, each toolface update may be algorithmically merged with the average differential pressure of the period between the previous and current toolface readings, as well as the MD change during this period to predict the direction, angular deviation, and MD progress during the period. As an example, the periodic rate may be between 10 and 60 seconds per cycle depending on the toolface update rate of downhole tool 166. With a more accurate estimation of the slide effectiveness, the sliding efficiency can be improved. The output of slide estimator 908 may accordingly be periodically provided to borehole estimator 906 for accumulation of well deviation information, as well to geo modified well planner 904. Some or all of the output of the slide estimator 908 may be output to an operator, such as shown in the user interface 850 of FIG. 8.

In FIG. 9, error vector calculator 910 may receive internal input from geo modified well planner 904 and borehole estimator 906. Error vector calculator 910 may be configured to compare the planned well trajectory to an actual borehole trajectory and drill bit position estimate. Error vector calculator 910 may provide the metrics used to determine the error (e.g., how far off) the current drill bit position and trajectory are from the drill plan. For example, error vector calculator 910 may calculate the error between the current bit position and trajectory to the planned trajectory and the desired bit position. Error vector calculator 910 may also calculate a projected bit position/projected trajectory representing the future result of a current error.

In FIG. 9, geological drift estimator 912 receives external input representing geological information and provides outputs to geo modified well planner 904, slide planner 914, and tactical solution planner 918. During drilling, drift may occur as the particular characteristics of the formation affect the drilling direction. More specifically, there may be a trajectory bias that is contributed by the formation as a function of ROP and BHA 149. Geological drift estimator 912 is configured to provide a drift estimate as a vector that can then be used to calculate drift compensation parameters that can be used to offset the drift in a control solution.

In FIG. 9, slide planner 914 receives internal input from build rate predictor 902, geo modified well planner 904, error vector calculator 910, and geological drift estimator 912, and provides output to convergence planner 916 as well as an estimated time to the next slide. Slide planner 914 may be configured to evaluate a slide/drill ahead cost equation and plan for sliding activity, which may include factoring in BHA wear, expected build rates of current and expected formations, and the drill plan trajectory. During drill ahead, slide planner 914 may attempt to forecast an estimated time of the next slide to aid with planning. For example, if additional lubricants (e.g., fluorinated beads) are indicated for the next slide, and pumping the lubricants into drill string 146 has a lead time of 30 minutes before the slide, the estimated time of the next slide may be calculated and then used to schedule when to start pumping the lubricants. Functionality for a loss circulation material (LCM) planner may be provided as part of slide planner 914 or elsewhere (e.g., as a stand-alone module or as part of another module described herein). The LCM planner functionality may be configured to determine whether additives should be pumped into the borehole based on indications such as flow-in versus flow-back measurements. For example, if drilling through a porous rock formation, fluid being pumped into the borehole may get lost in the rock formation. To address this issue, the LCM planner may control pumping LCM into the borehole to clog up the holes in the porous rock surrounding the borehole to establish a more closed-loop control system for the fluid.

In FIG. 9, slide planner 914 may also look at the current position relative to the next connection. A connection may happen every 90 to 100 feet (or some other distance or distance range based on the particulars of the drilling operation) and slide planner 914 may avoid planning a slide when close to a connection or when the slide would carry through the connection. For example, if the slide planner 914 is planning a 50 foot slide but only 20 feet remain until the next connection, slide planner 914 may calculate the slide starting after the next connection and make any changes to the slide parameters to accommodate waiting to slide until after the next connection. Such flexible implementation avoids inefficiencies that may be caused by starting the slide, stopping for the connection, and then having to reorient the toolface before finishing the slide. During slides, slide planner 914 may provide some feedback as to the progress of achieving the desired goal of the current slide. In some embodiments, slide planner 914 may account for reactive torque in the drill string. More specifically, when rotating is occurring, there is a reactional torque wind up in drill string 146. When the rotating is stopped, drill string 146 unwinds, which changes toolface orientation and other parameters. When rotating is started again, drill string 146 starts to wind back up. Slide planner 914 may account for the reactional torque so that toolface references are maintained, rather than stopping rotation and then trying to adjust to an optimal toolface orientation. While not all downhole tools may provide toolface orientation when rotating, using one that does supply such information for GCL 900 may significantly reduce the transition time from rotating to sliding.

In FIG. 9, convergence planner 916 receives internal inputs from build rate predictor 902, borehole estimator 906, and slide planner 914, and provides output to tactical solution planner 918. Convergence planner 916 is configured to provide a convergence plan when the current drill bit position is not within a defined margin of error of the planned well trajectory. The convergence plan represents a path from the current drill bit position to an achievable and optimal convergence target point along the planned trajectory. The convergence plan may take account the amount of sliding/drilling ahead that has been planned to take place by slide planner 914. Convergence planner 916 may also use BHA orientation information for angle of attack calculations when determining convergence plans as described above with respect to build rate predictor 902. The solution provided by convergence planner 916 defines a new trajectory solution for the current position of drill bit 148. The solution may be immediate without delay, or planned for implementation at a future time that is specified in advance.

In FIG. 9, tactical solution planner 918 receives internal inputs from geological drift estimator 912 and convergence planner 916, and provides external outputs representing information such as toolface orientation, differential pressure, and mud flow rate. Tactical solution planner 918 is configured to take the trajectory solution provided by convergence planner 916 and translate the solution into control parameters that can be used to control drilling rig 210. For example, tactical solution planner 918 may convert the solution into settings for control systems 522, 524, and 526 to accomplish the actual drilling based on the solution. Tactical solution planner 918 may also perform performance optimization to optimizing the overall drilling operation as well as optimizing the drilling itself (e.g., how to drill faster).

Other functionality may be provided by GCL 900 in additional modules or added to an existing module. For example, there is a relationship between the rotational position of the drill pipe on the surface and the orientation of the downhole toolface. Accordingly, GCL 900 may receive information corresponding to the rotational position of the drill pipe on the surface. GCL 900 may use this surface positional information to calculate current and desired toolface orientations. These calculations may then be used to define control parameters for adjusting the top drive 140 to accomplish adjustments to the downhole toolface in order to steer the trajectory of borehole 106.

For purposes of example, an object-oriented software approach may be utilized to provide a class-based structure that may be used with GCL 900 or other functionality provided by geosteering control system 168. In GCL 900, a drilling model class may be defined to capture and define the drilling state throughout the drilling process. The drilling model class may include information obtained without delay. The drilling model class may be based on the following components and sub-models: a drill bit model, a borehole model, a rig surface gear model, a mud pump model, a WOB/differential pressure model, a positional/rotary model, an MSE model, an active drill plan, and control limits. The drilling model class may produce a control output solution and may be executed via a main processing loop that rotates through the various modules of GCL 900. The drill bit model may represent the current position and state of drill bit 148. The drill bit model may include a three dimensional (3D) position, a drill bit trajectory, BHA information, bit speed, and toolface (e.g., orientation information). The 3D position may be specified in north-south (NS), east-west (EW), and true vertical depth (TVD). The drill bit trajectory may be specified as an inclination angle and an azimuth angle. The BHA information may be a set of dimensions defining the active BHA. The borehole model may represent the current path and size of the active borehole. The borehole model may include hole depth information, an array of survey points collected along the borehole path, a gamma log, and borehole diameters. The hole depth information is for current drilling of borehole 106. The borehole diameters may represent the diameters of borehole 106 as drilled over current drilling. The rig surface gear model may represent pipe length, block height, and other models, such as the mud pump model, WOB/differential pressure model, positional/rotary model, and MSE model. The mud pump model represents mud pump equipment and includes flow rate, standpipe pressure, and differential pressure. The WOB/differential pressure model represents draw works or other WOB/differential pressure controls and parameters, including WOB. The positional/rotary model represents top drive or other positional/rotary controls and parameters including rotary RPM and spindle position. The active drill plan represents the target borehole path and may include an external drill plan and a modified drill plan. The control limits represent defined parameters that may be set as maximums and/or minimums. For example, control limits may be set for the rotary RPM in the top drive model to limit the maximum RPMs to the defined level. The control output solution may represent the control parameters for drilling rig 210.

Each functional module of GCL 900 may have behavior encapsulated within a respective class definition. During a processing window, the individual functional modules may have an exclusive portion in time to execute and update the drilling model. For purposes of example, the processing order for the functional modules may be in the sequence of geo modified well planner 904, build rate predictor 902, slide estimator 908, borehole estimator 906, error vector calculator 910, slide planner 914, convergence planner 916, geological drift estimator 912, and tactical solution planner 918. It is noted that other sequences may be used in different implementations.

In FIG. 9, GCL 900 may rely on a programmable timer module that provides a timing mechanism to provide timer event signals to drive the main processing loop. While geosteering control system 168 may rely on timer and date calls driven by the programming environment, timing may be obtained from other sources than system time. In situations where it may be advantageous to manipulate the clock (e.g., for evaluation and testing), a programmable timer module may be used to alter the system time. For example, the programmable timer module may enable a default time set to the system time and a time scale of 1.0, may enable the system time of geosteering control system 168 to be manually set, may enable the time scale relative to the system time to be modified, or may enable periodic event time requests scaled to a requested time scale.

Referring now to FIG. 10, a block diagram illustrating selected elements of an embodiment of a controller 1000 for performing geosteering methods and systems for improved drilling performance according to the present disclosure. In various embodiments, controller 1000 may represent an implementation of geosteering control system 168. In other embodiments, at least certain portions of controller 1000 may be used for control systems 510, 512, 514, 522, 524, and 526 (see FIG. 5).

In the embodiment depicted in FIG. 10, controller 1000 includes processor 1001 coupled via shared bus 1002 to storage media collectively identified as memory media 1010.

Controller 1000, as depicted in FIG. 10, further includes network adapter 1020 that interfaces controller 1000 to a network (not shown in FIG. 10). In embodiments suitable for use with user interfaces, controller 1000, as depicted in FIG. 10, may include peripheral adapter 1006, which provides connectivity for the use of input device 1008 and output device 1009. Input device 1008 may represent a device for user input, such as a keyboard or a mouse, or even a video camera. Output device 1009 may represent a device for providing signals or indications to a user, such as loudspeakers for generating audio signals.

Controller 1000 is shown in FIG. 10 including display adapter 1004 and further includes a display device 1005. Display adapter 1004 may interface shared bus 1002, or another bus, with an output port for one or more display devices, such as display device 1005. Display device 1005 may be implemented as a liquid crystal display screen, a computer monitor, a television or the like. Display device 1005 may comply with a display standard for the corresponding type of display. Standards for computer monitors include analog standards such as video graphics array (VGA), extended graphics array (XGA), etc., or digital standards such as digital visual interface (DVI), definition multimedia interface (HDMI), among others. A television display may comply with standards such as NTSC (National Television System Committee), PAL (Phase Alternating Line), or another suitable standard. Display device 1005 may include an output device 1009, such as one or more integrated speakers to play audio content, or may include an input device 1008, such as a microphone or video camera.

In FIG. 10, memory media 1010 encompasses persistent and volatile media, fixed and removable media, and magnetic and semiconductor media. Memory media 1010 is operable to store instructions, data, or both. Memory media 1010 as shown includes sets or sequences of instructions 1024-2, namely, an operating system 1012 and geosteering control 1014. Operating system 1012 may be a UNIX or UNIX-like operating system, a Windows® family operating system, or another suitable operating system. Instructions 1024 may also reside, completely or at least partially, within processor 1001 during execution thereof. It is further noted that processor 1001 may be configured to receive instructions 1024-1 from instructions 1024-2 via shared bus 1002. In some embodiments, memory media 1010 is configured to store and provide executable instructions for executing GCL 900, as mentioned previously, among other methods and operations disclosed herein.

As noted previously, geosteering control system 168 may support the display and operation of various user interfaces, such as in a client/server architecture. For example, geosteering control 1014 may be enabled to support a web server for providing the user interface to a web browser client, such as on a mobile device or on a personal computer device. In another example, geosteering control 1014 may be enabled to support an app server for providing the user interface to a client app, such as on a mobile device or on a personal computer device. It is noted that in the web server or the app server architecture, surface steering control 1014 may handle various communications to rig controls 520 while simultaneously supporting the web browser client or the client app with the user interface.

Geosteering

As used herein, "geosteering" refers to an optimal placement of a borehole of a well (also referred to as a "wellbore"), such as borehole 106, with respect to one or more geological formations. Geosteering can be based on downhole geological and geophysical logging measurements, together with 2D or 3D background geological models, rather than based on following a 3D drill plan in space. The objective of geosteering is usually to keep a directional wellbore within a target zone, which is typically a geological formation or a specific part of a formation. Geosteering may be used to keep a wellbore in a particular section of a reservoir to minimize gas or water breakthrough, and to maximize economic production from the well.

In the process of drilling a borehole, as described previously, geosteering may comprise adjusting the drill plan during drilling to stay in one or more geological target areas. The adjustments to the drill plan in geosteering may be based on geological information measured or logged while drilling and correlation of the measured geological information with a geological model of the formation. The job of the directional driller is then to react to changes in the drill plan provided by geosteering, and to follow the latest drill plan.

A downhole tool used with geosteering will typically have azimuthal and inclination sensors (trajectory stations), along with a gamma ray sensor. Other logging options may include neutron density, resistivity, look-ahead seismic, downhole pressure readings, among others. A large volume of downhole data may be generated, especially by imaging tools, such that the data transmitted during drilling to the surface 104 via mud pulse and electromagnetic telemetry may be a selected fraction of the total generated downhole data. The downhole data that is not transmitted to the surface 104 may be collected in a downhole memory, such as in downhole tool 166, and may be uploaded and decoded once downhole tool 166 is at the surface 104. The uploading of the downhole data at the surface 104 may be transmitted to remote locations from drilling rig 210 (see also FIG. 4).

As presently implemented in the oil and gas industry in the U.S., geosteering is typically performed by a geologist or specialized professional using data analysis software tools to interpret gamma ray (GR) and other LWD logs that have been collected by downhole tools, and with manual reference to a geological model of the formation. The logs used for geosteering are typically collected from reference or offset wells located in the same region 402 or vicinity of a new well to be drilled. The logs from reference or offset wells may be specified in the drill plan as survey information at different MDs and are used to correlate a TVD as the well is drilled.

Operationally, geosteering is typically implemented according to the following arrangements.

> an in-house geologist employed by a rig operator performs geosteering for the wells drilled by the rig operator;
> the in-house geologist performs geosteering for the wells drilled by the rig operator during office hours, but outsources geosteering to a geosteering service provider outside of office hours, such as on weekends and evenings and overnight shifts;
> the geosteering service provider performs geosteering for the wells drilled by the rig operator, with oversight by the in-house geologist; and
> an on-rig mudlogging/geosteering service provider performs geosteering for the wells drilled by the rig operator, with oversight by the in-house geologist.

A typical implementation of the geosteering process may comprise the following steps or operations.

> gamma ray values are continuously measured by downhole tool 166 and decoded by mud pulse telemetry at the surface 104;
> survey information is collected downhole while drilling at given intervals;
> an MWD operator filters, calibrates and corrects the gamma ray data for measured depth (MD) and sends the MD-corrected gamma ray data to the geosteerer;
> the geosteerer loads the updated and MD-corrected gamma ray data into a data analysis software tool;
> the geosteerer uses the data analysis software tool to interpret the data and updates the drill plan accordingly;
> the updated drill plan is sent to a drilling engineer for approval;
> the updated drill plan is approved by the drilling engineer who informs the geosteerer;
> the geosteerer sends the updated drill plan to the directional driller; and
> the directional driller updates local drilling information with the updated drill plan and determines how to effectively execute the trajectory specified in the updated drill plan.

Figure 11:
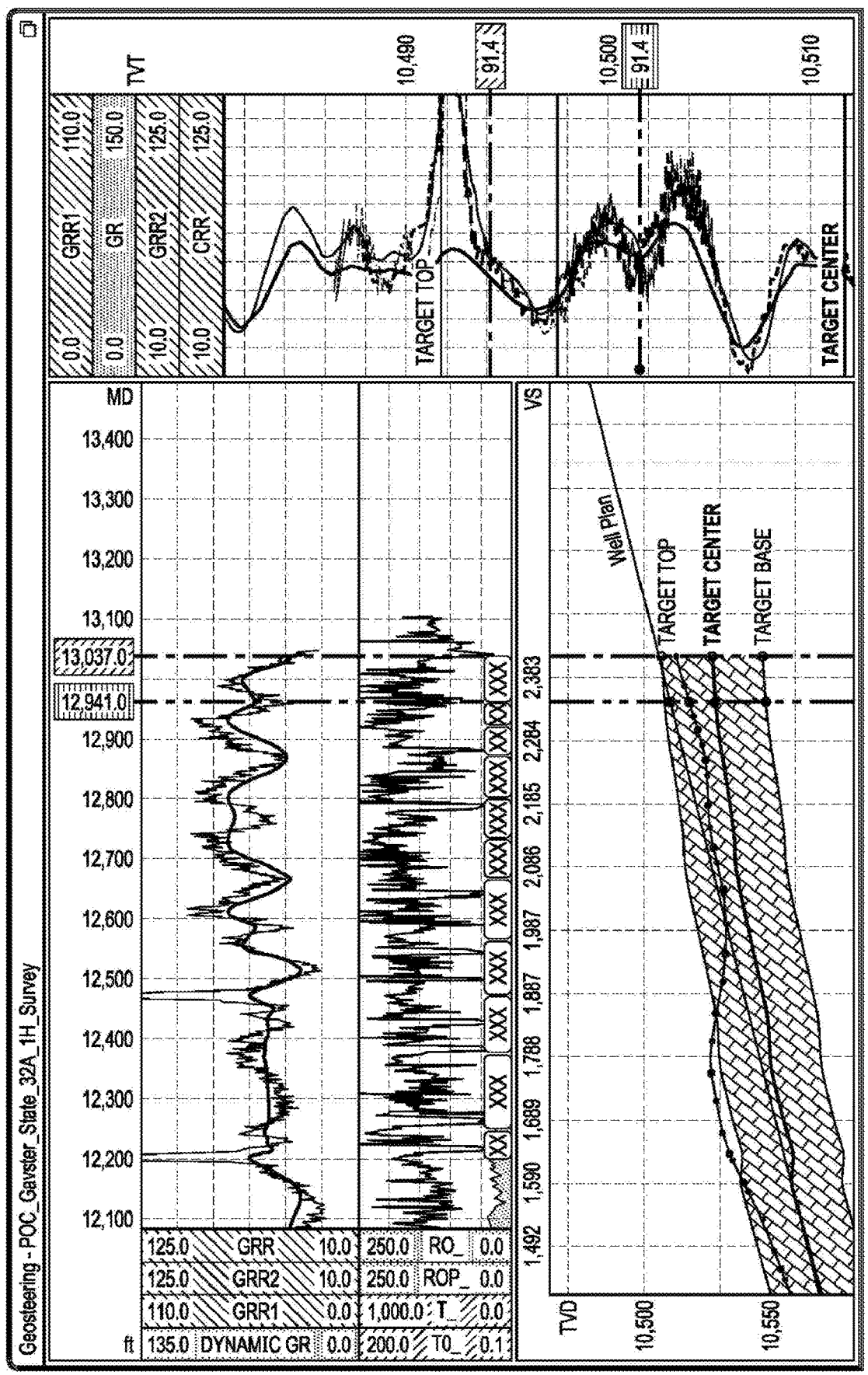
FIG. 11 is a depiction of a graphical user interface for geosteering.

One goal of geosteering is to determine a formation that drill bit 148 is currently located in and to identify when a formation boundary is crossed, either top or bottom. In order to determine a proactive drilling decision, a precise location within a given strata layer is beneficial. For example, if drill bit 148 is near top the of the strata layer, but with a downward drift tendency, a drilling decision may be different than if drill bit 148 is near the bottom of the strata layer. The typical process for geosteering described above with manual analysis of downhole logs may not be ideal, because the accuracy and precision of the location of drill bit 148 within the formation may be constrained to an undesirable value for precise geosteering. FIG. 11 depicts a user interface showing the dynamic updating of a target area to deviate from an original drill plan, based on geosteering as disclosed herein.

Accordingly, typical geosteering is an interpretive process where the geosteerer adjusts a given background geological formation model to match the updated TVD-corrected log data. This is typically done by breaking the logs into segments and stretching, shrinking, and flipping segments. As typically performed, geosteering with manual analysis of downhole logs may result in wasted time and delays in drilling, which may be economically undesirable and ineffective for drilling operations. For example, the geosteering process described above with manual analysis of downhole logs can take up to an hour. The geosteering process described above with manual analysis of downhole logs is based on human interpretation of log data and is performed with limited information available. The decisions resulting from the typical geosteering process with manual analysis of downhole logs are driven primarily by the log data and may involve a great deal of uncertainty in the drill plan. The typical geosteering process with manual analysis of downhole logs is often performed by humans in organizational silos that may not share information and may constrain the ability to respond to new information in a timely manner to avoid adverse drilling effects.

As disclosed herein, geosteering methods and systems for improved drilling performance implements an automatic determination of wellbore segment depths, along with automatic correlation of downhole log data with a geological formation model. The geosteering methods and systems for improved drilling performance disclosed herein may provide data mining of reference data to better leverage the measurements and interpretations from offset wells to speed up data processing and improve overall confidence. The geosteering methods and systems for improved drilling performance disclosed herein may provide automated geosteering that can be directly integrated with geosteering control system 168. The geosteering methods and systems for improved drilling performance disclosed herein may enable automated interpretation of well log data by correlation, pattern recognition, or parameter estimation, for example, by stretching and shrinking log traces to match measured data, such as when patterns in the data change with an angle of penetration in relation to the bed dip of a formation. The geosteering methods and systems for improved drilling performance disclosed herein may enable an increase in reserves and production from any given production reservoir, due to the improvements in drilling achieved. The geosteering methods and systems for improved drilling performance disclosed herein may enable drilling longer wellbores at closer spacing to one another to increase reservoir contact, while improving well placement in best rock, as a result of improved spatial accuracy in the trajectory of borehole 106. The geosteering methods and systems for improved drilling performance disclosed herein may result in reduced drilling costs, greater ROP, shorter drilling time, fewer and faster trips, faster casing runs, and reduced personnel costs. The geosteering methods and systems for improved drilling performance disclosed herein may also result in reduced risk due to decreased performance variability, avoiding losing BHA 149 in borehole 106, avoiding collisions, avoiding sidetrack events, avoiding frac hits, and attaining improved precision in the placement of borehole 106. The geosteering methods and systems for improved drilling performance disclosed herein may keep the well in the target formation and may identify an optimal strata layer for high ROP in the target formation. The geosteering methods and systems for improved drilling performance disclosed herein may handle geological faults and lateral type log variations in reference data within a geological formation. When the geosteering methods and systems for improved drilling performance disclosed herein may detect when drilling exits the target area, and may determine how to return to the target area. The geosteering methods and systems for improved drilling performance disclosed herein may run automatically for each new data point or for given MD increments, and may have the ability to provide timely interpretations and minor adjustments without delay. The geosteering methods and systems for improved drilling performance disclosed herein may also be enabled to perform a re-interpretation in the background geological model, and can provide a reference trajectory and logging data to a more accurate TVD than otherwise.

The geosteering methods and systems for improved drilling performance disclosed herein may be enabled to use the following input information, among other information.
- a) gamma ray data from the downhole tool, using a data format selected from: WITS0, MS-Excel, WITSML, CSV, TXT, LAS, LIS, DLIS, among others;
- b) MD, an inclination angle, and an azimuth angle;
- c) LWD logging data;
- d) the drill plan;
- e) drilling performance data (ROP, MSE, etc.) from drilling equipment 530;
- f) mud telemetry logging data;
- g) tie in point for geosteering;
- h) 2D or 3D background model;
- i) offset/reference well trajectory;
- j) formation tops and markers; and
- k) seismic or image backdrops.

The geosteering methods and systems for improved drilling performance disclosed herein may also be enabled to: compute TVD NS EW of the survey points; correct for convergence angles where needed; project lateral to a plane or a ribbon section; use bore hole estimator data from bit guidance 512 to TVD correct the gamma ray and other logging data without delay; relate the drilling performance and mud logging data to downhole data taking the sensor position and time stamps into account; display the drill plan in the 2D or 3D geosteering model; display the logs in horizontal (VS) and vertical projections (TVD); add or edit list of formation tops and markers; apply filters and editing to the logs and adjust display parameters; relating every measured depth (MD) of the subject well to the corresponding true vertical depth (TVD) of the geological formation model (type log or geoprog); determine the best estimate of position in 3-dimensional space for drill bit 148; use formation top detection (FTD) to perform type well referencing; create horizons from type logs; create segments (i.e., portions of the well log that are discontinuous); create pseudo logs for correlation from geological formation model; perform geosteering correlations between modeled data and measured log data, and make adjustments to the modeled data as indicated; provide a measure of confidence in the interpretation and alert the user to other possible interpretations consistent with the measured data; update the system and the command center that the correlation and new well path will be approved by the directional driller, possibly making the choice between alternate interpretations; and enable the customer's operations geologist to approve the correlation or choose an alternative interpretation.

In various embodiments of the geosteering methods and systems for improved drilling performance disclosed herein, human interaction may be provided for verification of the solution automatically generated by geosteering control system 168, which may be performed within minutes or seconds. The geosteering methods and systems for improved drilling performance disclosed herein may be implemented in the following configurations: a stand-alone algorithm that does not incorporate magnetic geodata; an algorithm that consumes MD, TVD, and gamma data from the LAS file; an algorithm that consumes survey data; an algorithm that includes time, depth, and temperature; a stand-alone algorithm that incorporates magnetic geodata; an algorithm that uses X, Y, Z accelerometer and magnetometer values with a precision of about 4-6 decimals; an algorithm that operates with BGS 512. When geosteering methods and systems for improved drilling performance is used without BGS 512, updates may be delayed (file or WITSML-fed); drilling dynamics may not be available; and TVD correction may be unavailable. When geosteering methods and systems for improved drilling performance is used with BGS 512, updates without delay may be available (survey-independent); algorithm enhancement using drilling dynamics may be used; an integrated dashboard with BGS may be displayed; more accurate TVD information may be available; and magnetic geodata may be incorporated. Additionally, as indicated above with respect to FIG. 5, geosteering control system 168 may integrate functionality provided by autoslide 514.

As noted, geosteering control system 168 may be operated with GUI 850 (see FIG. 8), which may be executable on various types of devices, including mobile devices such as a tablet or a smart phone having a wireless network connection, in particular embodiments. Depending on the display capabilities of the mobile device, geosteering control system 168 may adapt or scale at least certain portions of GUI 850 (or other GUIs) to conform to the mobile device, such as different display screen or touch screen dimensions. Additionally, when geosteering methods and systems for improved drilling performance is activated using geosteering control system 168, geosteering control system 168 may generate a guided workflow, or sequence of operations, that a user can perform. The guided workflow generated by geosteering control system 168 for performing geosteering may present various relevant information, as described above with respect to FIG. 8, indicative of the drilling process currently being performed, and may allow or query the user to make a decision regarding geosteering, such as to accept or reject a geosteering proposal regarding the trajectory of borehole 106.

In addition to the 2D GUI 850 shown in FIG. 8, it is noted that certain 3D displays may also be generated and shown to the user of geosteering control system 168. For example, a 3D display of various log data and drilling data may be shown in a subterranean downhole display that allows the user to graphically navigate along borehole 106, such that the log data or drilling data are virtually shown in the 3D display as plots versus MD along the actual path of borehole 106. In some embodiments, such a downhole 3D view of log data and drilling data provided by geosteering control system 168 may support operation with various types of control inputs, such as a touch screen, a mouse, a joystick, a foot pedal, or a video game controller, in different embodiments.

Whether viewing a 2D display or a 3D display, the user of geosteering control system 168 is able to generate screenshots or reports that can be captured, stored as document files, sent electronically, or printed, as desired. The reports may be auto-generated by geosteering control system 168, such as at a predetermined time or at a predetermined MD, for example. In addition, geosteering control system 168 may enable the creation of structural 3D maps of formations, strata layers, and different wellbores within a given region or location. Furthermore, geosteering control system 168 may enable survey information collected while drilling borehole 106 to be saved to a file and may also be enabled to generate a report of all survey information taken for a given well.

As noted above, geosteering using geosteering control system 168 may enable the inclusion of drilling dynamics data, such as in the form of an additional log that can be used to improve decisions and accuracy. Because geosteering using geosteering control system 168 is relatively easy to use and provides improved positional accuracy, a reduced TVD error in interpretation can be provided. The ease of use of geosteering control system 168 for geosteering includes the ability to import data from various common file formats, the ability to support standard desktop features, such as drag and drop of files to import files into geosteering control system 168. In addition, geosteering using geosteering control system 168 may support the display of data from multiple wells simultaneously, for an improved ability to compare specific wells with one another.

In addition to the user features for geosteering provided by geosteering control system 168, various improvements and benefits may be provided for geologists and drilling engineers involved in the process of directional drilling using geosteering. For example, geosteering control system 168 may enable specific notifications or alerts when a significant change in measured values, such as gamma ray data or MSE data, is observed. As shown in FIG. 2, geosteering control system 168 may enable automatic detection and tracking of fault 278. Also, a geologist or drilling engineer may be able to generate a plot of planned values versus actual values along borehole 106 using geosteering control system 168, along with any changes to the planned values that might have occurred. When geosteering control system 168 displays a drill plan to a user, such as a drilling engineer, the displayed drill plan may include indications of wellbore impacts, such as dog leg severity (DLS), a distance to achieve a modified or new drill plan, among other indications.

In order to setup and configure an instance of geosteering control system 168 for a new well, at least some of the following operations and procedures may be performed. A drill plan and log data for any pilot wells or offset wells in the area of the new well may be obtained and imported into geosteering control system 168. A reference geomodel may be specified for use with the new well using geosteering control system 168. A type log for the new well may be generated by or imported into geosteering control system 168. A fault map of the formation through which the new well will pass may be generated by or imported into geosteering control system 168. The geomodel may provide mapped horizons, both mapped in MD/TVD and SSL, while the faults may be mapped in 2D or 3D.

In order to operate an instance of geosteering control system 168 with drilling rig 210 to drill borehole 106, the following input data methods for downhole data may be configured.

via a decoder on drilling rig 210
via BGS 514
via file upload
via a survey API
via WIT SML
via email As noted, geosteering control system 168 is enabled to validate and correct downhole surveys, as they occur during drilling without delay. Also, geosteering control system 168 may be enabled to combine stationary with high-resolution surveys and compute corrected TVD, such as for BHE surveys, continuous inclination, continuous inclination and azimuth, slide/rotate sheets, and slide/rotate high resolution information from WITS data, among others.

In the course of automatically processing data, geosteering control system 168 may be enabled to process, validate, filter and clean up downhole logged data obtained from LWD, such as gamma ray, azimuthal gamma ray, resistivity, neutron, drilling dynamics data, and mud logging data, among other data. For a current borehole 106 being drilled, geosteering control system 168 can assign logging data to a particular MD, such as when a downhole sensor is at some distance from the bit, drilling performance is relevant for the position of drill bit 148, or mud logging data has a time lag. Also, geosteering control system 168 may be enabled to forward model (or predict) the logging data based on model parameters, such as for formation depth, formation thickness, formation dip, faults, and well incidence angle.

The geosteering interpretations provided by geosteering control system 168 may further involve computing a misfit between reference logs and measured logs, identifying geological faults, formation stretch and formation dip from the measured logs, iteratively adjusting the model parameters and computing the misfit, finding the solutions with local and global minima of the misfit (inversion), assigning probabilities to the solutions, and computing the likelihood of the wellbore being in the stratigraphic layer occurring at a given TVD on the type log. In particular, geosteering control system 168 may be enabled for computing the corresponding uncertainties (covariances) from the misfit, such as covariance of the geomodel parameters, or covariance of the position of the new well in the geomodel.

The output information that geosteering control system 168 is enabled to generate may include a plot of the measured logging data, a comparison with the predictions of different interpretations, a visual display of the trajectory and ellipsoids of uncertainty (EOU) in the geomodel, a visual display of the uncertainty of the geosteering interpretation, and a visual display of geophysics data (in particular seismic formations), among others. In addition, geosteering control system 168 may have the ability to switch on/off different interpretations, the ability to load a 3rd party interpretation, and the ability to select a definitive interpretation, among others. For every subject well MD, geosteering control system 168 may be enabled to display the likelihood of being at a given TVD on the type log, to generate a highly customizable geosteering report, and to generate a geosteering report without delay with minimal user input. Further, geosteering control system 168 may have the ability to compute and display KPI of how much of the well is "in zone", the ability to export an interpretation in various different formats, such as MS-Excel (Microsoft Corp.), or a format supported by another application program, and the ability to export a complete geosteering data set (e.g., all input data, trajectories, interpretations, etc.)

To address drill plan changes that may occur during drilling, geosteering control system 168 may be enabled for proposing drill plan changes, visualizing certain consequences of drill plan changes, providing relevant information for drill plan change decisions, implementing drill plan changes, making drill plan adjustments without delay, and reporting plan changes, among others, while also allowing the operations geologist to authorize and control acceptance of any drill plan changes.

To generate and output alerts or warnings that may occur during drilling, geosteering control system 168 may be enabled to alert for mismatch between measurement data and predicted data, alert for penetrating a marker horizon, alert for identifying a fault, and alert for finding a significant discrepancy between the geomodel and measured data, such as for formation depth, formation dip, formation thickness, and fault location, among other alerts. Additionally, geosteering control system 168 may be enabled to alert for a risk of failure to meet the drilling objectives, such as not landing in a formation, exiting the target area in the lateral section, ambiguity in the geosteering interpretation, and a low quality of the input data, such as arising from noise, outliers, poor spatial resolution, poor signal resolution, intermittent communication, and insufficient information content to provide an interpretation with sufficient confidence, among others.

In particular implementations, instead of receiving geological reference data as an input for a new well, geosteering control system 168 may be enabled to provide geological reference data as an additional service, such as through a geoscience support service (GSS). For example, a well database that is cleaned and screened with all relevant formation tops picked off logs, and ready for selection of a desired offset well, such as from a type log having any of gamma ray emission, resistivity (RES), neutron porosity (NPHI), density porosity (DPHI), delta time (DT), hardness, density, or formation slowness, among others, with the formation tops of relevant horizons and pay zones/targets. Further horizon structure maps may be provided by geosteering control system 168 that include grids of relevant horizons designated from the type log, and may be direct inputs for another software application. Also a fault framework may be provided by geosteering control system 168 that includes a mapping from the type log, or from public data mining of basin geology, such as from published papers, georeferenced images, shapefiles, among others. For example, geosteering control system 168 may interpret regionally mapped wrench faults and potential fields data that are publicly available. Additionally, geosteering control system 168 may provide general basin information, such as general geologic history, tectonic and depositional setting etc. for a particular region 402.

In summary, geosteering methods and systems for improved drilling performance may be provided by geosteering control system 168, as disclosed herein. The geosteering capabilities of geosteering control system 168 may replace typical manual operations for geosteering that rely on a position of downhole tool 166, which is often 50-90 feet displaced from drill bit 148, and incorporate drilling dynamics data that is obtained at drill bit 148 for improved interpretation of reference data. The geosteering capabilities of geosteering control system 168 may also provide the ability to interpret multiple reference wells, such as by comparing the new well individually to multiple reference wells, which may be beyond the scope, capacity, or complexity of a human interpreter to perform within a desirable time during drilling. The geosteering interpretation by geosteering control system 168 may solve an optimization problem by determining a misfit between measured data and reference data, and then using mathematical operations and processes to minimize the misfit to find an optimal drilling solution, as described in further detail below. The geosteering capabilities of geosteering control system 168 may include consideration of additional misfits from additional reference wells, or from previous sections of the same well, along with consideration of drilling information, such as ROP, WOB, drilling response data, drilling dynamic data, mud cuttings analyses, and input logging data, among others, that may be interpreted in a single operation, which may also be beyond the scope, capacity, or complexity of a human interpreter to perform within a desirable time during drilling.

Furthermore, the geosteering interpretation by geosteering control system 168 may generate an expected response versus measured, and may also provide a numerical confidence level that can be calculated for each result, and can be used to evaluate any interpretation result generate, in order to quantitatively evaluate a plausibility of the interpretation result, which may be beyond the scope, capacity, or complexity of a human interpreter to perform within a desirable time during drilling. The confidence level provided by geosteering control system 168 may be for TVD, MD, E-W, N-S, etc. and may specify a relative uncertainty to the geological background model, which may be beyond the scope, capacity, or complexity of a human interpreter to perform within a desirable time during drilling. The confidence level provided by geosteering control system 168 may be continuously updated as new information is received and processed, which may be beyond the scope, capacity, or complexity of a human interpreter to perform within a desirable time during drilling.

Still further, the geosteering interpretation by geosteering control system 168 may be enabled to generate multiple alternative interpretations, such as by tracking alternative solutions as drilling progresses, retroactively re-correcting previous survey results, and pruning the set of possible solutions when a probability of error exceeds a threshold value, which may be beyond the scope, capacity, or complexity of a human interpreter to perform within a desirable time during drilling.

Downhole 3D Display

As noted previously, a downhole 3D display of various log data and drilling data may be shown to a user of geosteering control system 168 or another computer system. The log data or drilling data shown to the user in the downhole 3D display may be acquired and displayed during drilling without delay, or may be acquired previously and displayed after drilling is complete. The downhole 3D display may be shown in various formats and arrangements, without limitation.

In one particular embodiment, a downhole 3D display may be generated that allows the user to graphically navigate along subterranean borehole 106. As the user navigates borehole 106 in 3D, the log data or drilling data may be virtually shown in the downhole 3D display as plots versus MD along the actual path of borehole 106. In some embodiments, such a downhole 3D display of log data and drilling data provided by geosteering control system 168 may support operation with various types of control inputs, such as a touch screen, a mouse, a joystick, a foot pedal, or a video game controller, in different embodiments.

Figure 12:
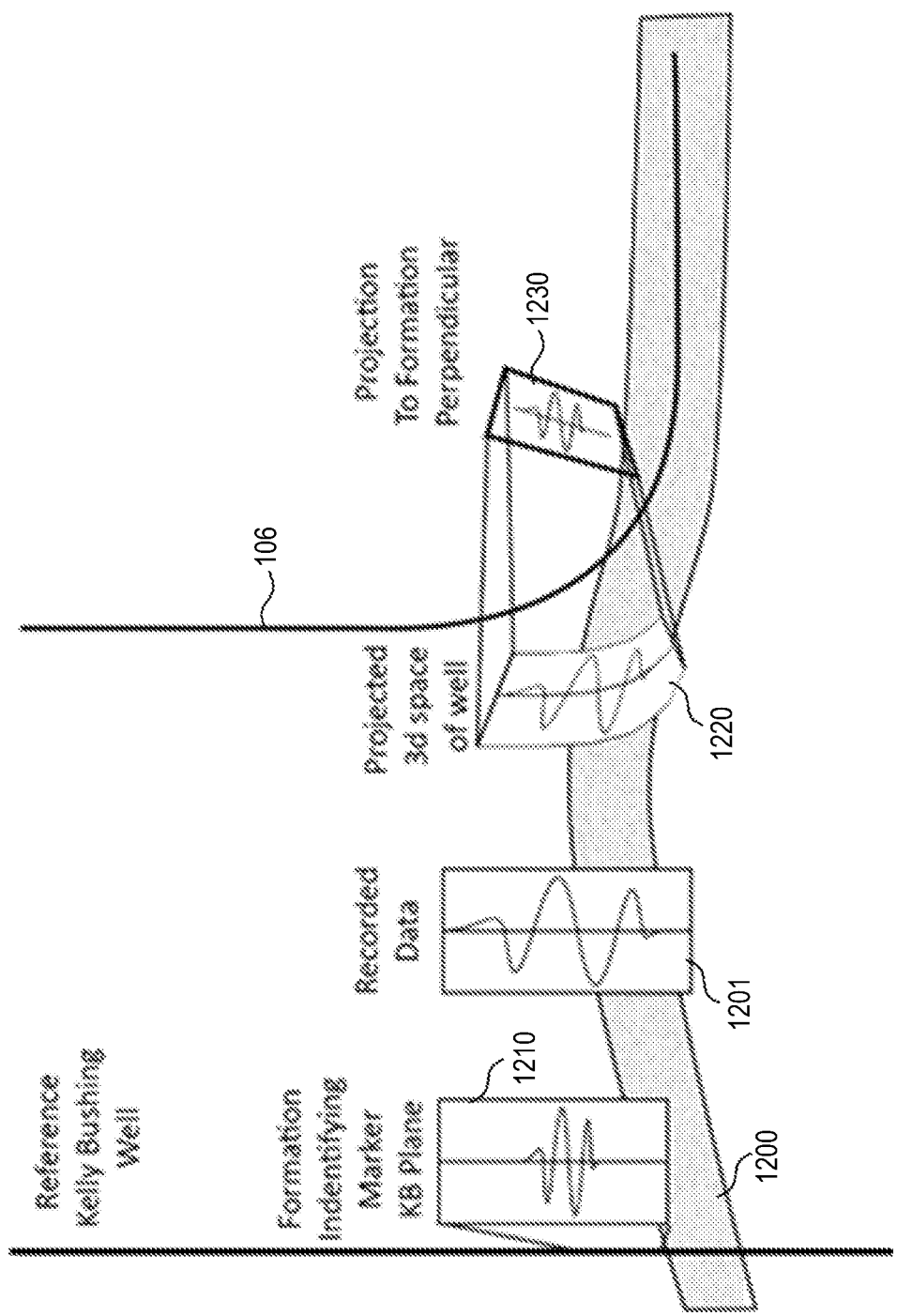
FIG. 12 is a depiction of data mapping for a downhole 3D display.

Referring now to FIG. 12, the projection of downhole data in 3D along a trajectory of borehole 106 in order to generate the downhole 3D display is described. The downhole data may be the log data or drilling data that varies along a position of borehole 106, such as gamma ray logs, MSE logs, magnetic logs, among others described herein. The downhole data shown in the downhole 3D display may be the same downhole data that is shown to an operator or another user at the surface 104. The data accessed in order to generate the downhole 3D display may be accessed from a database, such as central DB database 416, regional drilling DB 412, or another database. The database may be used to store downhole reference data, such as log data from reference wells or other sources that act as 'fingerprints' for matching downhole measured data to correlate a well trajectory. It is noted that the database may be used for the downhole 3D display to record user data, such as previous interpretations, templates for interpretations, and user input provided during an interpretation, which may be stored by the user as templates and retrieved to perform correlations of well trajectories. The user data may also be used to generate alerts, emails, reports, or other communication that can be auto-generated, for example.

Specifically, a Kelly Bushing (KB) projection plane may be defined as a vertical plane that orients beneath the geological KB point, and has a normal vector that points in a direction along a horizontal well trajectory. Accordingly, the downhole data, whether reference data or measured data, may be projected in 3D from the KB projection plane into a perpendicular projection plane, such as for horizontal sections of the well trajectory. For example, a movable window projecting from the KB projection plane may be positioned in 3D along the downhole data log at a desired position. The movable window may be used as a common frame of reference for both the KB projection plane (or the mapped projection plane) and the logged data, which may represent a projection that can simplify pattern matching, such as recognition of a particular feature in the logged data.

Performing pattern recognition and matching using the downhole 3D display, can aid humans in recognizing patterns that are characteristic of formations for detection of individual or specific formations, such as indicated in reference log data. For example, algorithms and machine learning at large may be implemented with the downhole 3D display for correlation, interpretation, kriging (also known as Gaussian process regression), and predictive analytics. In some implementations, the pattern recognition performed in conjunction with the downhole 3D can be based on human-recognizable patterns that are displayed to the user and matched with an indication provided by the user. In some implementations, the pattern recognition performed in conjunction with the downhole 3D display can be based on downhole data patterns that are automatically detected and correlated, such as with measured survey data. In particular, the pattern recognition may aid in identifying downhole data that indicate specific formation changes, such as gamma ray logs that identify a beginning or an end of a formation along borehole 106. The downhole data, such as gamma ray logs, may enable 3D display of close stratigraphic layers, signatures, orientations, all along the varied geometry of borehole 106, to enable better understanding in 3D by the user, along with improved visualization and interpretation of the downhole data. For example, the downhole 3D display may be used to show and compare alternative projections of downhole data and geological interpretations, such as gamma ray log interpretations from different geologists. Additionally, the downhole 3D display may reduce noise or interference in the displayed log data projections, which may assist in better determining desired or optimal build rates to land the trajectory of borehole 106 into the target area.

As noted, the downhole display may be based on the KB projection plane display 1210 as illustrated in FIG. 12. The KB projection plane display 1210 shown in FIG. 12 includes a segment of a log from the well being drilled. A geological formation 1200 is also shown. The formation 1200 may be a target zone, but need not be. By changing the slope of the KB projection plane 1210, the KB projection plane display 1210 may be mapped into various sections of borehole 106, including horizontal sections. In FIG. 12, a display 1201 of the log data is provided. It should be noted that the amplitude of the log 1201 increases just above the top of the formation 1200, and drops significantly to a minimum value upon reaching the top of the formation 1200. FIG. 12 also provides an exemplary display 1220 of the same log data as in 1210 and 1201 in a projected well space 1220, as well as in a projection 1230 that is perpendicular to the formation 1200. The downhole display system can be programmed to allow a user to use the user input device (as described above) to manipulate the downhole display by switching between different projection modes (such as 1210, 1201, 1220, and 1230), and also by moving along the length of the borehole 106, with the downhole display system programmed to display a projection of the log corresponding the projection mode selected by the user at a position along the log selected by the user. By moving quickly or slowly along the length of the borehole 106, the downhole display presented to the user provides the same segment of log data from the well in varying shapes and sizes, thus allowing the user more easily find patterns that correlate with one another and/or with one or more reference logs.

After mapping the projection plane, noise reduction or noise elimination may be performed on the downhole data, such as by filtering, smoothing, integrating, etc. In addition, a normalization of the amplitude of the downhole data may also be performed. The X, Y, and Z coordinates (Northing, Easting, Total Vertical Depth) can be isolated and distorted for each point, plane, thickness, and formation as a whole.

In order to perform correlation of the downhole data, different downhole positions (or indices) along the 3D-mapped downhole data log may be selected. Then, at a given downhole position, a section of the downhole data log may be mapped to the KB projection plane for correlation. It is noted that the correlation may also be performed by mapping the downhole data in the KB projection plane to another projection. After mapping, certain distortions, such as stretching or shrinking along the X-axis (downhole position) or the Y-axis (amplitude) or both, may be performed to correlate the downhole data. Formation segments of reference downhole data may be distorted to match marker, formation tops, and isopach signatures. The downhole 3D display may enable other similar correlations to be used and compared, such as previously performed correlations for the same well, correlations from similar reference wells, or correlations performed by other geologists. As the downhole data log is distorted during the correlation for automatic interpolation for new matches with isopach markers, subregions of the plane top and formation slope may be defined to adjust the orientation. As the depth of borehole 106 increases, different downhole reference data, such as from different reference wells, may be used that are more pertinent to the formation being drilled through. The downhole reference data may be selected manually by the user or may be automatically selected based on a numerical confidence rating. When the selected downhole reference data does not correspond to the downhole log data, various downhole data patterns from alternative reference wells may be concatenated together to generate an expected formation log, 3D kriging plane, or to change the drill plan. Existing seismic or terrain models of formation can help to accentuate the mapping, and may be referenced with the numerical confidence level. Consistent reference log values while drilling may be taken as an indication that the formation geology and the reference log values are closely related, and may be directly mapped in a particular and homogeneous formation. A collection of wells interpreted may provide a 3D representation of an entire geological region or basin. Data perpendicular to the formation structure may help to determine the geometry of the formation. Fault or dip changes can transfer from the reference data log at the offset of KB, mapped mathematically to the original KB log, and would initially presume to be the same distance/thickness of formations. The offset points of KB indicators may be continuously interpolated to indicators in the formation using a derived geometry. The reference data log readings can be inverted on both mirror planes, the KB projection plane, and the formation perpendicular plane, to show juxtaposing formation mapping and the original KB log. Automatic math to show where the highs and lows of a formation can be visually presented on multiple wells across the user interface with a numerical and 3D visualization/interpretation.

In the downhole 3D display, a user can select an inflection point along borehole 106, to attempt to correlate the reference data log by manipulation with the measured downhole data for the formation. In some implementations, continuous operation of matching and correlation may be selected and performed. As noted, when the user is working on particular sections of borehole 106, the user can save section segments to analyze at a later time, such as using the database. Additionally, the user can create tags on certain segments of the downhole reference logs to save in the database to search later or to include for predictive analytics and machine learning. The user can add in daily drilling operations via depth-based information to notify the geologist/geosteerer when drilling occurs and when steering activities may be postponed, or the user may activate automatic notification. The user can orient 3D representations to match 2D representations.

In order to interpret data shown using the downhole 3D display, the user, a geologist, geosteerer, drilling engineer, directional driller, etc., can make decisions for how to position borehole 106 based on reference logs to change the drill plan. The drill plan may be accordingly shifted in bulk or by segments by use of various methods including, but not limited to, trigonometry. The downhole 3D display may suggest drilling parameters and define formation tops via machine learning. In the downhole 3D display, different offset wells can be weighted to assign a priority for interpretation, while different correlation choices can also be weighted differently when generating interpolations from other correlations or from other weighted numerical confidence levels. In the downhole 3D display, reference log data projections may be inverted to the KB plane as a check and confirmation.

The downhole 3D display may also be enabled to support or perform machine learning algorithms. For example, machine learning may be used to characterize non-homogeneous formation compositions. The data input into machine learning algorithms used for the downhole 3D display may be used to derive a driller's interpretation for 3D representations. The reference log data patterns may help to identify stringers, faults, and create warnings for possible drilling-dysfunction encounters, including determining a stop-drilling decision or condition. The machine learning algorithms may generate a projection to the build angle to land a curved section at the desired landing point. In addition, certain drilling parameters may be suggested and formation tops may be defined using the machine learning algorithms.

In the downhole 3D display, the user can segment different logs and areas in the well that correspond to a cause-and-effect pattern that can be saved in the database for future identification, or for signaling to change the BHA. Automated suggestions for staying within the same formation vein may be provided. Automated suggestions of predicted ROP, WOB, Differential Pressure, and RPM ranges may be provided with the reference log data while drilling. A suggested overlay plane for expected drilling hazards may be generated. Time frame predictions of drilling operations of the well being drilled from the offset wells may be provided. The operation of predictive time stamps on the wellbore curve may be marked. The reference well operations time stamp may be shown on the current well trajectory as an informative and competitive indicator. Drilling parameters to mitigate the predictive drilling dysfunctions or names of directional drillers who have overcome recent and similar drilling dysfunctions may be provided.

In the downhole 3D display, manipulation of the 3D formation can include various adjustments. A user can evaluate the reference log data by moving along the 3D KB projection plane and distorting the 3D projected reference log data in the formation and orientation back to a desired position. Formation layers may be labeled alongside the TVD of borehole 106. A representation of a steering window for high/low and left/right of the drill plan may be available during review of the reference log data correlation. A user may to check for the formation boundaries within a 3D representation. Each data point of information may effectively improve alignment relative to an axis. A user can insert 2D stand-alone reference data logs and interpretations in various data formats (LAS, MS-Excel (Microsoft Corp.), CSV) and the reference data logs will be transposed into a 3D format to stretch and fit to a desired downhole data log. A user can update the formation layer model around borehole 106 from reference data logs and from inferred automatic and manual correlations. A user can merge datasets of different reference data log offsets to one continuous expected reference data log projection. Auto segmentation for a steering interpretation based on past patterns may be provided. Different formation segments may be zonally isolated to correlate and interpret, based on inserted completions plans. In this manner, different portions of the well may be managed depending upon the smoothness of borehole 106 for improved fracking and production performance. One or more users may interpret and maintain multiple versions of a particular downhole interpretation simultaneously. Multiple interpretations can be combined or kept separate for cumulative analysis, such that resulting formation models may be independent of single data sources. Multiple users may be active in a single session of the same virtual environment for communication and collaboration. A link of certain interpretations may be sent to particular users for analysis and editing.

The downhole 3D display may support kriging of various types of reference log data. Isopachs of reference well(s) reference log data patterns may be projected as a future prediction of the reference log data in non-drilled sections. Patterning of non-homogenous formations such as striation, faults, dips, and homogeneous formations may be duplicated in an X, Y, Z, size, shape, predicted pattern along borehole 106 and within a region or a basin. Adjustments to 3D data for the location of dips, faults, and other geological characteristics may be performed.

The downhole 3D display may support manipulation of various features. An X, Y, Z pattern may be used for adjustments to factor in anomalies to an invariable striation thickness. Unexpected dips and faults may be accounted for by suggesting different kriging interpretations for correlations. Certain distortions, such as stretching or shrinking along the X-axis (downhole position) or the Y-axis (amplitude) or both, may be performed to infer formation structures downhole in 3D. Manipulations to the reference well log data may be utilized to control the toolface orientation to a desired value. Distortion to X, Y, Z coordinates, planes, formations, and basins, may be performed by the user operating a game controller, mouse, or by using a program interface. The distortion may represent the change of percentage, numerical thickness, and may include a suggested automated interpretation.

The downhole 3D display may provide various interface features that incorporate sensory design aspects including but not limited to visual images, audio, haptic feedback, and temperature changes. Interfaces of different planes can be transparent to show information of but not limited to multiple formation layers and reference well information. Different reference wells can display different colors for data logs shown with the downhole 3D display. Color changes to anti-collision ellipses of uncertainty may be shown in green, yellow, and red, to warn against narrowing separation factors. Color changes to the drilling/geological window can account for different circumstances. The user can select different color and pattern options for, but not limited, to reference log data, Differential Pressure, ROP, WOB, MSE, and RPM, among others. There can be color changes when geological or drilling traces lay on top of one another to form another color using transparent or semitransparent layering. The user can add alarm features if there is an overlap of reference data log signatures with the reference well in agreement or conflict.

Figure 13:
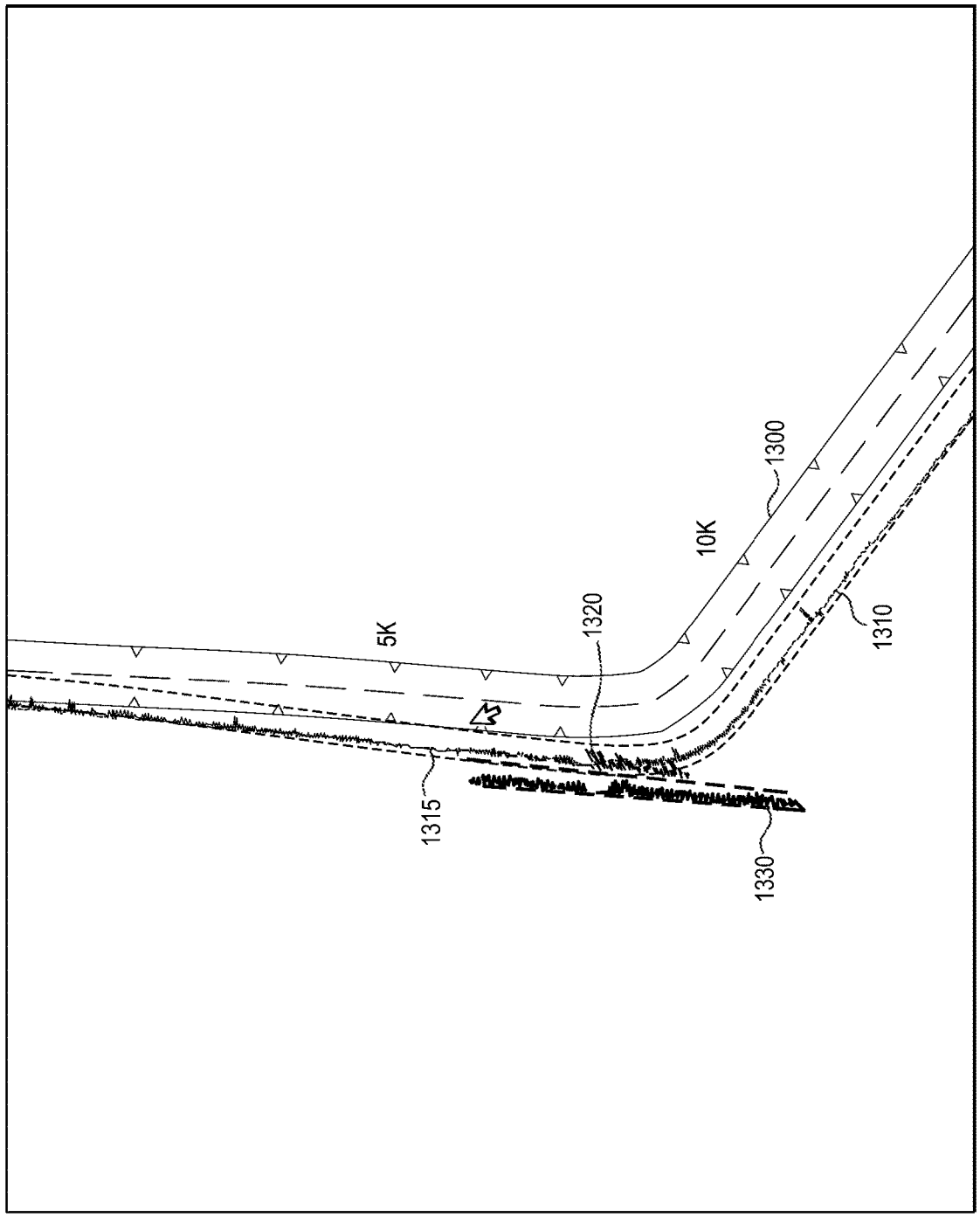
FIGS. 13, 14, and 15 are depictions of a downhole 3D display with gamma ray data.
Figure 14:
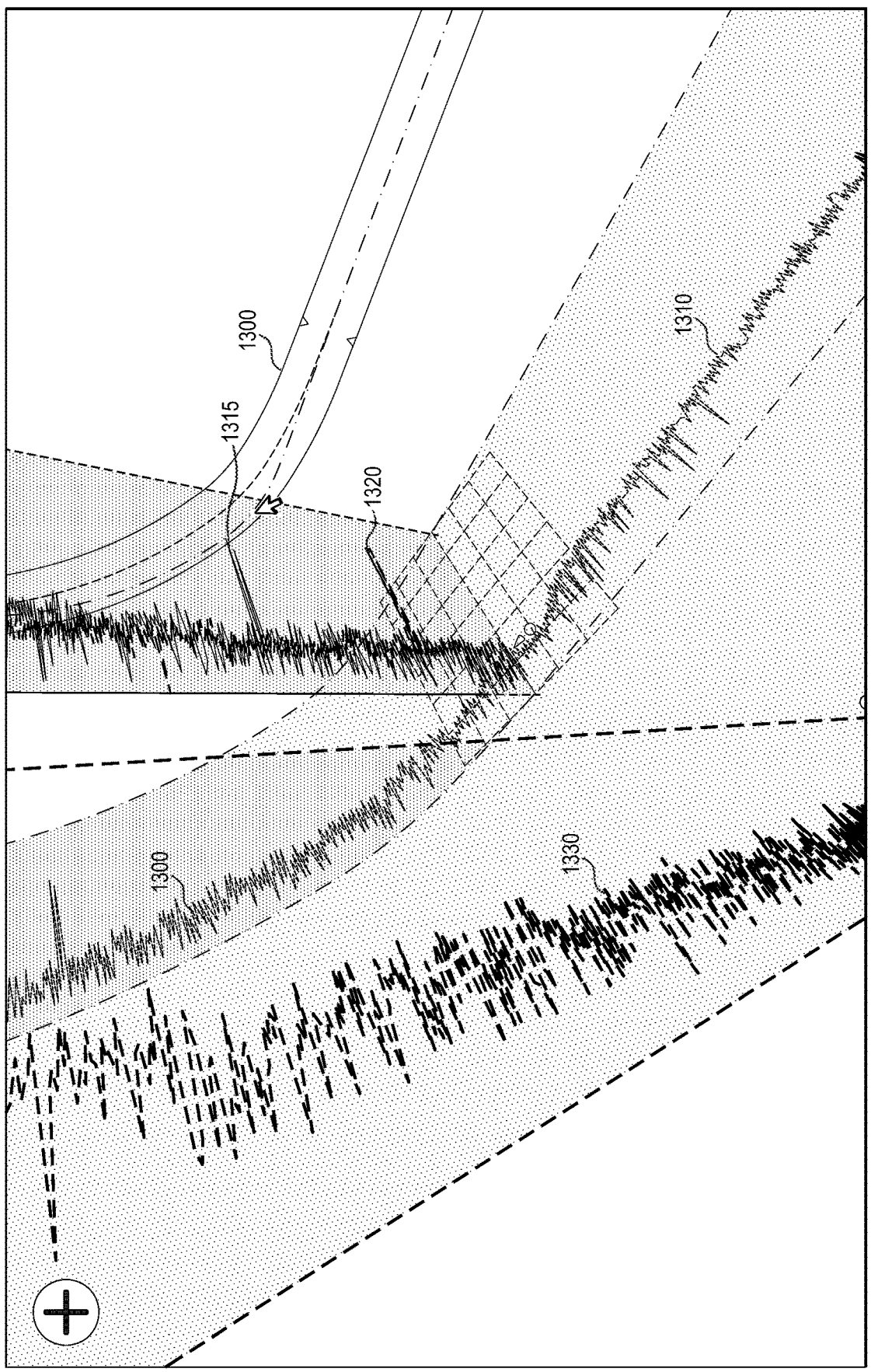
Figure 15:
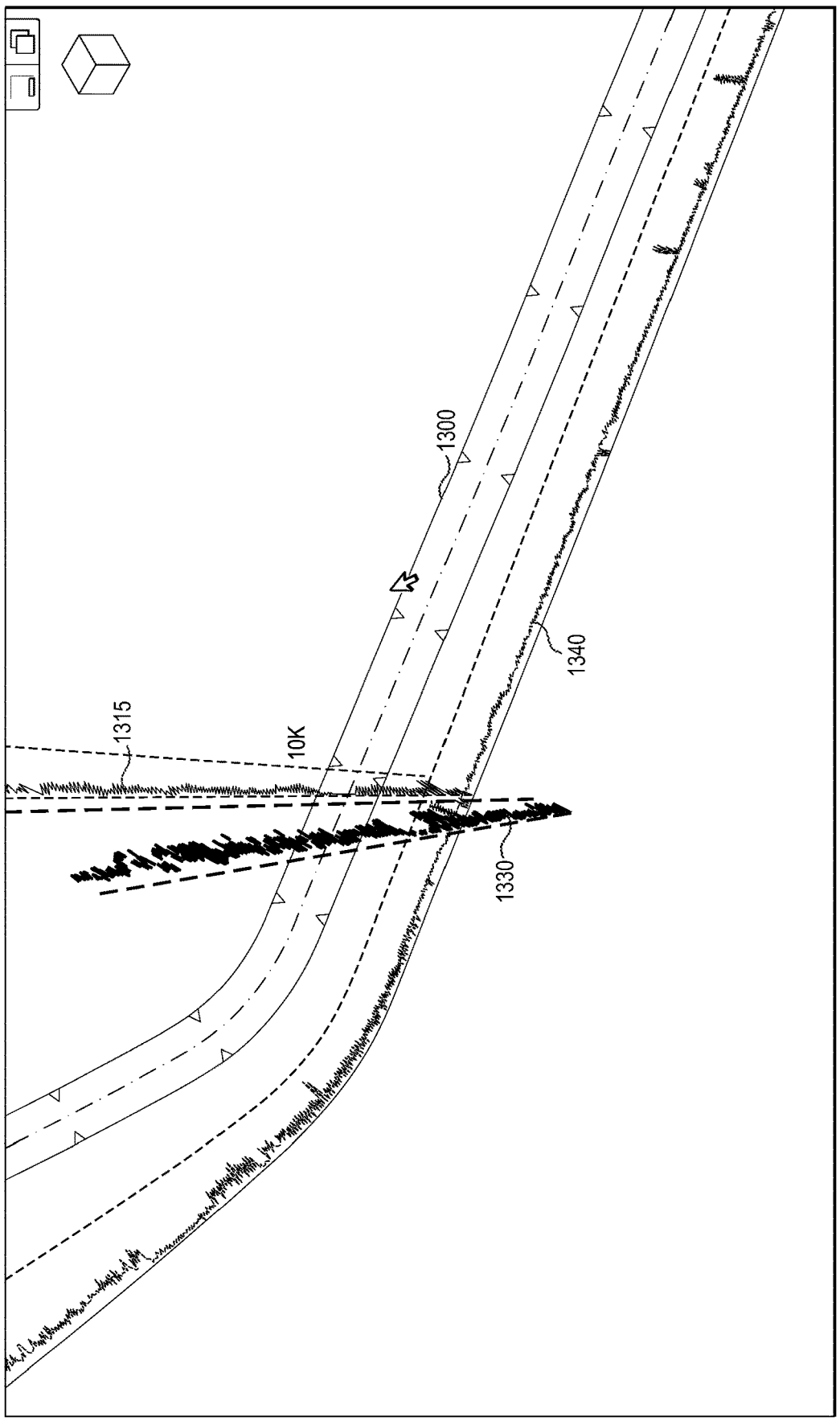

FIGS. 13, 14, and 15 depict an example of the downhole display provided by an embodiment of the downhole display system. Specifically, FIGS. 13, 14, and 15 depict a gamma ray reference log 1310 that is plotted along a wellbore axis 1300. Although a blank background is shown, it is noted that actual formation data may also be depicted in the background. For example, the display could include only a target formation, or it could include a series of formations, and can include identifying information for the formation or formations of interest (e.g., Austin Chalk, Eagleford, etc.) Additionally, measured log data 1315 and 1320 from the wellbore are shown in two different colors, such as green and red. For example, one segment of the measured log data 1315 may be shown in green if it has been previously correlated successfully, with a new or more recent log data segment from measured log data 1315 shown in red to indicate that it still needs to be successfully correlated. In particular, FIGS. 13, 14, and 15 depict a 45° bend in the wellbore 1300 and show how the measured log data 1315 and 1320 and the reference log data 1310 can be displayed for a 45° angle of inclination. For example, either the reference log data 1310 or the measured log data 1315, 1320 can be modified from being plotted against TVD for a vertical well to MD after the 45° bend. In addition, FIG. 13 includes a log 1330. In this example, the log data 1330 illustrates a segment of the measured log as projected onto the Kelly Bushing plane for the well.

Referring now to FIG. 14, additional detail of the downhole display is provided. As illustrated in FIG. 14, portions of log 1315 overlap with portions of log 1320. By providing these two logs in different colors, it is easier to see the portions that have been correlated and the portions that have not, as well as the portions which do not overlap with one another. In FIG. 14, the MD log 1340 for the well as projected along the well trajectory is also illustrated. FIG. 14 also illustrates a portion of the KB projection log 1330 and the target well path 1300. The downhole display system is programmed to allow a user to use the user input device to zoom in on a portion of a wider view display (such as the view shown in FIG. 13) or zoom out from a narrower view (such as shown in FIG. 14). In addition, the user may use the user input device to rotate the view of a given display in any or all three dimensions, thereby allowing the user to manipulate the display presented to obtain whatever view best presents the log data 1330, 1340, 1315, and 1320 to the user. Moreover, the user may use the user input device connected to the downhole display system to adjust the display of the log data as the user navigates along the well path, so that the display presents relevant log data 1315, 1320, 1330, and 1340 for segments corresponding to a given position on the well path 1300 selected by the user. Because the user may move along the well path slowly or quickly as the user may desire, the display will also change and adjust the display of the log segments slowly or quickly, respectively.

In FIG. 15, the MD log 1340 is provided as the reference log alongside the wellbore plot 1300. In addition, the measured wellbore log portions 1315 and 1320 may overlap and may be both shown in a single color (e.g., green) to indicate that they have been correlated in a satisfactory fashion.

Figure 16:
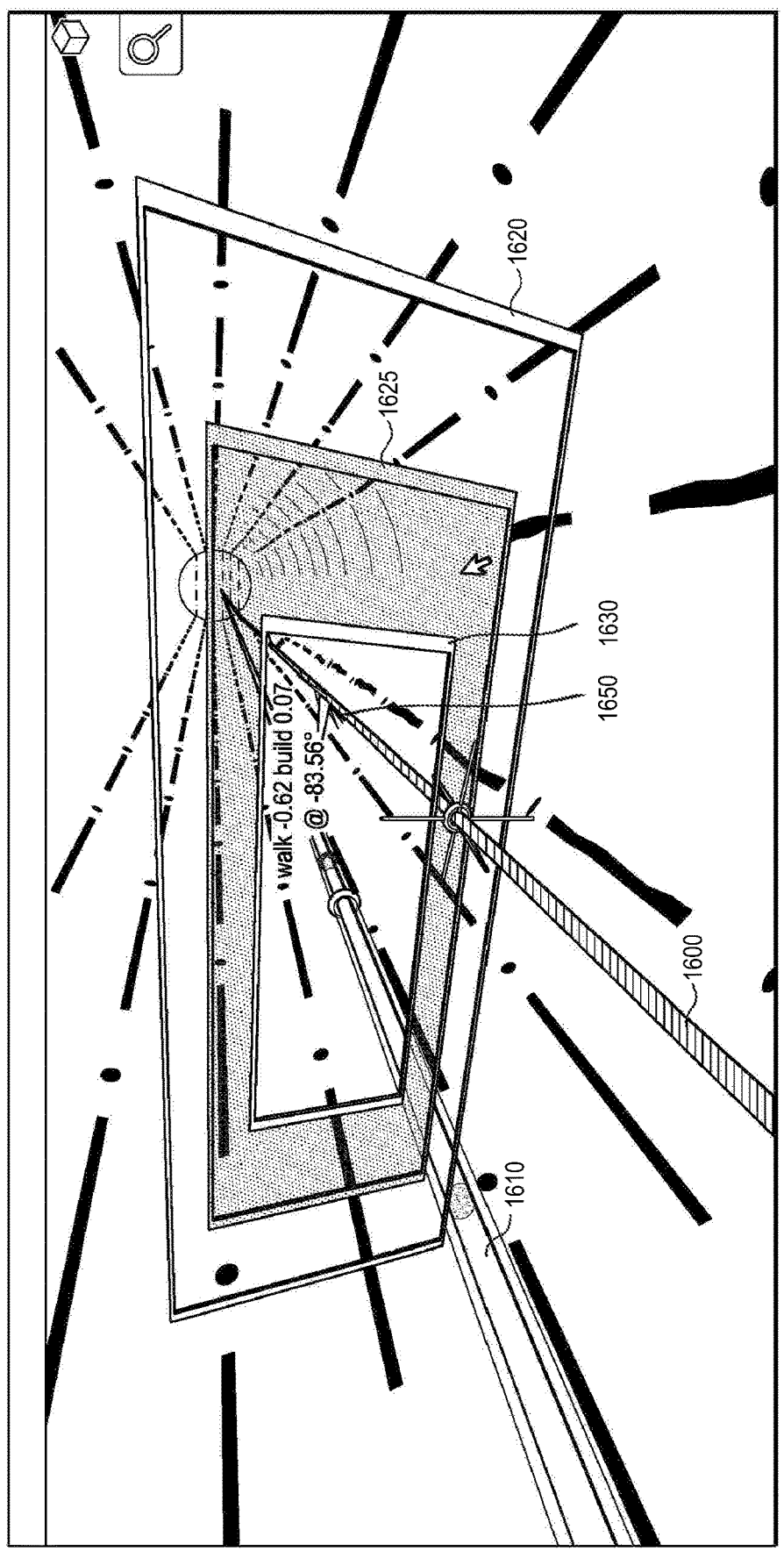
FIGS. 16 and 17 are depictions of a downhole 3D display with geosteering data.
Figure 17:
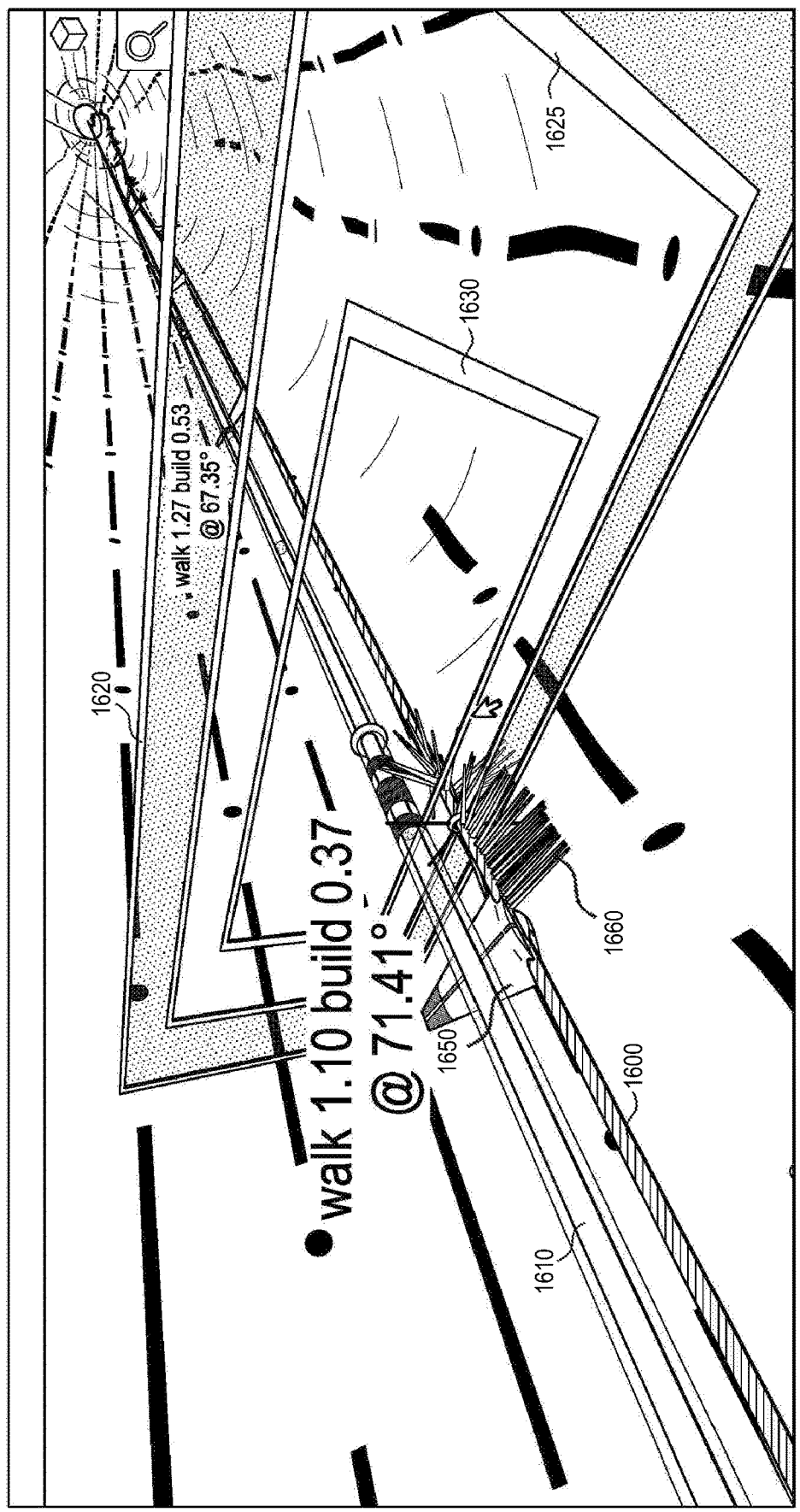

FIGS. 16 and 17 depict an example of the downhole display in another embodiment. Specifically, FIGS. 16 and 17 depict a drilled well borehole trajectory 1600 alongside a planned well trajectory 1610. The well trajectories 1600 and 1610 are depicted in a channel or passageway for viewing clarity. It is noted that other contexts or environments may be used for the background of the well trajectories. The relative distance between the two trajectories 1600 and 1610 can be indicated at a given location using a rectangular display of areas of uncertainty or trajectory error, or with reference to the planned target location. In different embodiments, either the drilled wellbore 1600 or the reference wellbore 1610 may be centered on the rectangular display, such as when the rectangular display regions 1620, 1625, and 1630 represent different zones of acceptable performance for locating the drilled wellbore 1600 relative to the planned or target location 1610. For example, the rectangle 1630 may indicate that the drilled well trajectory 1600 is within an acceptable deviation from the reference well trajectory 1610, and may be colored green on the display to indicate that the location within that rectangle is acceptable. The rectangle 1625 may indicate a higher level of variance from the reference well trajectory 1610 than is desired or may serve as a potential warning that the actual wellbore may be about to exit an acceptable location relative to the planned wellbore 1610. The rectangle 1625 may be colored yellow on the display to so indicate. The outer rectangle 1620 may indicate borderline unacceptable levels of variance from the reference well trajectory 1610, and may be displayed as red to so indicate. It is noted that in some embodiments, ellipsoids of uncertainty rather than rectangles for target locations may be used. It is also noted that, in addition to or instead of different colors, the display could alter the target window or ellipsoids of uncertainty by displaying them in different shapes, sizes, with labels, one or more flashing, different levels of brightness, and so forth.

In FIGS. 16 and 17, additional information is depicted using elements in the display. For example, alongside the drilled well trajectory 1600 at certain intervals a white fin 1650 is shown that indicates an amplitude and direction of a formation drift force that the geological formation exerts on the rotating drill bit. Next to the white fin 1650, several smaller needles 1660 emerging from the drilled well trajectory 1600 indicate toolface values that have been measured. Other values, such as numerical values for toolface or other annotations can also be displayed along the well trajectories.

In the examples provided herein, it should be noted that the displays have been presented in a three-dimensional fashion in the sense that FIGS. 12, 13, 14, 15, 16, and 17 reflect depth as well as height and width. In addition, the displays as illustrated in FIGS. 12, 13, 14, 15, 16, and 17 can be manipulated in any or all three dimensions to present varying views that reflect three dimensions. However, it is noted that the downhole display system can be programmed and can use data to provide two-dimensional displays if desired, and also can be programmed and can use data to provide other views if desired, such as are available with virtual reality systems. For example, the display could be provided by the downhole display system to a user using via VR goggles and the user could then virtually navigate the wellbore by various means, such as virtually walking along the wellbore path, virtually manipulating the wellbore with a hand, or by using gestures or motions as input to the system to move the display presented via the VR goggles.

Geosteering Algorithms Using a Spline Function

Additional description of geosteering algorithms is presented below with respect to FIGS. 18, 19, 20A, 20B, 21, 22, 23, 24, 25, 26, 27, 28, and 29, and further describes and illustrates the computer systems and methods that may be used in accordance with the present disclosure.

Figure 23:
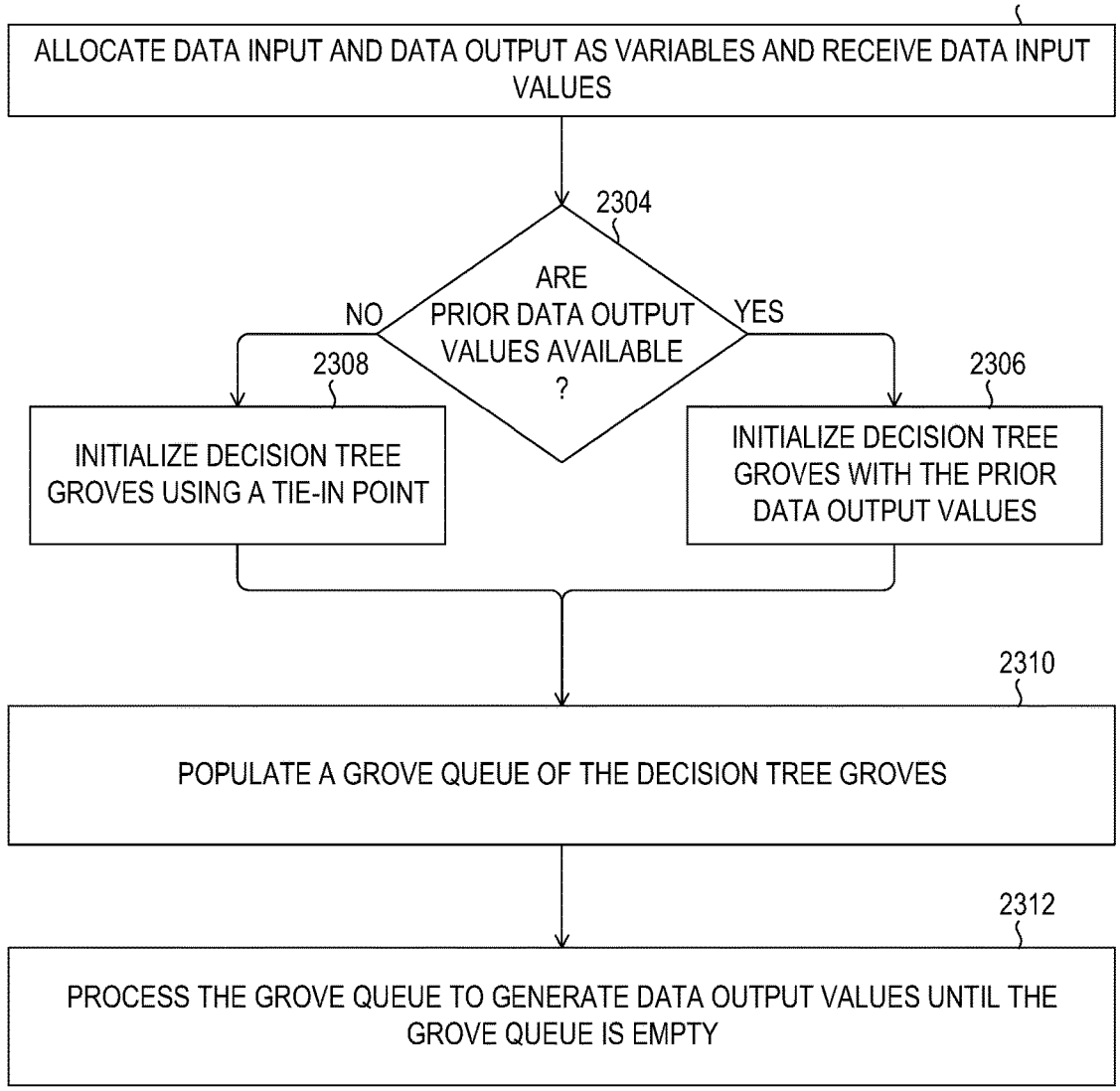
FIG. 23 depicts a method for generating multi-solutions.
Figure 24:
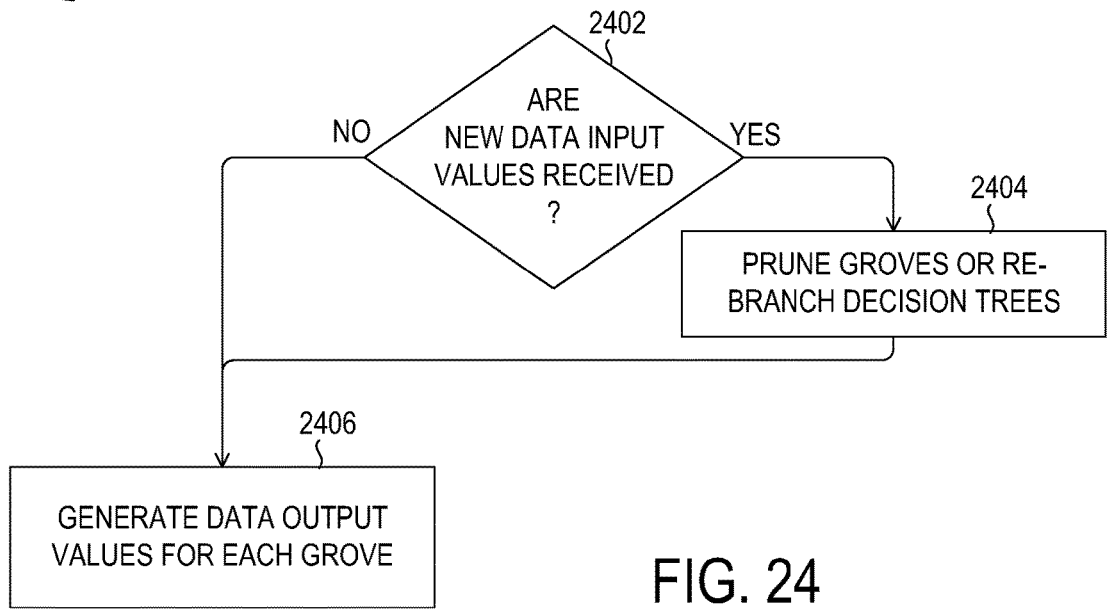
FIG. 24 depicts a method for grove queue processing.
Figure 25:
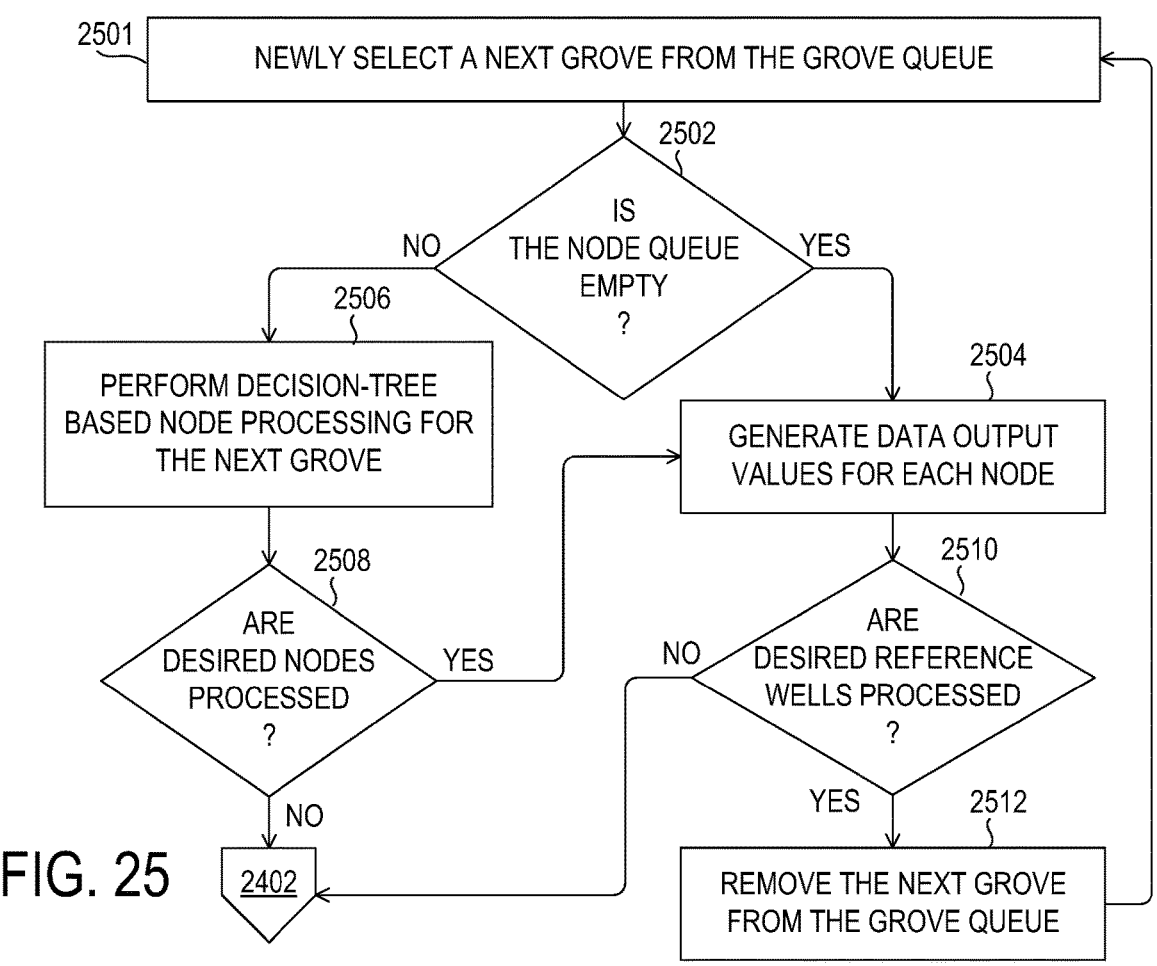
FIG. 25 depicts a method for generating data output values for each grove.

Referring initially to FIGS. 23, 24, and 25, a method 2300 for generating multi-solutions for geosteering is depicted in flow chart format in FIG. 23. In FIG. 24, further details of a method 2312, representing a step 2312 in method 2300, for grove queue processing is depicted in flow chart format. A grove is a set of solutions found within the context of a given set of control points. In FIG. 25, further details of a method 2406, representing a step 2406 in method 2312, is depicted in flow chart format. The methods depicted in FIGS. 23, 24, and 25 may be rearranged or be used with different steps in various embodiments. In particular implementations, method 2300, method 2312, and method 2406 may be executed by geosteering control system 168 for a subject well, as described above.

In FIG. 23, at step 2302, data input and data output are allocated as variables and data input values are received. The data input values may include measurement data for at least one reference well in proximity to the subject well. As noted above, the measurement data from the reference well(s) may include any one or more of: gamma ray emission, resistivity, porosity, density, and hardness, and may correspond to respective measurement data collected for the subject well. At step 2304 a decision is made whether prior data output values are available. When the result of step 2304 is YES and prior data output values are available, at step 2306, decision tree groves may be initialized with the prior data output values. When the result of step 2304 is NO and prior data output values are not available, at step 2308, decision tree groves may be initialized with a tie-in point. The tie-in point is a (MD, SVD) pair, that can be provided by a geologist or otherwise determined, and can serve as initial values for method 2300. A decision tree may represent various segments of a geosteering solution, represented as nodes on the decision tree, for a subject well being analyzed, as will be described further below. A grove of decision trees may represent a plurality of potential geosteeering solutions (e.g., multi-solutions) for the subject well. After step 2306 or step 2308, at step 2310, a grove queue of the decision tree groves is populated. At step 2312, the grove queue is processed to generate the data output values until the grove queue is empty. At the conclusion of method 2300, the data output values will store respective geosteering solutions for the subject well, and may accordingly be analyzed to choose a best-fit geosteering solution, such as the geosteering solution having a minimum misfit.

In FIG. 24, method 2312 for grove queue processing is depicted and represents further details of step 2312 in method 2300, in one exemplary embodiment. In method 2312, at step 2402, a decision is made whether new data input values are received. When the result of step 2402 is YES and new data input values are received, at step 2404, groves may be pruned or decision trees may be rebranched, such as in response to the new data input values. When the result of step 2402 is NO and new data input values are not received, or after step 2404, at step 2406, data output values for each grove are generated.

In FIG. 25, method 2406 for generating data output values for each grove is depicted and represents further details of step 2406 in method 2312, in one exemplary embodiment. Method 2312 may begin at step 2501 by newly selecting a next grove from the grove queue. At step 2502, a decision is made whether the node queue is empty. The node queue may represent a queue of the nodes for the decision trees in the next grove. When the result of step 2502 is YES and the node queue is empty, at step 2504, data output values are generated for each node. When the result of step 2502 is NO and the node queue is not empty, at step 2506, a decision-tree based node processing for the next grove is performed. After step 2506, at step 2508, a decision is made whether desired nodes are processed. When the result of step 2508 is YES and the desired nodes are processed, method 2406 may proceed to step 2504. When the result of step 2508 is NO and the desired nodes are not processed, method 2406 may return to step 2402. After step 2504, at step 2510, a decision is made whether desired reference wells are processed. When the result of step 2510 is NO and the desired reference wells are not processed, method 2406 may return to step 2402. When the result of step 2510 is YES and the desired reference wells are processed, at step 2512, the next grove is removed from the grove queue, and method 2406 returns to step 2501. It is noted that when the grove queue is empty, method 2406 may end at step 2501 or step 2501 may have no effect.

As described above in method 2300 and related methods disclosed herein, a geosteering solution may involve generation of a so-called "decision tree" in which each "node" of the decision tree can represent a potential geosteering mapping of the MDs of a subject well being analyzed to the TVDs of one or more reference wells for a given length portion (e.g., a given "section") of the subject well. Each node in the decision tree may additionally include an indication of the quality of individual geosteering solutions that can be used to filter or discriminate the multi-solutions for geosteering to find or select a geosteering solution that is optimal or desired. The indication of the quality of a geosteering solution may be a misfit representing an error level between the gamma ray measurements at MDs of the subject well and the gamma ray measurements at TVDs of the reference well(s). The geosteering mapping may be based on a spline function used to represent the misfit over a given range, such as the section corresponding to each node in the decision tree.

Broadly presented, the geosteering solution may be generated by the following operations:
- define a "root" node for a decision tree that represents the start of the subject well;
- define a next node for inclusion in the decision tree corresponding to a next "spline segment" of the subject well;
- select and receive the data to be used to generate the geosteering solution for the next node (e.g., the next spline segment). It is noted that the next spline segment starts at the end of the previous spline segment and may extend over a minimum spline segment length. Because the root node does not have any length associated with it, the root node is not associated with a spline segment, and may enable a tie-in point;

perform a global optimization of mapping parameters used to generate the spline segments to determine a finite number of sets of mapping parameters to use with the next spline segment, where the mapping parameters include spline coefficients for the spline function used to map the next spline segment;

for each of the sets of mapping parameters, create a child node in the decision tree from the next node, each child node representing alternative spline segment solutions based on different potential mapping parameters; and beginning with the minimum spline segment length, extend the spline segment length described by each child node until a marginal mapping error exceeds a misfit threshold value based on the auto-segmentation process described below. After the extension of the spline segment length, each child node may extend over a different range of MD.

The procedure described above may be repeated in a recursive manner with each child node respectively as the next node, until the desired length of the subject well has been traversed.

Figure 18:
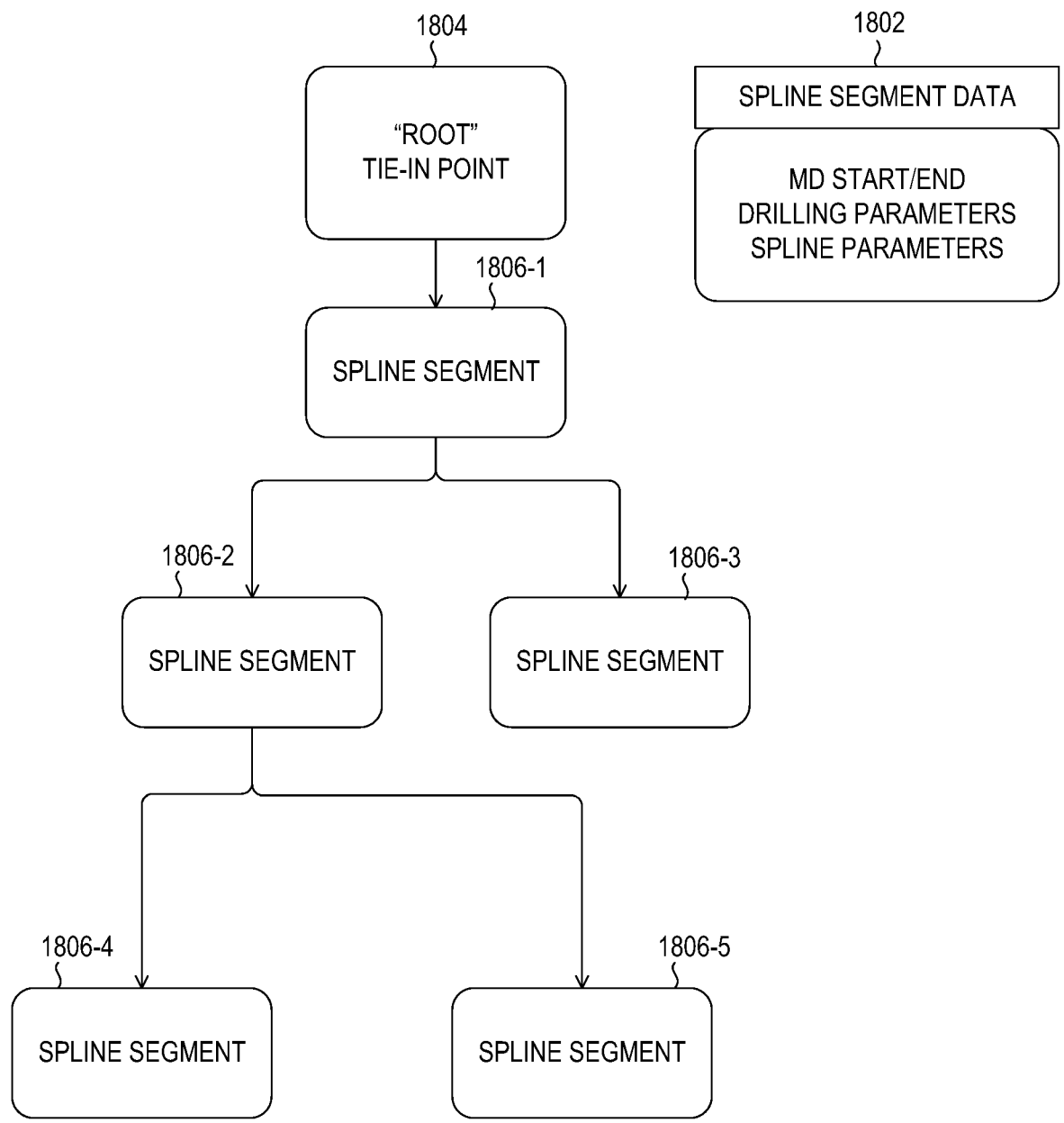
FIG. 18 is depiction of a decision tree for segmentation.

Referring now to FIG. 18, a decision tree 1800 is depicted showing a root node 1804 and a plurality of spline segment nodes 1806-1, 1806-2, 1806-3, 1806-4, and 1806-5. Also shown is spline segment data 1802, comprising data that each spline segments 1806-1, 1806-2, 1806-3, 1806-4, and 1806-5 may comprise, such as a start MD, an end MD, drilling parameters used, and spline parameters.

Decision tree 1800 may be used to evaluate different parameter combinations and to provide meaningful comparisons among different branches, representing different possible spline solutions. In this manner, an ideal spline solution may be approached or approximated by enabling an optimal spline solution from the possible combinations to be accordingly selected. Each node in decision tree 1800 represents a potential spline mapping solution for a section of the subject well, with each successive hierarchy level in decision tree 1800 representing a next section of the well post-segmentation. Accordingly, recursively selecting and combining spline segment mapping functions starting at root node 1804 down through each child nodes 1806-1, 1806-2, 1806-3, 1806-4, and 1806-5 can result in a spline mapping function for the entire subject well.

Furthermore, decision trees 1800 may be grouped into a so-called "grove" (not shown), representing a set of trees for a given set of conditions or parameters. When a plurality of solutions for multiple groves are computed, the geosteering processing with spline functions described herein may be performed independently for each grove. The independent processing of each grove may enable the solutions found for different groves under different conditions or parameters to be independent of each other.

Further processing of decision tree 1800 may result in optimizations that eliminate certain child nodes, referred to as "branch pruning". Although a compact example is shown in FIG. 18 for descriptive clarity, it is noted that for a typical subject well, decision tree 1800 may be significantly larger and more complex. Specifically, a node state machine (not shown) may be used for node handling processes and may include a priority queue to determine which state or operation to perform on which node and in which order or sequence. The states of the state machine may include an inactive state, a branch state, an auto-segment state, and a final state, in one example. Furthermore, the node state machine may employ parallel processing, such as multi-threading or multitasking, to enable improved computational tractability in the handling and processing of nodes in decision tree 1800.

The further processing of decision tree 1800 may focus on identifying overall distinctness, and in particular, specific distinct features, that are evident in the spline function. Accordingly, an absement approach that keeps track of how far apart solutions are and for what range of measured depth.

Figure 19:
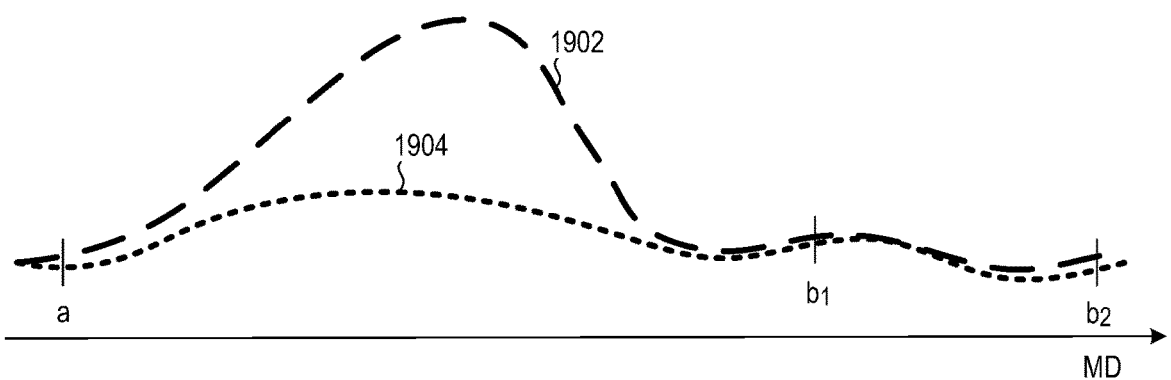
FIG. 19 depicts two misfit spline functions.

Referring now to FIG. 19, a first spline function 1902 and a second spline function 1904 are depicted over an arbitrary range of MD, including MD markers at a, $b_1$, $b_2$. An absement difference between first spline function 1902 and second spline function 1904 is expected to save the same value over the ranges (a, $b_1$) and (a, $b_2$).

Accordingly, given two functions, $f_1(x)$ and $f_2(x)$ representing portions of a spline function versus MD, and having endpoints a, b expressed in MD, an absement difference D between $f_1(x)$ and $f_2(x)$ may be given by Equation 1 below, in which x is MD and T is a difference threshold:

$$D=\int_a^b f(x)dx, \text{ where}$$

for $|f_1(x)-f_2(x)|>T$, $f(x)=|f_1(x)-f_2(x)|$, else $f(x)=0$   Equation 1

Equation 1 introduces a discontinuity and therefore the integral may be computed using a trapezoidal rule, which is computationally tractable. Equation 1 also provides for difference threshold T, beneath which no differences are considered and represents a threshold for a minimum depth distance to determine a new solution.

Figure 20B:
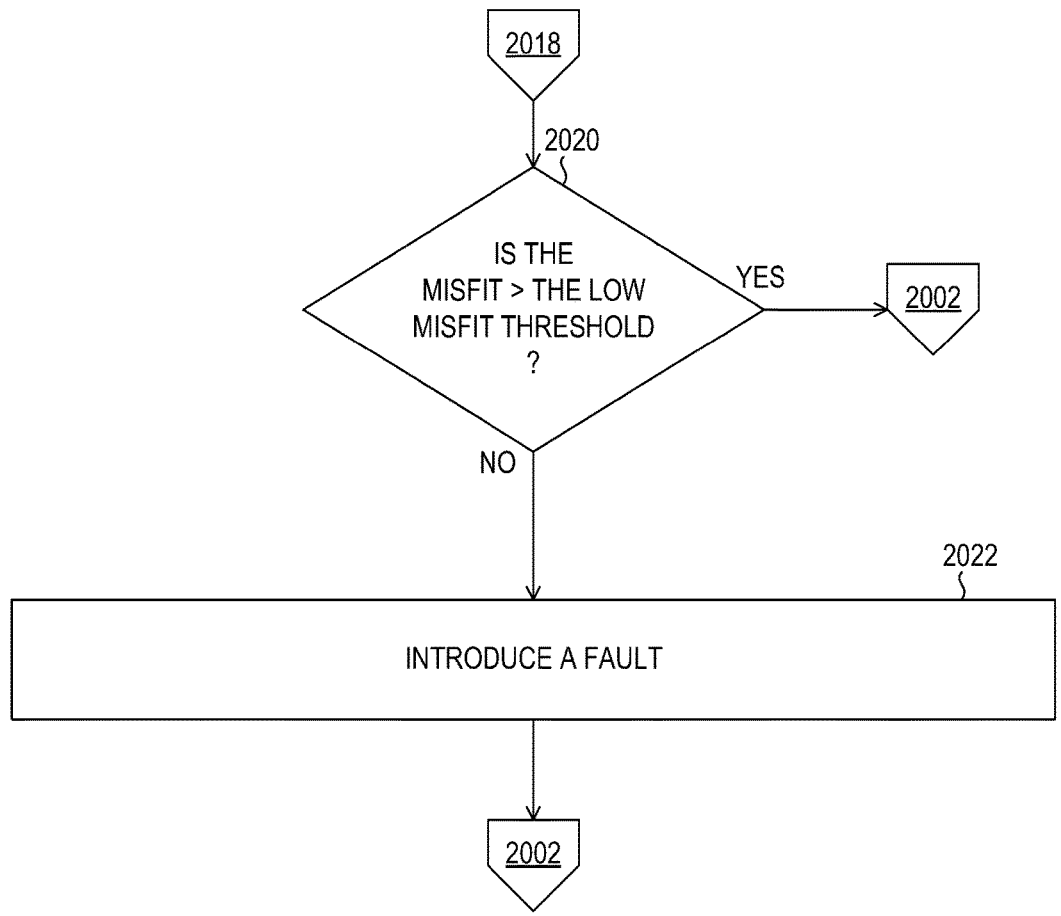
FIGS. 20A and 20B depict a method for auto-segmentation.
Figure 20A:
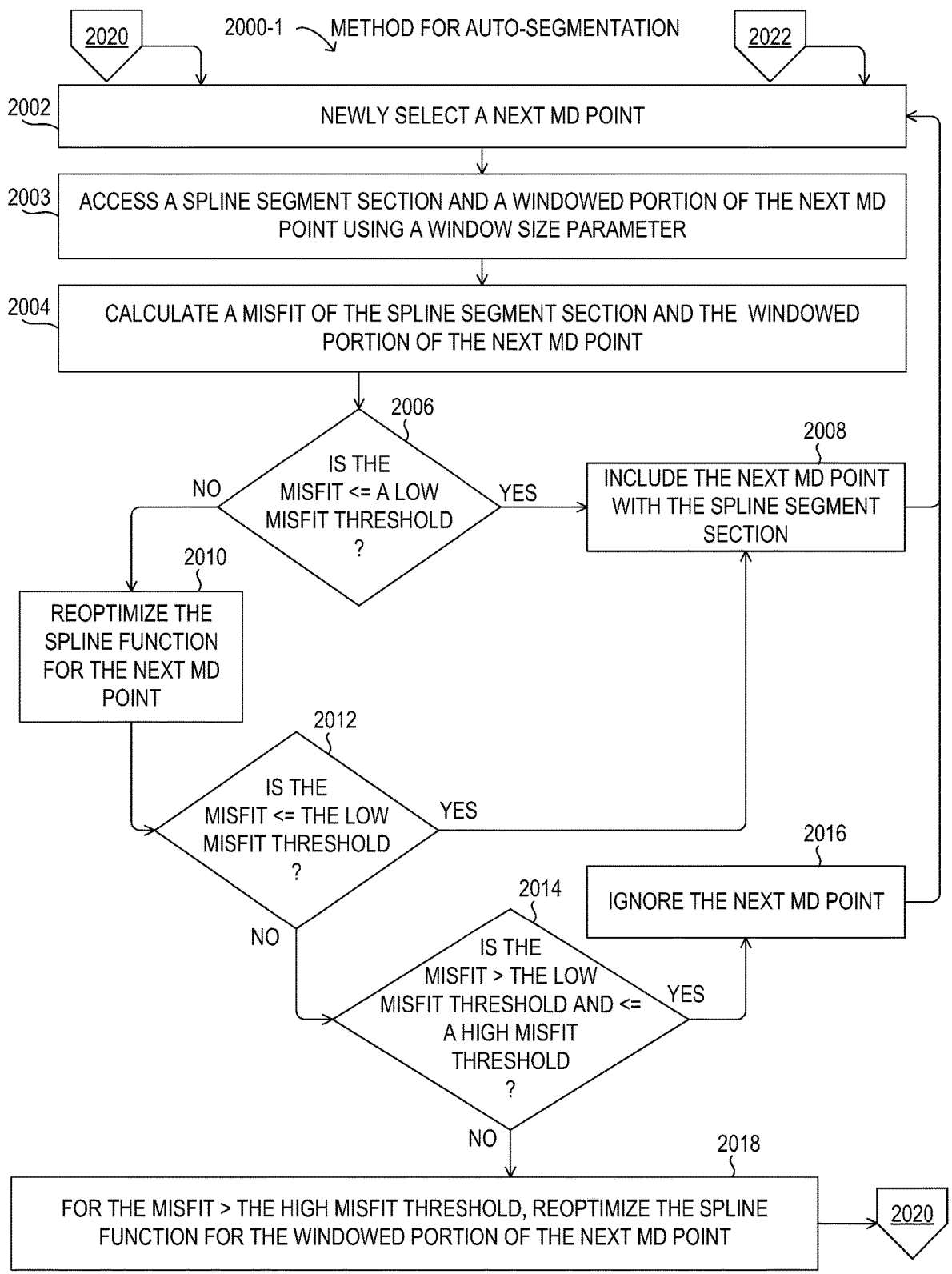

Referring now to FIGS. 20A and 20B, a method 2000 for auto-segmentation of the spline function is depicted in flow chart format. In FIG. 20A method portion 2000-1 is shown and is linked via off page references to method portion 2000-2 in FIG. 20B. Method 2000 may be rearranged or be used with different steps in various embodiments. In particular implementations, method 2000 may be executed by geosteering control system 168, as described above.

Method 2000 may begin at step 2002 by newly selecting a next MD point, which is referred to in the remaining portions of method 2000. In step 2003, a spline segment and a windowed portion of the next MD point is accessed using a window size parameter. In step 2004, a misfit of the spline segment and the windowed portion of the next MD point are calculated. At step 2006, a decision is made whether the misfit is less than or equal to a low misfit threshold. When the result of step 2006 is YES, and the misfit is less than or equal to the low misfit threshold, at step 2008, the next MD point is included with the spline segment. In this manner, the range of the spline segment can be extended. After step 2008, method 2000 may return to step 2002. When the result of step 2006 is NO, and the misfit is greater than the low misfit threshold, at step 2010, the spline function is reoptimized for the next MD point. After step 2010, at step 2012, a decision is again made whether the misfit is less than or equal to the low misfit threshold. When the result of step 2012 is YES, and the misfit is less than or equal to the low misfit threshold, method 2000 proceeds to step 2008. When the result of step 2012 is NO, and the misfit is greater than the low misfit threshold, at step 2014, a decision is made whether the misfit is greater than the low misfit threshold and less than or equal to a high misfit threshold. When the result of step 2014 is YES, and the misfit is greater than the low misfit threshold and less than or equal to a high misfit threshold, at step 2016, the next MD point is ignored, and method 2000 returns to step 2002. When the result of step 2014 is NO, and the misfit is less than or equal to the low misfit threshold or greater than the high misfit threshold, at step 2018, the spline function is reoptimized for the windowed portion of the next MD point. Step 2018 may be performed only for the case in which the misfit is greater than the high misfit threshold. After step 2018, method 2000 may proceed to step 2020 shown in FIG. 20B, at which a decision is made whether the misfit is greater than the low misfit threshold. When the result of step 2020 is YES, and the misfit is greater than the low misfit threshold, method 2000 may return to step 2002. When the result of step 2020 is NO, and the misfit is less than or equal to the low misfit threshold, at step 2022, a fault is introduced at the first prior MD point that did not exceed low misfit threshold is selected as the break point. The fault may represent a discontinuity in the spline function and may indicate where a physical fault in the geological formation is located. After step 2022, method 2000 may return to step 2002.

Figure 21:
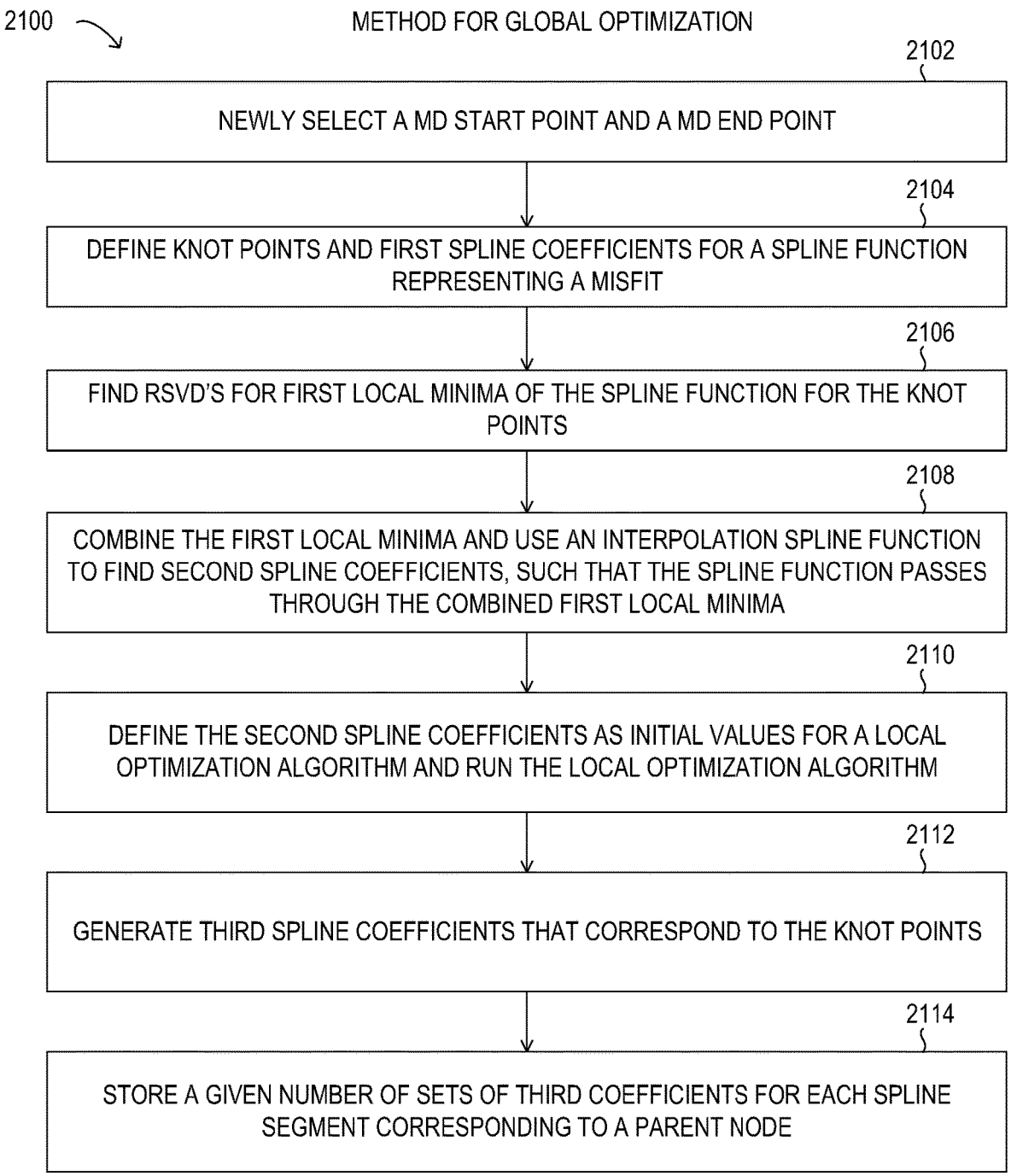
FIG. 21 depicts a method for global optimization.

In method 2000 for auto-segmentation, coefficients (representing values for scaling of the spline function related to given knot locations) are selected for the spline segment having a minimal length using a global optimization method (see method 2100 in FIG. 21). Then the spline segment may be extended, such as by adding knots where indicated, until the selected coefficients no longer describe the data within a desired misfit threshold. The misfit thresholds, including the low misfit threshold and the high misfit threshold, may be adaptively determined based on previous misfit. Extending the spline segment in step 2008 may involve the incremental inclusion of consecutive MDs and the addition of new spline coefficients and knots, as indicated. For each additional MD, a misfit mean using forward-looking windowing may be calculated. When the misfit mean exceeds the low misfit threshold in step 2006, the coefficients may be reoptimized at step 2010. If the misfit mean within the forward-looking window with the re-optimized coefficients from step 2010 still exceeds the low misfit threshold in step 2020, the first previous point that did not exceed the low misfit threshold is selected as a break point where a fault is introduced at step 2022.

Specifically, the following inputs may be provided for execution of method 2000:
- an existing spline segment;
- w: a value representing a window size (e.g., expressed as a number of MD points) over the misfit mean is calculated;
- $n_{high}$: used for the high misfit threshold, a value in terms of the number of standard deviations of misfit from the minimum segment mean to use to indicate a fault (e.g., a discontinuity in the spline function); and
- $n_{low}$: used for the low misfit threshold, a value in terms of the number of standard deviations of misfit from the mean to use to indicate a fault.

Further details of the process of method 2000 in terms of the above inputs are listed below as a series of the calculations performed.
1. Select an index, i, of the greatest MD included in the spline segment.
2. When $MD_i$ exceeds the spline interpolation region, the spline function may be extended to $MD_i$ by adding an additional knot at a spacing of 1 knot beyond the previous knot and a coefficient with the same value as the previous coefficient of the spline segment.
3. Calculate $\mu_{min}$ and $\sigma_{min}$, the mean and standard deviation, respectively, of misfit values for the spline segment.
4. Calculate the windowed mean misfit, $mean_i$ for MDs indexed \[i: i+w).

4.1. When $mean_i < \mu_{min}+(\sigma_{min}*n_{low})$, where $\mu_{min}+(\sigma_{min}*n_{low})$ is the low misfit threshold, append $MD_i$ to the spline segment.

4.2. When $mean_i > \mu_{min}+(\sigma_{min}*n_{high})$ where $\mu_{min}+(\sigma_{min}*n_{high})$ is the high misfit threshold, it indicates that the current spline coefficients no longer describe the reference data sufficiently well. In this case, the coefficients are re-optimized. When $mean_i$ still exceeds the high misfit threshold $\mu_{min}+(\sigma_{min}*n_{high})$, a discontinuity is introduced into the spline segment at $MD_{(i-1)}$.

4.3 When $\mu_{min}+(\sigma_{min}*n_{high}) > mean_i > \mu_{min}+(\sigma_{min}*n_{low})$, the coefficients may be reoptimized at step 4 may be repeated.

Figure 26:
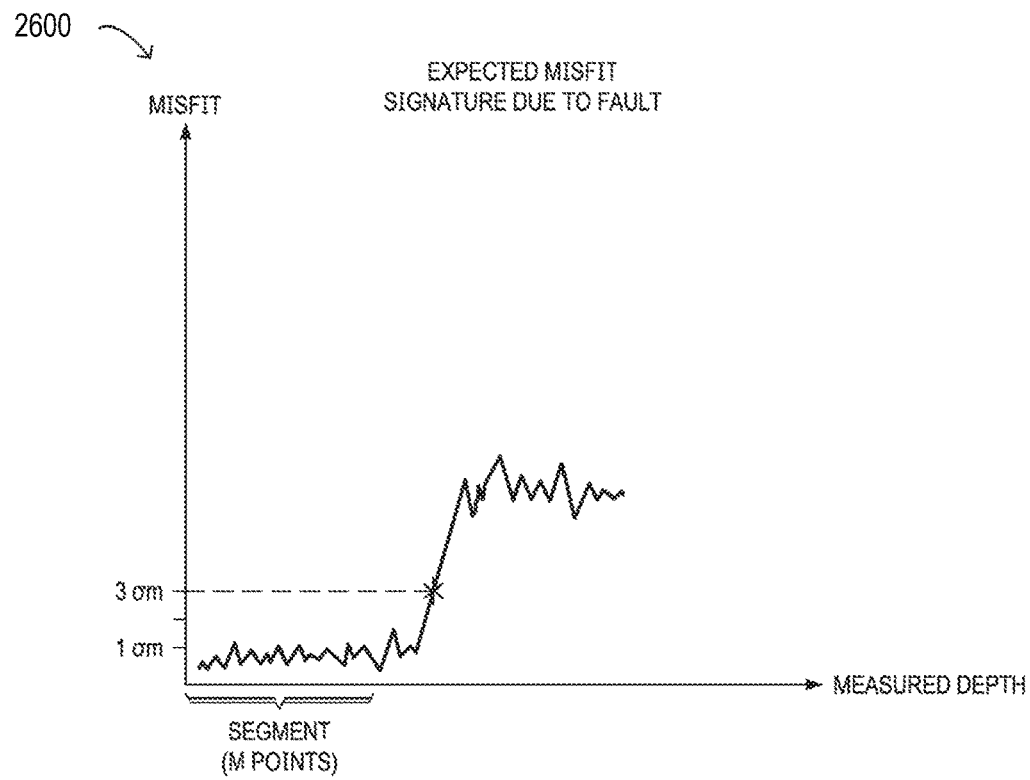
FIGS. 26, 27, 28, and 29 depict plots of misfit values.
Figure 27:
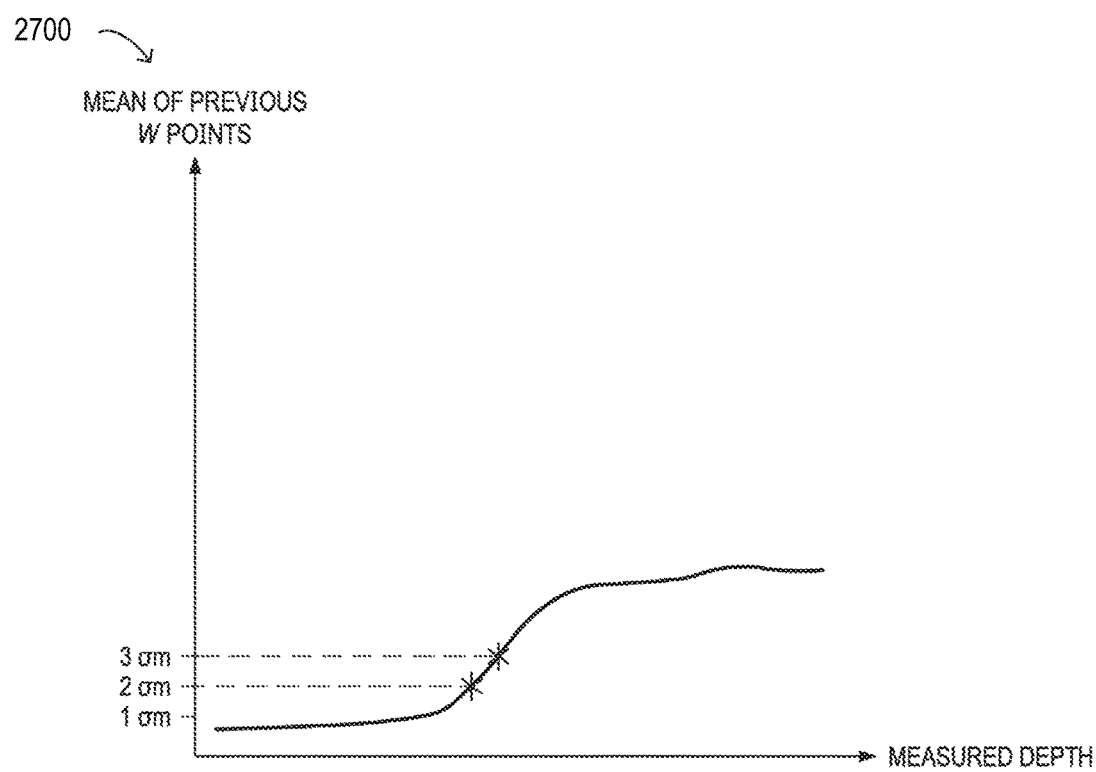

Referring now to FIG. 26, a plot 2600 depicts expected misfit that is indicative of, or may be a signature of, a fault, shown as a sudden jump in misfit. In FIG. 27, a plot 2700 depicts smoothed mean values of plot 2600 for a given window size, such as for w≈10. In FIG. 26, the same coefficients and knots continue to be used for the spline function before and after the fault. Plot 2600 shows the same thresholds on the Y axis as in plot 2600. For plots 2600 and 2600, the example is based on $n_{low}$=2 and $n_{high}$=3. For the case of the sudden jump in misfit in plot 2600, the corresponding MD interval is small for the low and high threshold values. It is noted that in such cases, a single threshold value may also be used in various embodiments.

Figure 28:
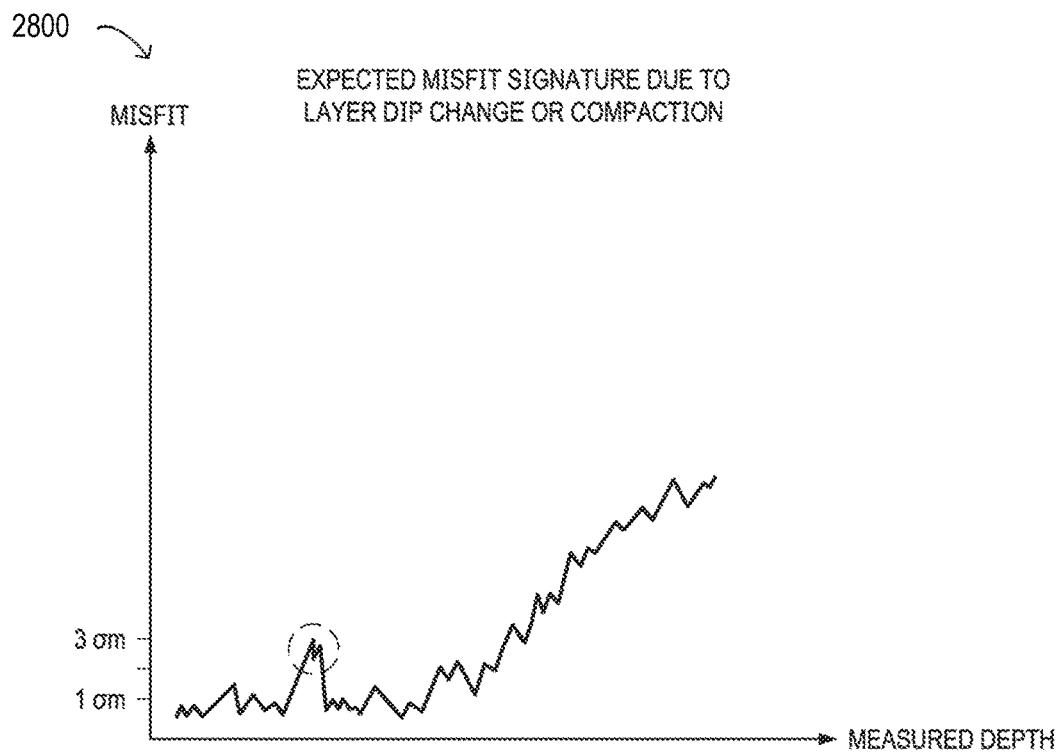
Figure 29:
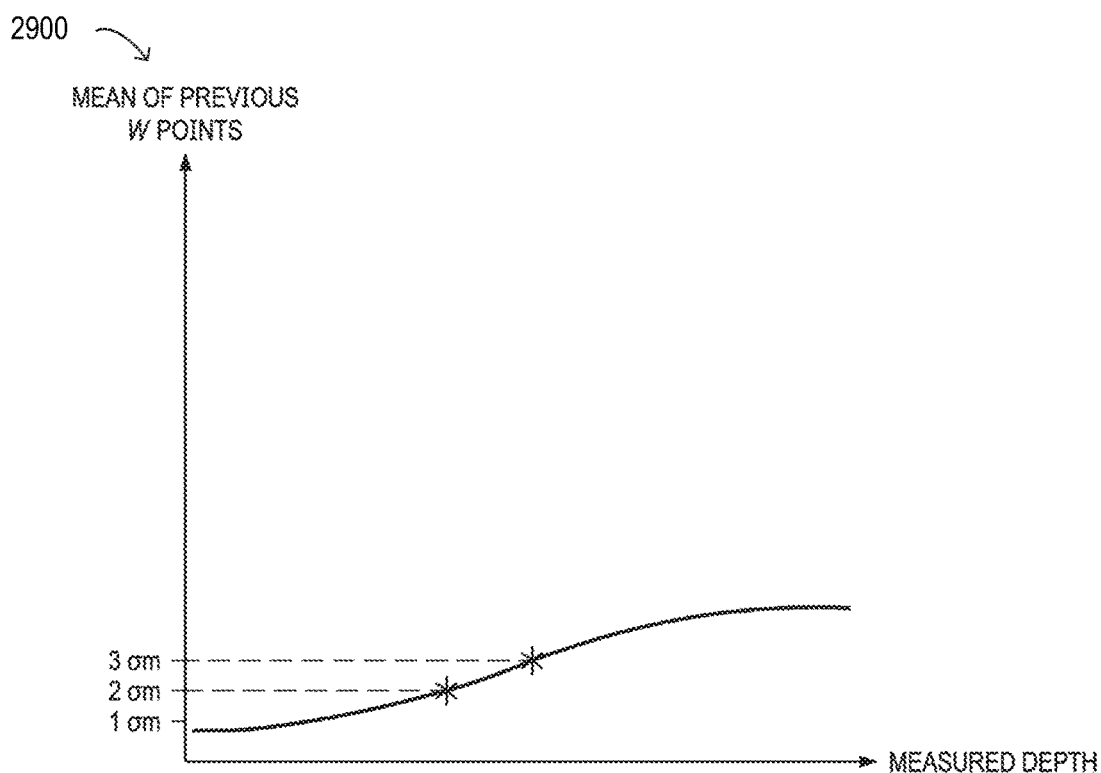

Referring now to FIG. 28, a plot 2800 depicts expected misfit that is indicative of a change in geologic dip or compaction/expansion of geological layers. In FIG. 29, a plot 2900 depicts smoothed mean values of plot 2800 for a given window size, such as for w≈10. In FIG. 28, the same coefficients and knots continue to be used for the spline function before and after the change. In plot 2800, the change is slow and an outlier is circled that indicates noise. In plot 2900, the mean plot shows an even slower change due to smoothing, while the outlier is eliminated. In plot 2900, a relatively large interval in MD results from the threshold points. In this case, a splitting of the spline segment at the lower threshold may be indicated. Also, the use of an upper and lower threshold provides resilience to false triggering when effects of the outlier may be seen in the smoothed plot after windowed averaging (not shown).

Further operations of geosteering algorithms using a spline function, as disclosed herein, may involve parameter optimization, as noted above. The optimization of the spline coefficient parameters may be accomplished using global optimization, regional optimization, and local optimization at various MD points. In this manner, a very large number or an exhaustive number of potential solutions may be generated and evaluated and may be validated at different scales, such that a global optimization is also valid at the regional and local level, for example.

Referring now to FIG. 21, a method 2100 for global optimization is depicted in flow chart format. Method 2100 may be rearranged or be used with different steps in various embodiments. In particular implementations, method 2100 may be executed by geosteering control system 168, as described above.

Method 2100 may begin at step 2102 by newly selecting a MD start point and a MD end point. In some embodiments, a minimum segment length may be used in step 2102. At step 2104, knot points and first spline coefficients for a spline function representing a misfit may be defined. It is noted that a knot interval used in step 2104 may be independent of the minimum segment length. The spline function may be a cubic or $3^{rd}$ order spline function, such as a cubic-B spline function. At step 2106, relative stratigraphic vertical depths (RSVD's) are found for first local minima of the spline function for the knot points. The first local minima may be found using a point-by-point method or by applying a continuous wavelet transform. It is noted that RSVD may be given by stratigraphic vertical depth minus TVD and may indicate how far away from a prior geomodel the solution is. At step 2108, the first local minima are combined and an interpolation spline function is used to find second spline coefficients, such that the spline function passes through the first local minima. At step 2110, the second spline coefficients are defined as initial values for a local optimization algorithm and the local optimization algorithm is run. The local optimization algorithm may use a SciPy Python library algorithm to generate a local optimal solution. At step 2110, third spline coefficients are generated that correspond to the knot points. At step 2114, a given number of sets of third coefficients for each spline segment corresponding to a parent node are stored.

Figure 22:
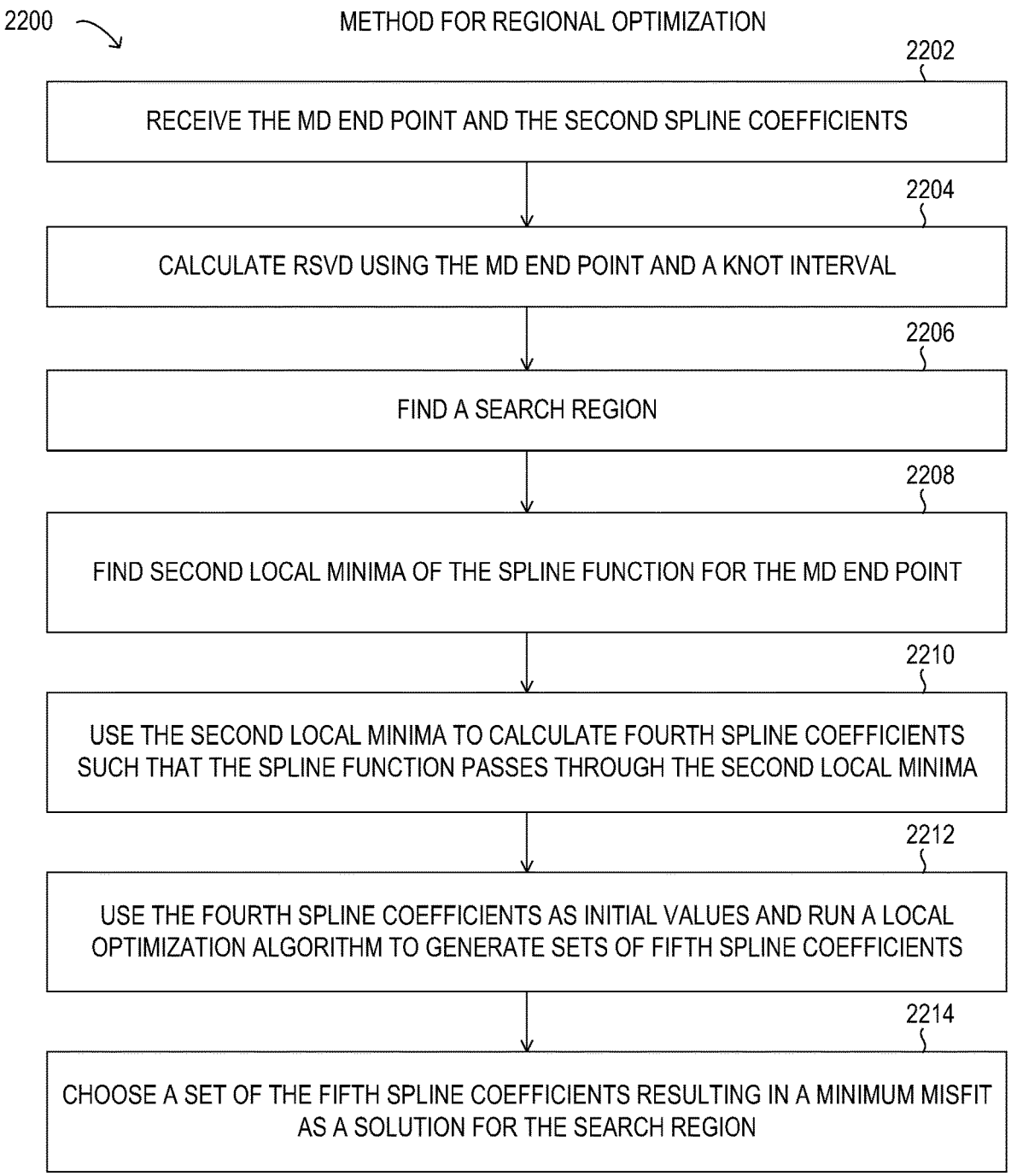
FIG. 22 depicts a method for regional optimization.

Referring now to FIG. 22, a method 2200 for regional optimization is depicted in flow chart format. Method 2200 may be rearranged or be used with different steps in various embodiments. Method 2200 may be performed in conjunction with method 2100 in various embodiments. In particular implementations, method 2200 may be executed by geosteering control system 168, as described above.

Method 2200 may begin at step 2202 by receiving the MD end point and the second spline coefficients. At step 2204, RSVD is calculated using the MD end point and a knot interval. At step 2206, a search region is found. At step 2208, second local minima of the spline function are found for the MD end point. At step 2210, the second local minima are used to calculate fourth spline coefficients such that the spline function passes through the second local minima. At step 2212, the fourth spline coefficients are used as initial values to run a local optimization algorithm to generate sets of fifth spline coefficients. At step 2214, a set of the fifth spline coefficients resulting in a minimum misfit is chosen as a solution for the search region.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A geosteering control system comprising:
a processor enabled to access memory media; and
the memory media storing instructions executable by the processor for:
accessing reference well data associated with at least one reference well located in proximity to a subject well, wherein the reference well is a second well different from the subject well, and wherein the reference well data further comprises first measurement data describing at least one geological property of the reference well versus true vertical depth (TVD);
receiving second measurement data describing the at least one geological property for the subject well versus measured depth (MD);
generating a plurality of mappings using a plurality of spline functions, wherein the plurality of mappings map the second measurement data to the first measurement data using the plurality of spline functions, and wherein the plurality of mappings form a grove of decision trees representing a plurality of potential geosteering solutions for the subject well, where each node in the grove of decision trees represents a potential spline mapping solution for a section of the subject well;
determining, using a plurality of misfit functions, difference values in the at least one geological property between the second measurement data and the first measurement data as respectively mapped by the spline functions, wherein each of the plurality of misfit functions determines a difference between at least two of the plurality of spline functions, including:
segmenting the first measurement data and the second measurement data into a plurality of segments respectively corresponding to MD sections of the subject well, with each successive hierarchy level in the grove of decision trees representing a next section of the well;
determining coefficients and knot points for a first spline function as multi-solutions for each of the plurality of segments; and
selecting one of the multi-solutions for at least a portion of the first spline function as mapped;
identifying the first spline function for having at least one minimum of the plurality of respective misfit functions;
responsive to identifying the first spline function, selecting a best-fit geosteering solution for the subject well; and
based on the selected best-fit geosteering solution for the subject well, determining a subterranean location of a wellbore of the subject well during drilling of the subject well,
wherein the geosteering control system is configured to control drilling rig equipment to drill the subject well responsive to the determined location of the wellbore.

2. The geosteering control system of claim 1, wherein the memory media further comprise instructions for:
determining when a change in one or more drilling parameters is indicated during drilling of the well and send one or more signals to effect such a change.

3. The geosteering control system of claim 1, wherein the memory media further comprise instructions for:
using the subterranean location determined based on the first spline function, modifying, during drilling, a well plan for the subject well.

4. The geosteering control system of claim 1, wherein the spline function is a third order cubic spline function.

5. The geosteering control system of claim 1, wherein the reference well data is associated with at least two reference wells located in proximity to the subject well.

6. The geosteering control system of claim 1, wherein the instructions for segmenting the first measurement data and the second measurement data into a plurality of segments respectively corresponding to MD sections of the well bore of the subject well further comprise instructions for:
determining when a discontinuity is indicated in the spline function, based on either the first measurement data or the second measurement data, wherein the discontinuity corresponds to a geological fault; and
resuming the mapping of the plurality of misfit functions after the discontinuity.

7. The geosteering control system of claim 1, wherein the instructions for segmenting the first measurement data and the second measurement data into a plurality of segments respectively corresponding to MD sections of the well bore of the subject well further comprise instructions for:
for a first segment in the plurality of segments respectively corresponding to a first MD section, extending the first MD section without changing first coefficients and first knot points associated with the first MD section until a first mapping of the misfit function corresponding to the MD section violates a threshold criterion.

8. The geosteering control system of claim 1, wherein the at least one geological property is selected from the group consisting of gamma ray emission, resistivity, porosity, density, and hardness.

9. A computer-implemented method for geosteering, the method comprising:
accessing, by a computer system, reference well data associated with at least one reference well for a subject well, wherein the reference well is a second well different from the subject well, and wherein the reference well data further comprises first measurement data describing at least one geological property of the reference well versus true vertical depth (TVD);
receiving, by the computer system, second measurement data describing the at least one geological property for the subject well versus measured depth (MD);
using a plurality of spline functions, generating a plurality of mappings mapping the second measurement data to the first measurement data, wherein the plurality of mappings form a grove of decision trees representing a plurality of potential geosteering solutions for the subject well, where each node in the grove of decision trees represents a potential spline mapping solution for a section of the subject well;
determining, by the computer system, using a plurality of misfit functions, difference values in the at least one geological property between the second measurement data and the first measurement data as respectively mapped by the spline functions, wherein each of the plurality of misfit functions determines a difference between at least two of the plurality of spline functions, including:
segmenting the first measurement data and the second measurement data into a plurality of segments respectively corresponding to MD sections of the subject well, with each successive hierarchy level in the grove of decision trees representing a next section of the well;
determining coefficients and knot points for a first spline function as multi-solutions for each of the plurality of segments; and
selecting one of the multi-solutions for at least a portion of the first spline function as mapped;
identifying, by the computer system, the first spline function for having at least one minimum of the plurality of respective misfit functions;
responsive to identifying the first spline function, selecting a best-fit geosteering solution for the subject well; and
based on the selected best-fit geosteering solution for the subject well, determining, by the computer system, a subterranean location of a wellbore of the subject well during drilling of the subject well and drilling at least a portion of the wellbore responsive to the determined location of the wellbore.

10. The method of claim 9, wherein the method is performed using a geosteering control system that is enabled to send one or more signals to control drilling rig equipment enabled for drilling of the subject well and to send one or more signals to effect such a change.

11. The method of claim 10, further comprising:
determining, by the computer system, when a change in one or more drilling parameters is indicated during drilling of the well and send one or more signals to effect such a change.

12. The method of claim 9, further comprising:
using the subterranean location determined based on the first spline function, modifying, by the computer system during drilling, a well plan for the subject well.

13. The method of claim 9, wherein the spline function is a third order cubic spline function.

14. The method of claim 9, wherein the reference well data is associated with at least two reference wells located in proximity to the subject well.

15. The method of claim 9, wherein the segmenting, by the computer system, the first measurement data and the second measurement data into a plurality of segments respectively corresponding to MD sections of the well bore of the subject well further comprises:
determining, by the computer system, when a discontinuity is indicated in the spline function, based on either the first measurement data or the second measurement data, wherein the discontinuity corresponds to a geological fault; and
resuming, by the computer system, the mapping of the plurality of misfit functions after the discontinuity.

16. The method of claim 9, wherein the segmenting, by the computer system, the first measurement data and the second measurement data into a plurality of segments respectively corresponding to MD sections of the well bore of the subject well further comprises:
for a first segment in the plurality of segments respectively corresponding to a first MD section, extending, by the computer system, the first MD section without changing first coefficients and first knot points associated with the first MD section until a first mapping of the misfit function corresponding to the MD section violates a threshold criterion.

17. The method of claim 9, wherein the at least one geological property is selected from the group consisting of: gamma ray emission, resistivity, porosity, density, and hardness.

* * * * *